(12) United States Patent
Kishigami et al.

(10) Patent No.: US 9,733,347 B2
(45) Date of Patent: Aug. 15, 2017

(54) RADAR APPARATUS

(71) Applicant: Panasonic Corporation, Osaka (JP)

(72) Inventors: Takaaki Kishigami, Tokyo (JP);
Hirohito Mukai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 533 days.

(21) Appl. No.: 14/357,756

(22) PCT Filed: Nov. 7, 2012

(86) PCT No.: PCT/JP2012/007144
§ 371 (c)(1),
(2) Date: May 12, 2014

(87) PCT Pub. No.: WO2013/073135
PCT Pub. Date: May 23, 2013

(65) Prior Publication Data
US 2015/0061915 A1 Mar. 5, 2015

(30) Foreign Application Priority Data
Nov. 17, 2011 (JP) .................... 2011-252100

(51) Int. Cl.
*G01S 13/04* (2006.01)
*G01S 13/00* (2006.01)
(Continued)

(52) U.S. Cl.
CPC .............. *G01S 13/003* (2013.01); *G01S 7/02* (2013.01); *G01S 7/023* (2013.01); *G01S 13/04* (2013.01);
(Continued)

(58) Field of Classification Search
CPC ........... G01S 13/003; G01S 7/02; G01S 7/023
(Continued)

(56) References Cited

U.S. PATENT DOCUMENTS 5,151,702 A * 9/1992 Urkowitz .............. G01S 13/522
342/116
5,497,162 A 3/1996 Kaiser
(Continued)

FOREIGN PATENT DOCUMENTS

JP 43-19266 B1 8/1968
JP 61-96482 A 5/1986
(Continued)

OTHER PUBLICATIONS

Budisin, S.Z., "New Complementary Pairs of Sequences," Electronics Letters 26(13): 881-883, 1990.
(Continued)

*Primary Examiner* — Marcus Windrich
(74) *Attorney, Agent, or Firm* — Seed Intellectual Property Law Group LLP

(57) ABSTRACT

A radar transmitter $Tx_s$ (s=1) generates a baseband transmission signal by modulating a first code sequence having a prescribed code length on the basis of a first transmission timing signal and gives a first transmission phase shift corresponding to each transmission cycle to the transmission signal. A radar receiver $Tx_s$ (s=2) generates a baseband transmission signal by modulating a second code sequence having the prescribed code length on the basis of a second transmission timing signal and gives, to the transmission signal, a second transmission phase shift that correspond to each transmission cycle and opposite to the first transmission phase.

19 Claims, 24 Drawing Sheets

(51) Int. Cl.
*G01S 7/02* (2006.01)
*G01S 13/22* (2006.01)
*G01S 13/28* (2006.01)
*G01S 13/91* (2006.01)

(52) U.S. Cl.
CPC .......... *G01S 13/222* (2013.01); *G01S 13/288* (2013.01); *G01S 13/91* (2013.01)

(58) Field of Classification Search
USPC ............................................ 342/27, 70, 202
See application file for complete search history.

(56) References Cited

U.S. PATENT DOCUMENTS

| | | | | |
|---|---|---|---|---|
| 6,515,622 | B1* | 2/2003 | Izadpanah | H01Q 21/0006 342/368 |
| 2004/0178952 | A1* | 9/2004 | Jenkins | G01S 7/023 342/202 |
| 2011/0317782 | A1* | 12/2011 | Vierinen | G01S 13/288 375/295 |
| 2012/0050103 | A1* | 3/2012 | Revol | G01S 19/21 342/357.68 |
| 2013/0176166 | A1 | 7/2013 | Kishigami et al. | |

FOREIGN PATENT DOCUMENTS

| | | |
|---|---|---|
| JP | 61-170083 U | 10/1986 |
| JP | 62-179683 A | 8/1987 |
| JP | 3-144390 A | 6/1991 |
| JP | 7-333328 A | 12/1995 |
| JP | 10-48329 A | 2/1998 |
| JP | 10-512370 A | 11/1998 |
| JP | 2002-214331 A | 7/2002 |
| JP | 2004-271529 A | 9/2004 |
| JP | 2008-256568 A | 10/2008 |
| JP | 2010-256027 A | 11/2010 |
| WO | 2012/046419 A1 | 4/2012 |

OTHER PUBLICATIONS

Bussgang et al., "A Unified Analysis of Range Performance of CW, Pulse, and Pulse Doppler Radar," Proceedings of the IRE 47(10): 1753-1762, 1959.
International Search Report dated Feb. 5, 2013, for corresponding International Application No. PCT/JP2012/007144, 6 pages.
Takase et al., "New Binary Complementary Codes Compressed to Several Sub-pulses," The Transactions of the Institute of Electronics, Information and Communication Engineers B, J86(7): 1318-1330, Jul. 2003.

* cited by examiner (a)

(b)

(c)

RADAR APPARATUS

TECHNICAL FIELD

The present disclosure relates to a radar apparatus which detects a target by receiving pulse signals of reflection waves reflected from the target.

BACKGROUND ART

Radar apparatus using a pulse signal radiate radio waves to the space on the basis of a pulse signal to be transmitted, receive a pulse signal of reflection waves reflected from a target, and measure at least one of a distance between a measuring site and the target and a direction of the target. In recent years, radar apparatus which can detect targets including automobiles and pedestrians by performing a high-resolution measurement using short-wavelength radio waves including microwaves and millimeter waves have been being developed.

For example, Patent document 1 is known as disclosing a radar apparatus which suppresses interference by reducing measurement times of respective sector radars. The radar apparatus disclosed in Patent document 1 will be outlined with reference to FIG. 23. FIG. 23 is an explanatory diagram (timing chart) for description of how the conventional radar apparatus operates.

The radar apparatus of Patent document 1 is equipped with two radar devices, that is, an A radar device and a B radar device. The A radar device is equipped with a sync unit for controlling the timing of an A pulse signal to be transmitted from the A radar device and an I/F unit for receiving a B sync trigger signal that is synchronized with a B pulse signal transmitted from the B radar device. The A radar device receives the B trigger signal from the B radar device through the I/F unit. The A radar device controls the emission timing of the A pulse signal to be emitted from the A radar device on the basis of the received B sync signal.

Therefore, as shown in FIG. 23, the arrival time of an interference wave signal that the B radar device receives from the A radar device always exists in a time interval Tx that is outside an effective reception period of the B radar device. The interference signal that the B radar device receives from the A radar device does not affect a measurement of the B radar device.

The arrival time of an interference wave signal that the A radar device receives from the B radar device exists in an effective reception period of the A radar device. However, the A radar device can eliminate an interference signal effectively by performing restrictive interference suppression processing or gate processing on the interference wave signal coming from the B radar device. In FIG. 23, parameter Tm represents the effective reception period, parameter Tx represents the time interval between effective reception periods, parameter Td represents a time that elapses to arrival of interference waves from the other radar device.

For example, Patent document 2 is known as disclosing a radar apparatus which suppresses occurrence of interference even if reflection signals reflected from a target are received in an asynchronous manner, by using complementary codes (P1, P2) and (Q1, Q2) which are complete complementary codes.

Two radar systems of Patent document 2 transmit and receive different coded pulses (P1, P2, Q1, Q2) as coded pulses of a complete complementary code using carrier waves in the same frequency band.

When receiving plural coded pulses transmitted from the self radar system, one radar system outputs one of autocorrelation function signals $R_{P1P1}(\tau)$, $R_{P2P2}(\tau)$, $R_{Q1Q1}(\tau)$, and $R_{Q2Q2}(\tau)$ corresponding to the plural respective coded pulses (P1, P2, Q1, Q2). When receiving plural coded pulses transmitted from the other radar system, the one radar system outputs one of cross-correlation function signals $R_{Q1P1}(\tau)$, $R_{Q2P2}(\tau)$, $R_{P1Q1}(\tau)$, and $R_{P2Q2}(\tau)$ corresponding to the plural coded pulses (P1, P2) or (Q1, Q2).

Because of the properties of the complete complementary code, the sum of plural outputs autocorrelation function signals ($R_{P1P1}(\tau)+R_{P2P2}(\tau)$ or $R_{Q1Q1}(\tau)+R_{Q2Q2}(\tau)$) is equal to 0 except for $\tau$ being equal to 0 and the sum of plural outputs cross-correlation function signals ($R_{Q1P1}(\tau)+R_{Q2P2}(\tau)$ or $R_{P1Q1}(\tau)+R_{P2Q2}(\tau)$) is equal to 0 irrespective of $\tau$.

The reception side performs reception processing of calculating plural autocorrelation function signals corresponding to plural respective coded pulses (P1, P2, Q1, Q2) transmitted from the self radar system. As a result, compressed pulses that are free of sidelobes are obtained. Even when plural coded pulses transmitted from the other radar system are received, signal components of the other radar system can be made zero in a process of calculating the sum of autocorrelation function signals. That is, plural radar systems that do not interfere with each other can be provided even if the same frequency band is used between adjoining frequency bands.

PRIOR ART DOCUMENTS

Patent Documents

Patent document 1: JP-A-7-333328
Patent document 2: JP-A-61-096482

SUMMARY OF THE INVENTION

Problems to be Solved by the Invention

However, in Patent document 1, it is necessary that transmission cycles of pulse signals of the A radar device and the B radar device need to be synchronized with each other. Furthermore, for the A radar device to suppress an interference wave signal coming from the B radar device, the A radar device needs to be provided with an additional circuit (e.g., filter circuit) for suppressing interference and the configuration of the receiver of the A radar device is thus complicated. If, alternatively, the A radar device performs gate processing on an interference wave signal coming from the B radar device, an unmeasurable slot corresponding to a reception time of an interference wave coming from the B radar device occurs in an effective reception period Tm of the A radar device.

In Patent document 2, since transmission cycles of coded pulses (P1, P2, Q1, Q2) need to be synchronized with each other, it is necessary to synchronize transmission cycles of coded pulses of the radar systems P and Q.

The present disclosure has been made in the above circumstances, and an object of the disclosure is to provide a radar apparatus which, in the case where plural sector radars are installed being opposed to each other, suppresses interference between the sector radars with a simple configuration by making it unnecessary to synchronize transmission cycles between the sector radars opposed to each other.

Means for Solving the Problems

This disclosure provides a radar apparatus as mentioned above comprising a first radar transmitter for transmitting a first radar transmission signal generated using a first code sequence having a prescribed code length from a first transmission antenna as a first radio-frequency signal; and a second radar transmitter for transmitting a second radar transmission signal generated using a second code sequence having a prescribed code length from a second transmission antenna as a second radio-frequency signal, wherein the first radar transmission signal is a signal generated by modulating a first baseband signal that has been phase-shifted on the basis of a first transmission timing signal; the second radar transmission signal is a signal generated by modulating a second baseband signal that has been phase-shifted on the basis of a second transmission timing signal; and a phase shift given to the first baseband signal is opposite to a phase shift given to the second baseband signal.

Advantages of the Invention

According to this disclosure, in the case where plural sector radars are installed being opposed to each other, interference between the sector radars can be suppressed with a simple configuration by making it unnecessary to synchronize transmission cycles between the sector radars opposed to each other.

MODES FOR CARRYING OUT THE INVENTION

Background of Embodiments

Figure 1:
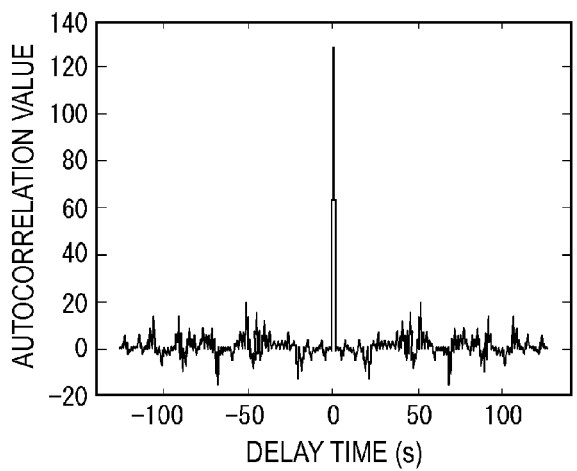
FIG. 1(a) illustrates an autocorrelation calculation result of one of a pair of complementary code sequences.
FIG. 1(b) illustrates an autocorrelation calculation result of the other of the pair of complementary code sequences.
FIG. 1(c) illustrates addition values of the autocorrelation calculation results of the pair of complementary code sequences.
Figure 1:
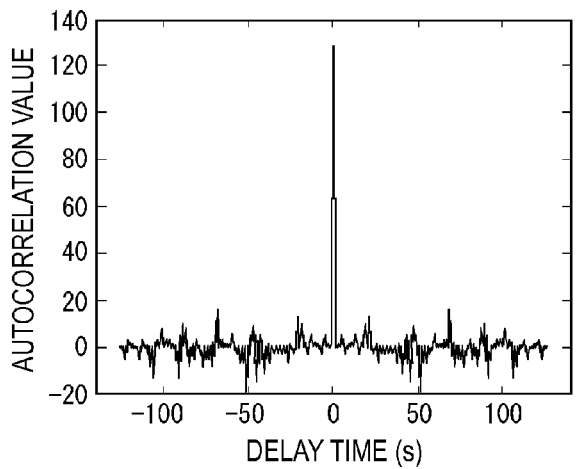
Figure 1:
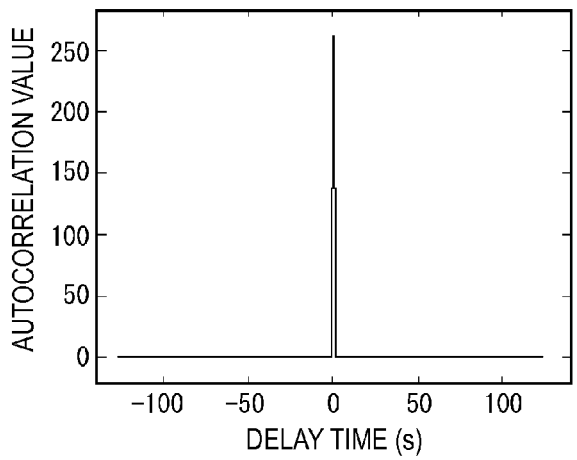

Radar apparatus receive a signal that is a mixture of reflection waves coming from a nearby target and reflection waves coming from a distant target. Range sidelobes occur due to a signal of reflection waves coming from a nearby target. Where range sidelobes and a main lobe of a signal of reflection waves coming from a distant target exist in mixture, the accuracy of detection of the distant target by a radar apparatus is lowered.

Therefore, radar apparatus which use a pulse signal and are required to perform high-resolution measurements on plural targets are required to transmit a pulse wave or a pulse-modulated wave having an autocorrelation characteristic with low range sidelobe levels (hereinafter referred to as a low range sidelobe characteristic).

When an automobile and a pedestrian are located at the same distance from a measuring site, a radar apparatus receives a signal that is a mixture of signals of reflection waves coming from the automobile and the pedestrian which have different radar cross sections (RCSs). In general, the radar cross section of a pedestrian is smaller than that of an automobile.

Radar apparatus are required to properly receive reflection wave signals coming from an automobile and a pedestrian even if they are located at the same distance from a measuring site. Since the output level (reception level) of a reflection wave signal varies depending on the distance or type of a target, radar apparatus are required to have a reception dynamic range that enables reception of reflection wave signals of various reception levels.

Among radar apparatus as described above are ones which are provided with plural radar units for detecting targets existing in plural different measurement areas, respectively. In the following description, radar units for measurements for different measurement areas to detect targets will be referred to as sector radars. Although the measurement areas of the respective sector radars are different from each other, they may overlap with each other in the case where they are close to each other.

Where the measurement areas of the respective sector radars are close to each other, interference occurs between transmission signals transmitted from the respective sector radars. When interference has occurred, the SNIR (signal to interference and noise power ratio) decreases. In conventional radar apparatus, this means a problem that the target positioning estimation accuracy is lowered.

To solve this problem, the following methods are being studied as measures for suppressing interference between sector radars in conventional radar apparatus.

A first method is a method in which sector respective radars use plural different frequency bands or prescribed narrow frequency bands (subbands) and transmit transmission signals by frequency division multiplication (FDM).

Although the first method can suppress interference between the sector radars by using different frequency bands, it is still associated with the following problem. In the former case in which plural different frequency bands are used, many frequency sources are necessary. In the latter case in which narrow frequency bands are used, the time resolution (which corresponds to the distance resolution) of target positioning estimation of each sector radar lowers.

A second method is a method in which sector radars transmit transmission signals in order in a time-divisional manner. However, in the second method, the measurement time increases because it is necessary to transmit a transmission signal repeatedly to make the SNR of a reflection wave signal coming from a target larger than a prescribed value. Therefore, where there is a limitation on the measurement time, it is difficult to transmit a transmission signal repeatedly so that a prescribed SNR value is attained and hence the target detection accuracy lowers.

A third method is a method in which each sector radar transmit a transmission signal by code division multiplexing (CDM) using plural code sequences that are low in cross-correlation. According to the third method, it is not necessary to add new frequency bands or subbands and the time resolution of target positioning estimation of each sector radar does not lower.

However, where a transmission signal is transmitted from each sector radar by code division multiplexing, reflection wave signals, reflected from a target, of transmission signals transmitted from respective other sector radars are received in an asynchronous manner to cause interference in the self sector radar. The SNR and the target detection accuracy of the self sector radar lower more as the reception level of a reflection wave signal increases.

The following embodiments, which have been conceived in view of the above, are each directed to a radar apparatus which, in the case where plural sector radars are installed being opposed to each other, suppresses interference between the sector radars with a simple configuration by making it unnecessary to synchronize transmission cycles between the sector radars opposed to each other.

Before describing radar apparatus according to the respective embodiments of the disclosure, the complementary code will be described below briefly as a technique that is a base of the embodiments.

(Complementary Code)

FIG. 1(a) illustrates an autocorrelation calculation result of one of a pair of complementary code sequences. FIG. 1(b) illustrates an autocorrelation calculation result of the other of the pair of complementary code sequences. FIG. 1(c) illustrates addition values of the autocorrelation calculation results of the pair of complementary code sequences.

The complementary code is a code which uses plural complementary code sequences, for example, a pair of complementary code sequences ($A_n$, $B_n$). The complementary code has a property that the range sidelobes are made zero when autocorrelation calculation results of the one complementary code sequence $A_n$ and the other complementary code sequence $B_n$ are added together with the same delay time $\tau(s)$. Parameter n takes values 1 to L, and parameter L represents a code sequence length or merely a code length.

A method for generating a complementary code is disclosed in the following Referential non-patent document 1, for example:

(Referential non-patent document 1) BUDISIN, S. Z, "NEW COMPLEMENTARY PAIRS OF SEQUENCES" Electron. Lett., 26, (13), pp. 881-883 (1990).

An autocorrelation calculation result of the one complementary code sequence $A_n$ between the complementary code sequences ($A_n$, $B_n$) is obtained according to Equation (1). An autocorrelation calculation result of the other complementary code sequence $B_n$ is obtained according to Equation (2). Parameter R represents an autocorrelation calculation result. It is assumed that each of the complementary code sequences $A_n$ and $B_n$ is zero when n>L or n<1 (i.e., $A_n$=0 and $B_n$=0 when n>L or n<1). The asterisk "*" is a complex conjugate operator.

[Formula 1]

$$R_{AA}(\tau) = \sum_{n=1}^{L} A_n A^*_{n+\tau} \quad (1)$$

[Formula 2]

$$R_{BB}(\tau) = \sum_{n=1}^{L} B_n B^*_{n+\tau} \quad (2)$$

The autocorrelation calculation result $R_{AA}(\tau)$ of the complementary code sequence $A_n$ calculated according to Equation (1) has a peak when the delay time (or shift time) $\tau$ is equal to 0 and has range sidelobes for the delay times $\tau$ being not equal to 0. Likewise, the autocorrelation calculation result $R_{BB}(\tau)$ of the complementary code sequence $B_n$ calculated according to Equation (2) has a peak when the delay time $\tau$ is equal to 0 and has range sidelobes for the delay times $\tau$ being not equal to 0.

The addition values of the autocorrelation calculation results $R_{AA}(\tau)$ and $R_{BB}(\tau)$ have a peak when the delay time $\tau$ is equal to 0 and have no range sidelobes (i.e., have values 0) for the delay times $\tau$ being not equal to 0. In the following description, a peak occurring when the delay time $\tau$ is equal to 0 will be referred to as a main lobe. The above relationships are expressed as Formulae (3):

[Formulae 3]

$R_{AA}(\tau)+R_{BB}(\tau) \neq 0$, when $\tau=0$ $R_{AA}(\tau)+R_{BB}(\tau)=0$, when $\tau \neq 0$ (3)

Because of the above-described autocorrelation characteristics, the complementary code can reduce the peak sidelobe levels with a shorter code length. Therefore, the use of a complementary code having a short code length can reduce the reception dynamic range in a radar apparatus even in the case where it receives a signal obtained through mixing of reflection waves coming from a nearby target and reflection waves coming from a distant target.

Embodiment 1

Figure 2:
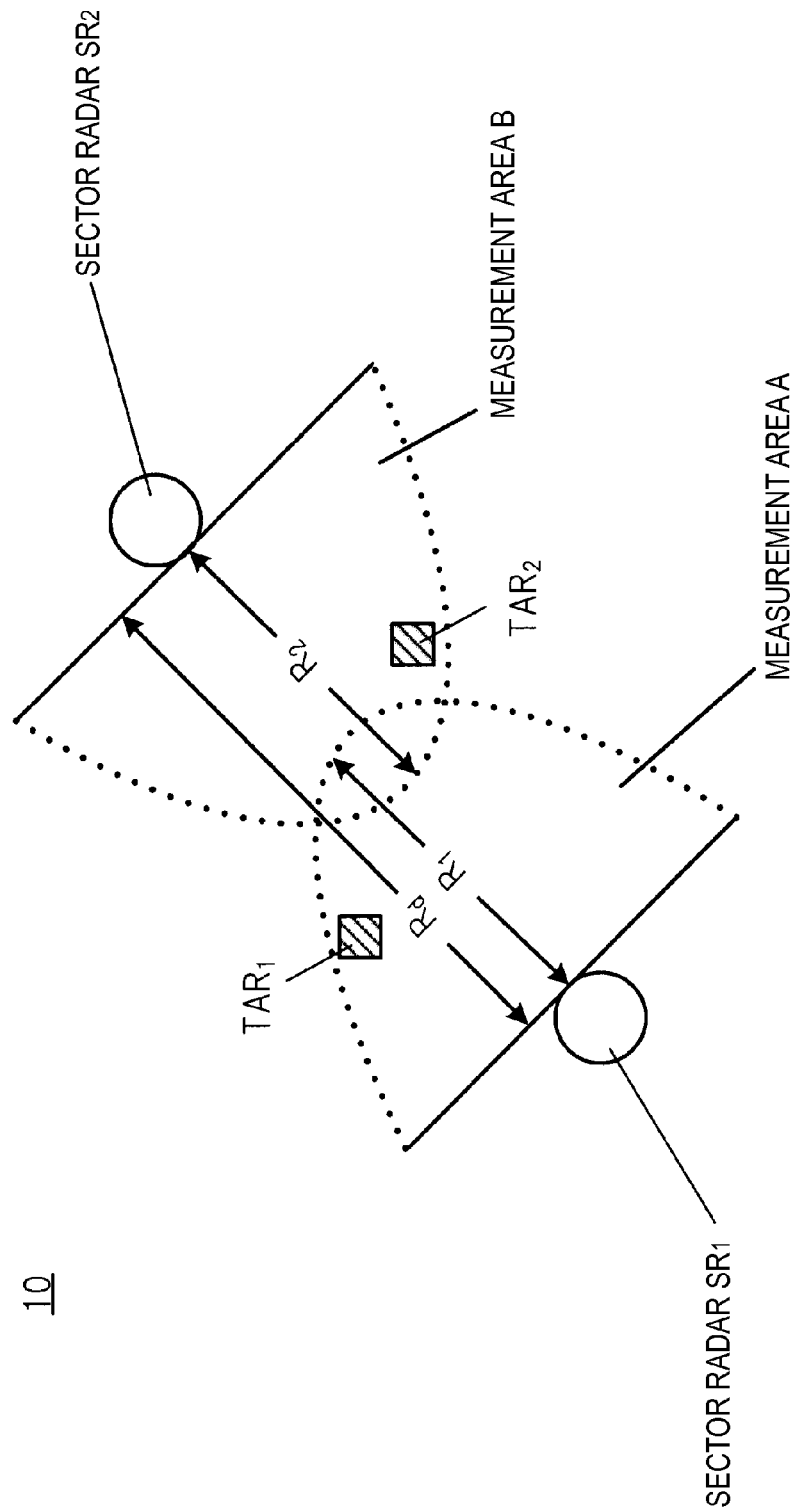
FIG. 2 illustrates sector radars which constitute a radar apparatus according to a first embodiment and measurement ranges of the respective sector radars.

First, a radar apparatus according to a first embodiment of the disclosure will be described with reference to the drawings. FIG. 2 illustrates sector radars $SR_1$ and $SR_2$ which constitute the radar apparatus 10 according to the first embodiment and measurement ranges of the respective sector radars $SR_1$ and $SR_2$. The radar apparatus 10 is configured so as to include plural sector radars, for example, the two sector radars $SR_1$ and $SR_2$.

Reception signals received by the sector radar $SR_1$ include a reflection wave signal that is produced in such a manner that a radar transmission signal transmitted from the sector radar $SR_1$ is reflected by a target $TAR_1$ and a radar transmission signal that is an interference wave signal transmitted from the sector radar $SR_2$. Likewise, reception signals received by the sector radar $SR_2$ include a reflection wave signal that is produced in such a manner that a radar transmission signal transmitted from the sector radar $SR_2$ is reflected by a target $TAR_2$ and a radar transmission signal that is an interference wave signal transmitted from the sector radar $SR_2$.

The sector radars $SR_1$ and $SR_2$ shown in FIG. 2 are installed being opposed to each other so that measurement areas A and B of the respective sector radars $SR_1$ and $SR_2$ are arranged so as to form approximately a single straight line and to overlap with each other. Inequalities (4) hold between the distance Rd between the sector radars $SR_1$ and $SR_2$ and the maximum measurement distances $R_1$ and $R_2$ of the respective sector radars $SR_1$ and $SR_2$.

[Formula 4]

$$\frac{R_d}{2} < R_1, \frac{R_d}{2} < R_2 \quad (4)$$

In the following description, it is assumed that the sector radars $SR_1$ and $SR_2$ have the same transmission cycle $T_r$ and the same transmission interval $T_w$ but transmit radar transmission signals in an asynchronous manner. In FIG. 2, for the sake of convenience, the two different targets $TAR_1$ and $TAR_2$ exist in the respective measurement areas A and B. However, for example, one target $TAR_1$ may exist in the measurement area A or B or the overlap range of the measurement areas A and B.

Figure 3:
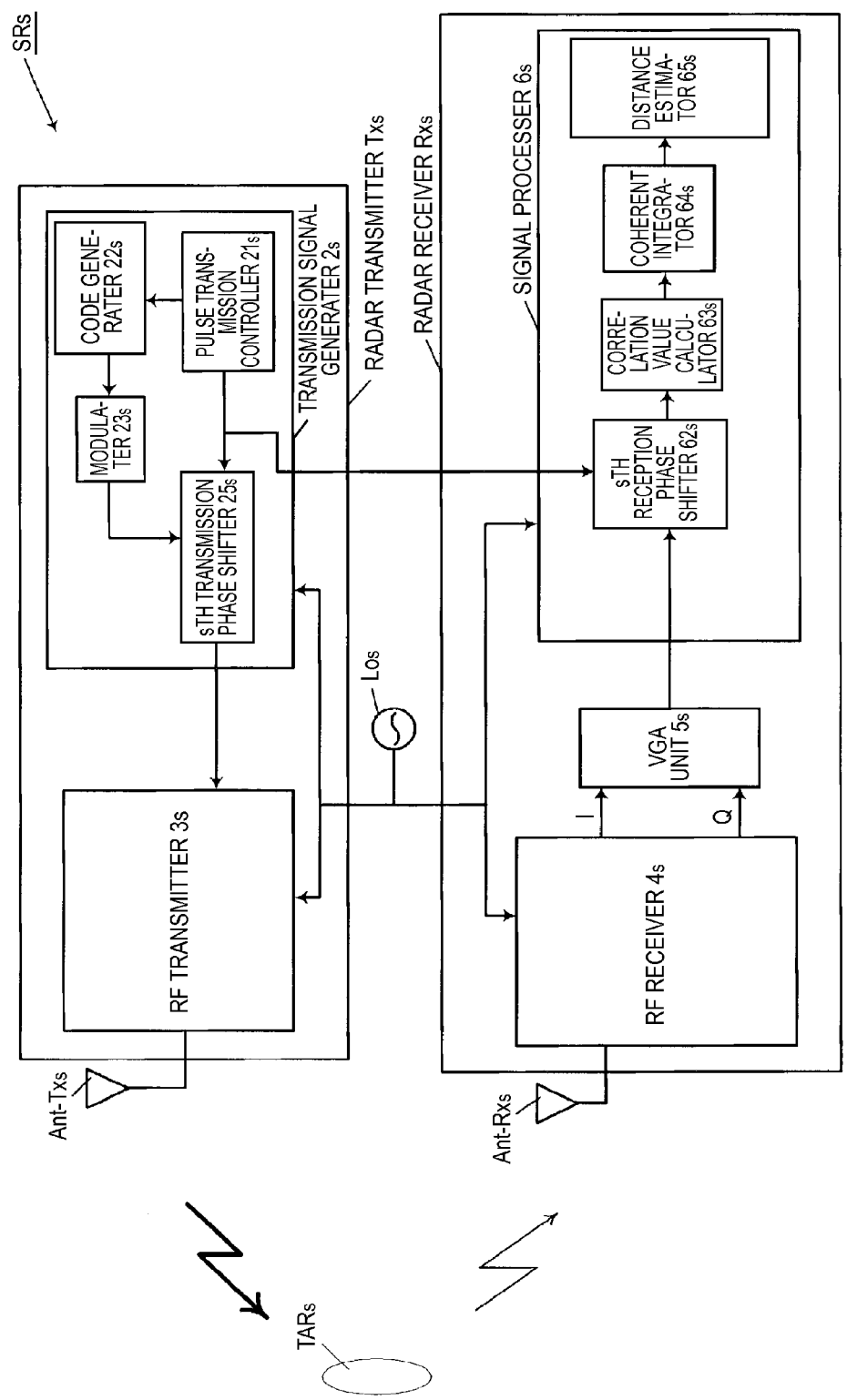
FIG. 3 is a block diagram showing, in a simplified manner, the internal configuration of each sector radar $SR_s$ (s=1, 2) of the radar apparatus according to the first embodiment.
Figure 4:
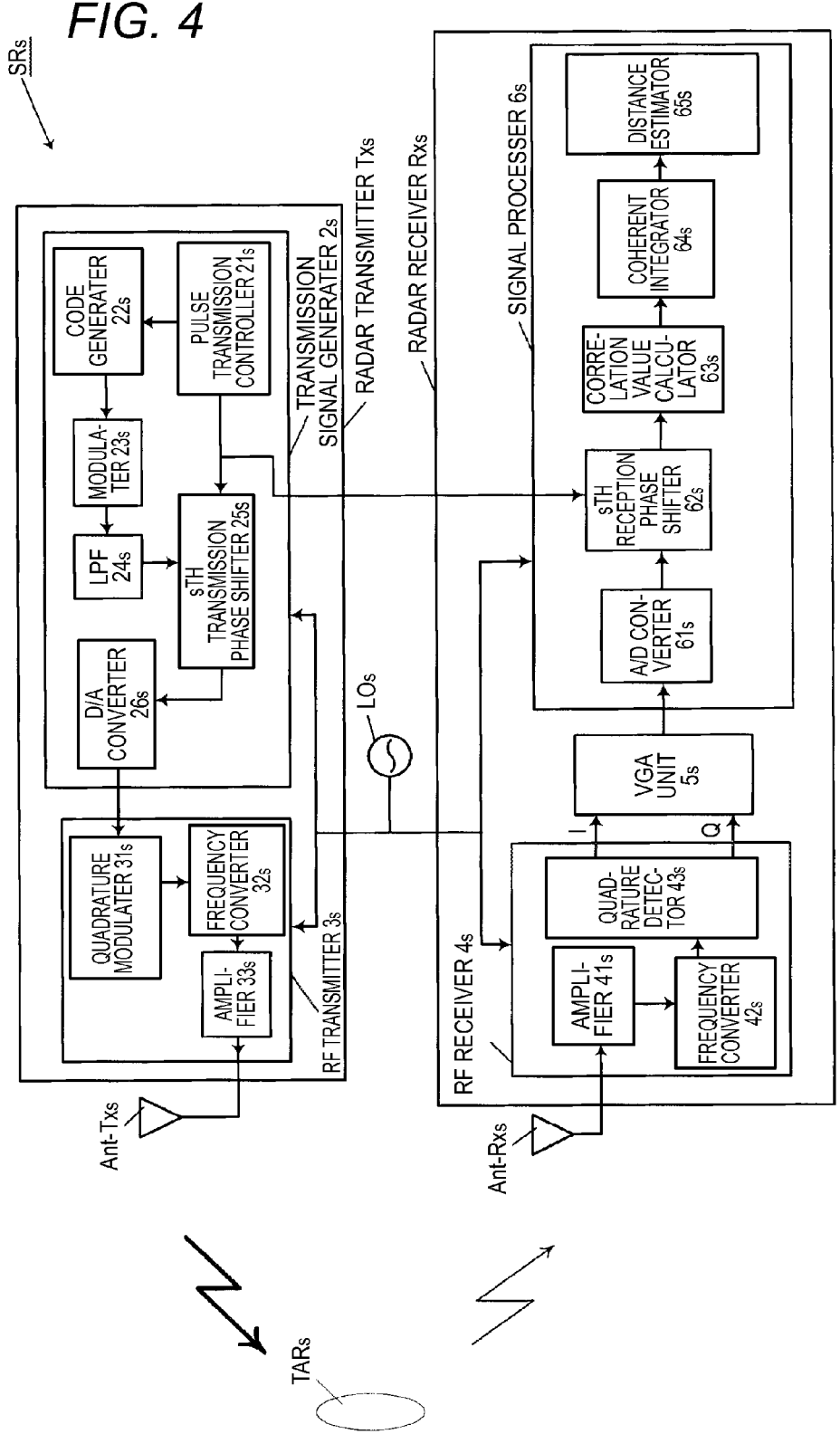
FIG. 4 is a block diagram showing, in detail, the internal configuration of each sector radar $SR_s$ (s=1, 2) of the radar apparatus according to the first embodiment.
Figure 5:
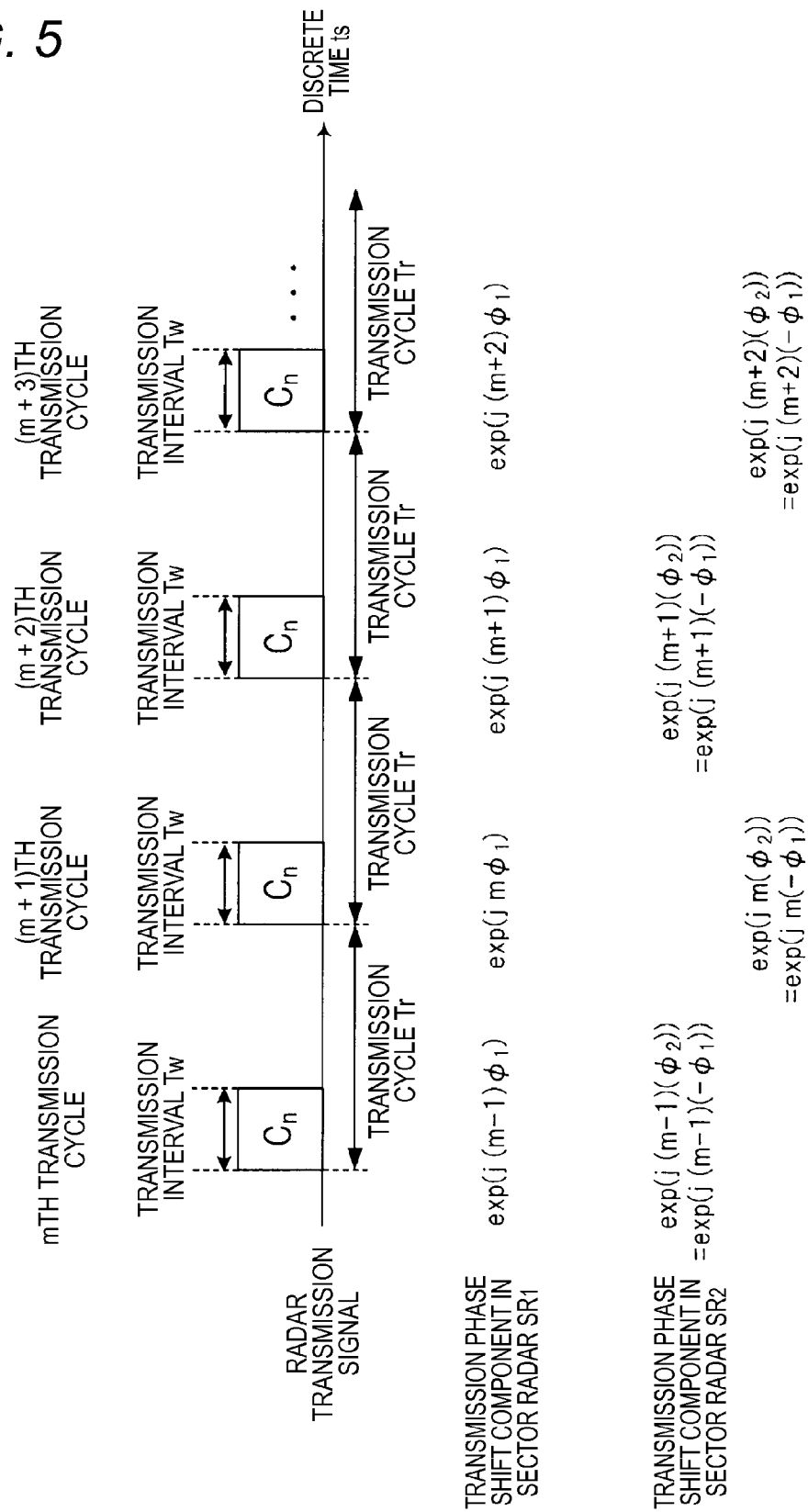
FIG. 5 is an explanatory diagram showing relationships between individual transmission intervals, individual transmission cycles, and individual transmission phase shift components of each sector radar Sly (s=1, 2) of the radar apparatus according to the first embodiment.

How each of the sector radars $SR_1$ and $SR_2$ constituting the radar apparatus 10 according to the first embodiment is configured and operates will be described with reference to FIGS. 3-5. FIG. 3 is a block diagram showing, in a simplified manner, the internal configuration of each sector radar $SR_s$ (s=1, 2) of the radar apparatus 10 according to the first embodiment. FIG. 4 is a block diagram showing, in detail, the internal configuration of each sector radar $SR_s$ (s=1, 2) of the radar apparatus 10 according to the first embodiment. FIG. 5 is an explanatory diagram showing relationships between individual transmission intervals, individual transmission cycles, and individual transmission phase shift components of each sector radar $SR_s$ (s=1, 2) of the radar apparatus 10 according to the first embodiment.

In each of the following embodiments, to simplify the description, operations that are common to the sector radars $SR_1$ and $SR_2$ will be described in a generic manner and different operations of the sector radars $SR_1$ and $SR_2$ will be described individually. Parameter s takes a value 1 or 2 and represents the ordinal number of each sector radar.

The sector radar $SR_s$ transmits, from a transmission antenna Ant-$Tx_s$, a radio frequency radar transmission signal generated by a radar transmitter $Tx_s$. The sector radar SRs receives, by a reception antenna Ant-$Rx_s$, a reflection wave signal, reflected by a target $TAR_s$, of the radar transmission signal. The sector radar SRs detects presence/absence of a target $TAR_s$ by performing signal processing on the reflection wave signal received by the reception antenna Ant-$Rx_s$. The target $TAR_s$ is an object to be detected by the sector radar $SR_s$ and is an automobile, a person, or the like. This also applies to each of the following embodiments.

First, how the individual units of the sector radar $SR_s$ are configured will be described in a simplified manner.

The sector radar $SR_s$ shown in FIG. 3 is configured so as to include a reference signal oscillator $Lo_s$, the radar transmitter $Tx_s$, and the radar receiver $Rx_s$. The radar transmitter $Tx_s$ is configured so as to include a transmission signal generater $2_s$ and a RF transmitter $3_s$ which is connected to the transmission antenna Ant-Tx$_s$. The transmission signal generator $2_s$ is configured so as to include a pulse transmission controller $21_s$, a code generator $22_s$, a modulator $23_s$ and an sth transmission phase shifter $25_s$. In each of the embodiments including this embodiment, each transmission antenna or each reception antenna may be configured using a transmission antenna element or a reception antenna element.

The radar transmitter Tx$_s$ and the radar receiver Rx$_s$ are connected to the reference signal oscillator Lo$_s$ and are supplied with a reference signal from the reference signal oscillator Lo$_s$, whereby processing performed by the radar transmitter Tx$_s$ and processing performed by the radar receiver Rx$_s$ are synchronized with each other.

The radar receiver Rx$_s$ is configured so as to have a RF receiver $4_s$, a VGA (variable gain amplifier) unit $5_s$, and a signal processer $6_s$. The signal processer $6_s$ is configured so as to include an sth reception phase shifter $62_s$, a correlation value calculator $63_s$, a coherent integrator $64_s$, and a distance estimator $65_s$.

(Radar Transmitter)

Next, how the individual units of the radar transmitter Tx are configured will be described in detail with reference to FIG. 4.

The transmission signal generator $2_s$ is configured so as to include the pulse transmission controller $21_s$, the code generator $22_s$, the modulator $23_s$, an LPF (lowpass filter) $24_s$, the sth transmission phase shifter $25_s$, and a D/A (digital to analog) converter $26_s$. Although in FIG. 4 the transmission signal generator $2_s$ includes the LPF $24_s$, the LPF $24_s$ may be provided in the radar transmitter Tx$_s$ independently of the transmission signal generator $2_s$. The RF transmitter $3_s$ is configured so as to include a quadrature modulator $31_s$, frequency converter $32_s$, and an amplifier $33_s$.

Next, how the individual units of the radar transmitter Tx$_s$ operate will be described in detail.

The transmission signal generator $2_s$ generates a transmission reference clock signal by multiplying the reference signal generated by the reference signal oscillator Lo$_s$ by a prescribed number. The individual units of the transmission signal generator 2, operate on the basis of the generated transmission reference clock signal. Let $f_{TxBB}$ represent the transmission reference clock frequency; then the transmission cycle $T_r$ is expressed as an integer $N_r$ multiple of a discrete time interval $1/f_{TxBB}$ which is determined by the transmission reference clock frequency $f_{TxBB}$ (see Equation (5)). The transmission reference clock frequency $f_{TxBB}$ is a nominal value and, in actuality, includes a frequency error that varies depending on the radar transmitter Tx$_s$.

[Formula 5]

$$T_r = N_r \times \frac{1}{f_{TxBB}} \tag{5}$$

The transmission signal generator $2_s$ periodically generates a baseband transmission signal $G_s(t_s)$ (see Equation (6)) by modulating a code sequence $C_n$ having a code length L on the basis of a transmission timing signal (for a radar transmission signal) which is output from the pulse transmission controller $21_s$ every transmission cycle $T_r$. Parameter n takes values 1 to L, and parameter L represents the code length of the code sequence $C_n$. Parameter j is the imaginary number unit which satisfies $j^2=-1$. Parameter $t_s$ represents discrete time.

[Formula 6]

$$G_s(t_s)=I_s(t_s)+jQ_s(t_s) \tag{6}$$

As shown in FIG. 5, the transmission signal $G_s(t_s)$ is such that, for example, each code element of the code sequence $C_n$ is modulated using $N_o$ samples of the transmission reference clock signal in the transmission interval $T_w(s)$ of each transmission cycle $T_r$. Therefore, in each transmission interval $T_w$, modulation is done using $N_w(=N_o \times L)$ samples. In the silent interval $(T_r-T_w)$ (s) of each transmission cycle $T_r$, modulation is done using $N_u$ ($=N_r-N_w$) samples. Therefore, the transmission signal $G_s(t_s)$ of Equation (6) is expressed as Equation (7):

[Formula 7]

$$G_s(N_r(m_s-1)+t_s)=I_s(N_r(m_s-1)+t_s)+jQ_s(N_r(m_s-1)+t_s) \tag{7}$$

The pulse transmission controller $21_s$ generates a transmission timing signal for a radio-frequency radar transmission signal every transmission cycle $T_r$ and outputs it to each of the code generator $22_s$, the sth transmission phase shifter $25_s$, and the sth reception phase shifter $62_s$.

The code generator $22_s$ generates a transmission code of the code sequence $C_n$ having the code length L on the basis of a transmission timing signal that is output from the pulse transmission controller $21_s$ every transmission cycle $T_r$. The code generator $22_s$ outputs the generated transmission code of the code sequence $C_n$ to the modulater $23_s$. That is, the single code generator $22_s$ generates a single code sequence.

For example, the elements of the code sequence $C_n$ are formed using two values [−1, 1] or four values [1, −1, j, −j]. The transmission code is a code sequence of one of, for example, a Barker code sequence, an M-sequence code, and a Gold code sequence which provides a low range sidelobe characteristic. In the following description, for the sake of convenience, the transmission code of the code sequence $C_n$ will be written as a transmission code $C_n$.

The modulater $23_s$ receives the transmission code $C_n$ that is output from the code generator $22_s$. The modulater $23_s$ generates a baseband transmission signal $G_s(t_s)$ of Equation (6) by pulse-modulating the received transmission code $C_n$. The pulse modulation is amplitude modulation (ASK) or phase modulation (PSK). This also applies to each of the following embodiments.

For example, where the code sequence $C_n$ uses two values [−1, 1], the phase modulation (PSK) becomes BPSK (binary phase shift keying). Where the code sequence $C_n$ uses four values [1, −1, j, −j], the phase modulation (PSK) becomes QPSK (quadrature phase shift keying) or 4-phase PSK. That is, in the phase modulation (PSK), prescribed modulation symbols of a constellation on the IQ plane are assigned.

In the baseband transmission signal $G_s(t_s)$ of Equation (6), $I_s(t_s)$ and $Q_s(t_s)$ represent the in-phase component and the quadrate component of a modulation signal, respectively. The modulater $23_s$ outputs a transmission signal $G_s(t_s)$, in a preset limited band or lower, of the generated transmission signal $G_s(t_s)$ to the sth transmission phase shifter $25_s$ via the LPF $24_s$. The LPF $24_s$ may be omitted in the transmission signal generator $2_s$. This also applies to each of the following embodiments.

Now, how the sth transmission phase shifter $25_s$ of the specific sector radar SR$_s$ (s=1) will be described. The sth transmission phase shifter $25_s$ receives the transmission signal $G_s(t_s)$ that is output from the modulater 23, or the LPF $24_s$. The transmission phase shifter $25_s$ gives a prescribed transmission phase shift to the received transmission signal $G_s(t_s)$ every transmission cycle $T_r$ on the basis of a transmission timing signal that is output from the pulse transmission controller $21_s$ (see FIG. 5).

Figure 8:
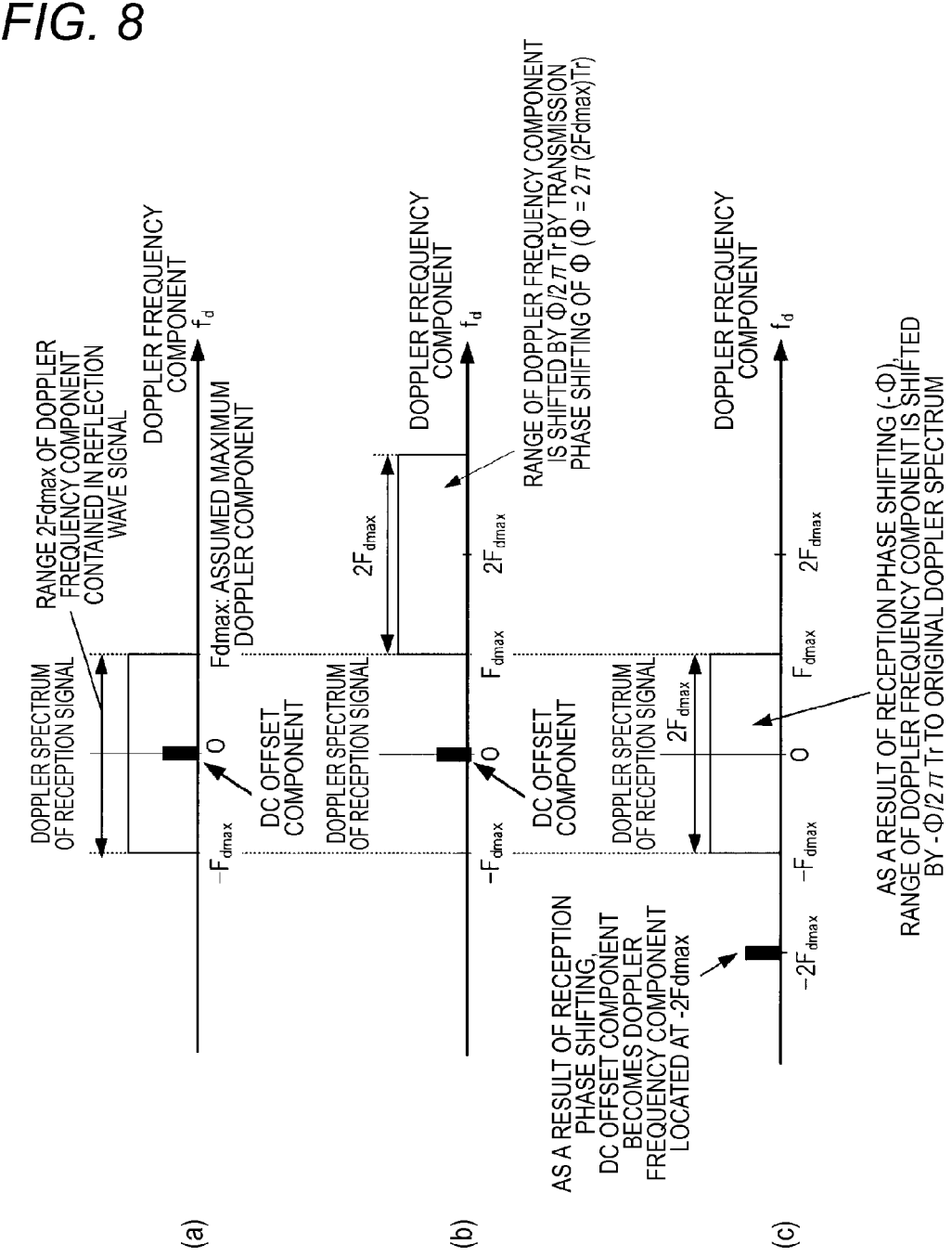
FIG. 8(a) is an explanatory diagram showing a relationship between a DC offset component and a Doppler frequency component which are contained in a reception signal of a conventional radar apparatus.
FIG. 8(b) is an explanatory diagram showing a relationship between a DC offset component and a Doppler frequency component which are contained in a reception signal, before reception phase shifting, of each sector radar $ST_s$ of the radar apparatus of this disclosure.
FIG. 8(c) is an explanatory diagram showing a relationship between a DC offset component and a Doppler frequency component which are contained in a reception signal, after the reception phase shifting, of each sector radar $ST_s$ of the radar apparatus of this disclosure.

More specifically, based on a transmission timing signal that is supplied from the pulse transmission controller $21_s$ in an $m_s$th transmission cycle $T_r$, the sth transmission phase shifter $25_s$ gives the transmission signal $G_s(t_s)$ a transmission phase shift $\exp(j(m-1)\phi)$ corresponding to the ordinal number of the transmission cycle $T_r$ (see Equation (8)). Parameter $m_s$ represents the ordinal number of the transmission cycle $T_r$. Parameter $\phi_s$ represents a phase rotation amount (e.g., 90°) given by the sth transmission phase shifter $25_s$, and it is preferable that parameter $\phi_s$ satisfy the relationship of Inequality (9). The sth transmission phase shifter $25_s$ outputs a transmission-phase-shift-added transmission signal $GP_s(N_r(m_s-1)+t_s)$ to the D/A converter $26_s$. Parameter $F_{dmax}$ will be described later with reference to FIG. 8.

[Formula 8]

$$GP_1(N_r(m_1-1)+t_1)=\exp(j(m_1-1)\phi_1)G_1(N_r(m_1-1)+t_1) \quad (8)$$

[Formula 9]

$$|\phi_s|\geq 2\pi\times(2F_{dmax})\times T_w \quad (9)$$

The manner of operation of the sth transmission phase shifter $25_s$ of the sector radar $SR_s$ (s=2) is different from that of the sth transmission phase shifter $25_s$ of the sector radar $SR_s$ (s=1) in that parameter $\phi_2$ representing the phase rotation amount in Equation (10) is different from parameter $\phi_1$. For example, parameters $\phi_1$ and $\phi_2$ are 90° and −90°, respectively.

Furthermore, parameter $\phi_1$ in the transmission phase shift given by the sth transmission phase shifter $25_s$ of the sector radar $SR_1$ and parameter $\phi_2$ in the transmission phase shift given by the sth transmission phase shifter $25_s$ of the sector radar $SR_2$ are opposite in phase ($\phi_1=\phi_2$).

[Formula 10]

$$GP_2(N_r(m_2-1)+t_2)=\exp(j(m_2-1)\phi_2)G_2(m_2-1)+t_2) \quad (10)$$

The D/A converter $26_s$ converts the digital transmission signal $GP_s(N_r(m_s-1)+t_s)$ that is output from the sth transmission phase shifter $25_s$ into an analog transmission signal. The D/A converter $26_s$ outputs the analog transmission signal to the RF transmitter $3_s$.

The RF transmitter $3_s$ generates a transmission reference clock signal in a carrier frequency band by multiplying the reference signal generated by the reference signal oscillator $Lo_s$ by a prescribed number. The individual units of the RF transmitter $3_s$ operate on the basis of the generated transmission reference clock signal.

The quadrature modulater $31_s$ receives the transmission signal from the D/A converter $26_s$ and quadrature-modulates it. The quadrature modulater $31_s$ outputs the quadrature-modulated transmission signal to the frequency converter $32_s$.

The frequency converter $32_s$ receives the transmission signal that is output from the quadrature modulater $31_s$, and up-converts the baseband transmission signal using the received transmission signal and the transmission reference clock signal. The frequency converter $32_s$ thus generates a radio-frequency radar transmission signal. The frequency converter $32_s$ outputs the generated radar transmission signal to the amplifier $33_s$.

The amplifier $33_s$ receives the radar transmission signal that is output from the frequency converter $32_s$, amplifies the level of the received radar transmission signal to a prescribed level, and outputs the amplified signal to the transmission antenna Ant-Tx$_s$. The amplified radar transmission signal is transmitted, that is, radiated to the space, from the transmission antenna Ant-Tx$_s$.

The transmission antenna Ant-Tx$_s$ transmits, that is, radiates to the space, the radar transmission signal that is output from the RF transmitter $3_s$. As shown in FIG. 5, the radar transmission signal is transmitted during the transmission interval $T_w$ of each transmission cycle $T_r$ and is not transmitted during the silent interval $T_r-T_w$.

The common reference signal generated by the reference signal oscillator $Lo_s$ is supplied to the RF transmitter $3_s$ and the RF receiver $4_s$. This allows the RF transmitter $3_s$ and the RF receiver $4_s$ to operate in synchronism with each other.

(Radar Receiver)

Next, how the individual units of the radar receiver Rx$_s$ are configured will be described in detail with reference to FIG. 4.

As shown in FIG. 4, the radar receiver Rx$_s$ is configured so as to include the RF receiver $4_s$ to which the reception antenna Ant-Rx$_s$ is connected, the VGA unit $5_s$, and the signal processor $6_s$. The RF receiver $4_s$ is configured so as to include an amplifier $41_s$, a frequency converter $42_s$, and a quadrature detector $43_s$. The signal processor 6, is configured so as to include an A/D converter $61_s$, the sth reception phase shifter $62_s$, the correlation value calculator $63_s$, the coherent integrator $64_s$, and the distance estimator $65_s$. Each unit of the signal processor $6_s$ performs a calculation periodically with each transmission cycle $T_r$ as a signal processing interval.

Next, how the individual units of the radar receiver Rx$_s$ operate will be described in detail.

The reception antenna Ant-Rx$_s$ receives a reflection wave signal that is a radar transmission signal transmitted from the radar transmitter Tx$_s$ and reflected by a target TAR$_s$ and a radar transmission signal coming from the other sector radar which is installed so as to be opposed to the sector radar SR$_s$ concerned. Each reception signal received by the reception antenna Ant-Rx$_s$ is input to the RF receiver $4_s$.

Like the RF transmitter $3_s$, the RF receiver $4_s$ generates a reception reference clock signal in the carrier frequency band by multiplying the reference signal generated by the reference signal oscillator $Lo_s$ by a prescribed number.

The amplifier $41_s$ receives the radio-frequency reception signal received by the reception antenna Ant-Rx$_s$, amplifies the level of the received reception signal, and outputs the resulting signal to the frequency converter $42_s$.

The frequency converter $42_s$ receives the radio-frequency reception signal that is output from the amplifier $41_s$, and down-converts the radio-frequency reception signal into a baseband reception signal using the received radio-frequency reception signal and the reception reference clock signal. The frequency converter $42_s$ thus generates the baseband reception signal and outputs the generated baseband reception signal to the quadrature detector $43_s$.

The quadrature detector $43_s$ generates a baseband reception signal consisting of an in-phase signal (I signal) and a quadrate signal (Q signal) by quadrature-detecting the baseband reception signal that is output from the frequency converter $42_s$. The quadrature detector $43_s$ outputs the generated reception signal to the VGA unit $5_s$.

The VGA unit $5_s$ receives the baseband reception signal that is output from the quadrature detector 43 and includes the I signal and the Q signal, and adjusts the output level of the received baseband reception signal into an input range (dynamic range) of the A/D converter $61_s$.

The VGA unit $5_s$ outputs the output-level-adjusted baseband reception signal including the I signal and the Q signal to the A/D converter $61_s$. In the embodiment, to simplify the description, it is assumed that the gain of the VGA unit $5_s$ is adjusted in advance so that the output level of a reception signal falls within the input range (dynamic range) of the A/D converter $61_s$.

Like the RF receiver $4_s$, the signal processor $6_s$ generates a reception reference clock signal by multiplying the reference signal generated by the reference signal oscillator $Lo_s$ by a prescribed number. The individual units of the signal processor $6_s$ operate on the basis of the generated reception reference clock signal.

Let $f_{RxBB}$ represent the reception reference clock frequency; then the transmission cycle $T_r$ is expressed as an integer $N_v$ multiple of a discrete time interval $1/f_{RxBB}$ which is determined by the reception reference clock frequency $f_{RxBB}$ (see Equation (11)). It is assumed that the transmission reference clock frequency $f_{TxBB}$ is equal to an integer $N_{TR}$ multiple of the reception reference clock frequency $f_{RxBB}$ (see Equation (12)). The reception reference clock frequency $f_{RxBB}$ is a nominal value and, in actuality, includes a frequency error that varies depending on the radar receiver $Rx_s$.

[Formula 11]

$$T_r = N_v \times \frac{1}{f_{RxBB}} \qquad (11)$$

[Formula 12]

$$f_{TxBB} = N_{TR} \times f_{RxBB} \qquad (12)$$

The A/D converter $61_s$ receives the reception signal that is output from the VGA unit $5_s$ and includes the I signal and the Q signal, and converts the analog data reception signal into digital data by sampling the received reception signal including the I signal and the Q signal every discrete time $1/f_{RxBB}$ on the basis of the reception reference clock frequency $f_{RxBB}$.

The A/D converter $61_s$ outputs the digital data reception signal obtained through the conversion done every discrete time $k_s$ to the sth reception phase shifter $62_s$ in the form of discrete sample values. A reception signal $x_s(k_s)$ which is a converted, discrete sample value is expressed as a complex number (see Equation (13)) using an I signal $Ir_s(k_s)$ and a Q signal $Qr_s(k_s)$ which are discrete sample values at a discrete time $k_s$:

[Formula 13]

$$x_s(k_s(=Ir_s(k_s)+jQr_s(k_s)) \qquad (13)$$

Figure 6:
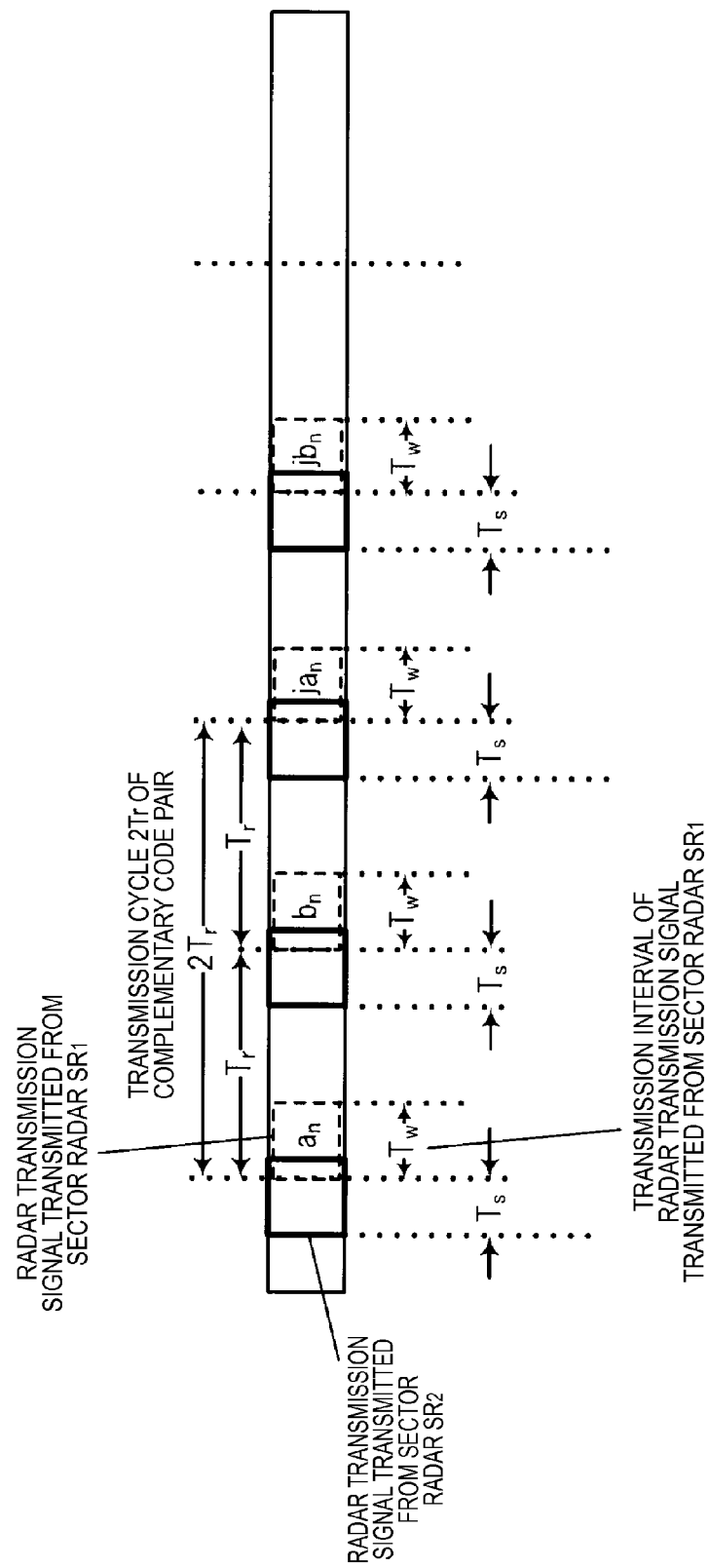
FIG. 6 is an explanatory diagram illustrating a measurement period of the sector radar $SR_1$ in a case that each transmission interval of a radar transmission signal transmitted from the sector radar $SR_2$ includes the start of the corresponding transmission cycle of a radar transmission signal transmitted from the sector radar $SR_1$.
Figure 7:
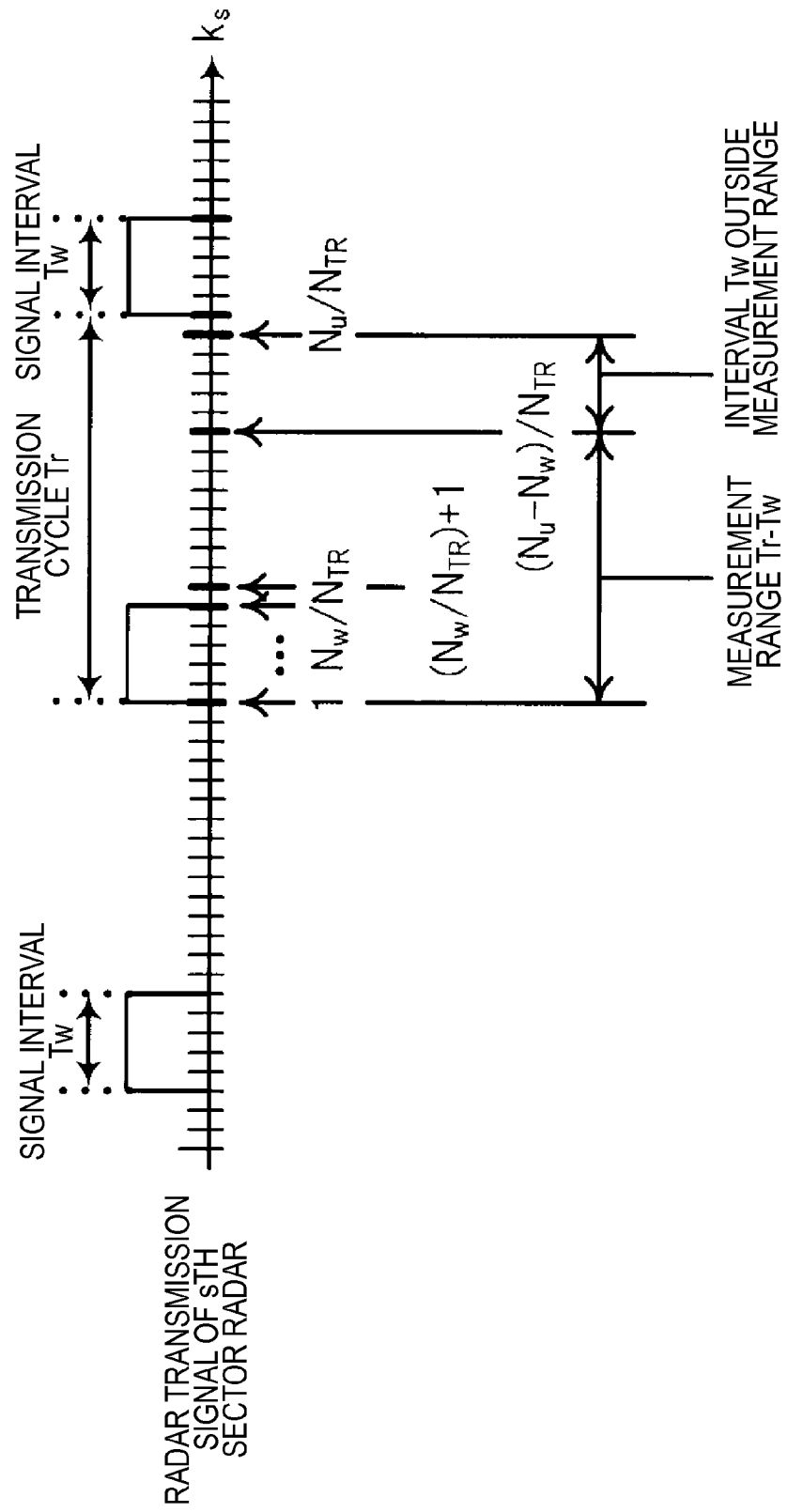
FIG. 7 is an explanatory diagram illustrating a measurement range of the sth sector radar Sly.

Now, a measurement range of the radar apparatus 10 will be described with reference to FIGS. 6 and 7. FIG. 6 is an explanatory diagram illustrating a measurement period of the sector radar $SR_1$ in a case that each transmission interval of a radar transmission signal transmitted from the sector radar $SR_2$ includes the start of the corresponding transmission cycle of a radar transmission signal transmitted from the sector radar $SR_1$. FIG. 7 is an explanatory diagram illustrating a measurement range of the sth sector radar $SR_s$, and illustrates transmission intervals $T_w$, transmission cycles $T_r$, and measurement ranges $T_r$-$T_w$ of a radar transmission signal, in a specific manner using discrete times ks.

To simplify the description to be made with reference to FIG. 6, it is assumed that the transmission code (indicated by broken lines) of the radar transmission signal is a complementary code and radar transmission signals of a pair of code sequences $a_n$ and $b_n$ of the complementary code are output in transmission intervals $T_w$ of respective transmission cycles $T_r$ in units of two transmission cycles.

Where each transmission interval of a radar transmission signal (solid line) transmitted from the sector radar $SR_2$ includes the start of the corresponding transmission cycle $T_r$ of a radar transmission signal transmitted from the sector radar $SR_1$, transmission phase shifts before and after the start of a transmission cycle $T_r$ are different from each other and reception phase shifts before and after the start of the transmission cycle $T_r$ are different from each other. In the radar apparatus 10, where each transmission interval of a radar transmission signal transmitted from the sector radar $SR_2$ includes the start of the corresponding transmission cycle $T_r$ of a radar transmission signal transmitted from the sector radar $SR_1$, the interval from the start of each transmission interval of the radar transmission signal transmitted from the sector radar $SR_2$ to the start of the corresponding transmission cycle $T_r$ of the sector radar $SR_1$ is excluded from the measurement range.

That is, in the radar apparatus 10, the interval $T_s$ from the start of each transmission interval of the radar transmission signal transmitted from the sector radar $SR_2$ to the start of the corresponding transmission cycle $T_r$ of the radar transmission signal transmitted from the sector radar $SR_1$ is excluded from the measurement range. In FIG. 7, the transmission interval $T_w$ corresponds to discrete times $k_s=1$ to $N_w/N_{TR}$, the measurement range interval $T_r$-$T_w$ corresponds to discrete times $k_s=1$ to $(N_u-N_w)/N_{TR}$ which include the transmission interval $T_w$, and the interval $T_s (=T_w)$ which is outside the measurement range corresponds to discrete times $k_s=(N_u-N_w)/N_{TR}$ to $N_u/N_{TR}$.

The discrete time $k_s$ represents a sampling time of the A/D converter $61_s$; discrete times $k_s=1$ and $k=N_v$ represent a start time point and an end time point of each transmission cycle $T_r$, respectively. Although the discrete time $k_s$ can take values 1 to $N_v$, in substance it takes values 1 to $(N_u-N_w)/N_{TR}$ because the interval $T_s$ outside the measurement range of the transmission cycle $T_r$ of the radar apparatus 10 is not included in the measurement range.

In an $m_s$th transmission cycle $T_r$, the reception signal $x_s(k_s)$ of Equation (13) that is output from the A/D converter $61_s$ can be given by Equation (14) as a complex baseband signal $X_s(N_v(m_s-1)+k_s)$:

[Formula 14]

$$X_s(N_s(m_s-1)+k_s)=I_{rs}(N_s(m_s-1)+k_s)+jQ_{rs}(N_v(m_s-1)+k_s) \qquad (14)$$

Now, how the sth reception phase shifter $62_s$ of the specific sector radar $SR_s$ (s=1) will be described. The sth reception phase shifter $62_s$ receives a reception signal $X_s(N_v(m_s-1)+k_s)$ that is output from the A/D converter $61_s$. The sth reception phase shifter $62_s$ gives a reception phase shift that is opposite in direction to the phase shift component that was given by the sth transmission phase shifter $25_s$ to the received reception signal $X(N_v(m-1)+k_s)$ every transmission cycle on the basis of a transmission timing signal that is output from the pulse transmission controller $21_s$ every transmission cycle $T_r$.

More specifically, based on a transmission timing signal that is supplied from the pulse transmission controller $21_s$ in an $m_s$th transmission cycle $T_r$, the sth reception phase shifter $62_s$ gives a reception phase shift $\exp(j(m_s-1)(-\phi_s))$ corresponding to the ordinal number of the transmission cycle $T_r$ to the reception signal $X_s(N_v(m_s-1)+k_s)$ every transmission cycle (see Equation (15)). The sth reception phase shifter $62_s$ outputs a reception-phase-shift-added reception signal $XP_s(N_v(m_s-1)+k_s)$ to the correlation value calculator $63_s$.

[Formula 15]

$$XP_1(N_v(m_1-1)+k_1)=\exp(-j(m_1-1)\phi_1)X_1(N_v(m_1-1)+k_1) \quad (15)$$

The sth reception phase shifter $62_s$ of the sector radar $SR_s$ (s=2) operates differently from that of the sector radar $SR_s$ (s=1) in that the reception phase shift $\phi_2$ is different from $\phi_1$ (see Equation (16)). For example, parameters $\phi_1$ and $\phi_2$ are 90° and −90°, respectively.

[Formula 16]

$$XP_2(N_vc(m_2-1)+k_2)=\exp(-j(m_2-1)\phi_2)X_2(N_v(m_2-1)+k_2) \quad (16)$$

The correlation value calculator $63_s$ receives the reception signal $XP_s(N_v(m_s-1)+k_s)$ that is output from the sth reception phase shifter $62_s$. Based on the reception reference clock signal obtained by multiplying the reference signal by the prescribed number, the correlation value calculator $63_s$ periodically generates, for discrete times $k_s$, a transmission code of the code sequence $C_n$ having the code length L transmitted in the $m_s$th transmission cycle $T_r$.

The correlation value calculator $63_s$ calculates sliding correlation values $AC_s(k_s, m_s)$ between the received reception signal $XP_s(N_v(m_s-1)+k_s)$ and the transmission code $C_n$. Each sliding correlation value $AC_s(k\ m_s)$ is calculated by performing a sliding correlation operation on the transmission code and the reception signal at each discrete time $k_s$ in the $m_s$th transmission cycle $T_r$.

More specifically, the correlation value calculator $63_s$ calculates sliding correlation values $AC_s(k_s, m_s)$ at discrete times $k_s$ (=1 to $(N_u-N_w)/N_{TR}$) in an $m_s$th transmission cycle $T_r$ (each transmission cycle $T_r$) according to Equation (17). The correlation value calculator $63_s$ outputs the sliding correlation values $AC_s(k_s, m_s)$ calculated according to Equation (17) to the coherent integrator $64_s$. In Equation (17), the asterisk "*" is the complex conjugate operator.

[Formula 17]

$$AC_s(k_s, m_s) = \sum_{n=1}^{L} XP_s\left(N_v(m_s-1) + \frac{N_o(n-1)}{N_{TR}} + k_s\right)C_n^* \quad (17)$$

Although in each of the embodiments including this embodiment the correlation value calculator $63_s$ performs calculations at discrete times $k_s=1$ to $(N_u-N_w)/N_{TR}$, the measurement range ($k_s$ range) may be narrowed further to, for example, $k_s=N_w/N_{TR}+1$ to $(N_u-N_w)/N_{TR}$ in accordance with the range of presence of a target $TAR_s$ to be measured by the radar apparatus 10. With this measure, in the radar apparatus 10, the amount of calculation of the correlation value calculator $63_s$ can be reduced further. That is, in the radar apparatus 10, the power consumption can be reduced further as a result of reduction in the calculation amount of the signal processor $6_s$.

In the radar apparatus 10, where the correlation value calculator $63_s$ calculates sliding correlation values $AC_s(k_s, m_s)$ at discrete times $k_s=N_w/N_{TR}+1$ to $(N_u-N_w)/N_{TR}$, measurement of a reflection wave signal in each transmission interval $T_w$ of a radar transmission signal transmitted from each sector radar $SR_s$ can be omitted.

In the radar apparatus 10, even if a radar transmission signal transmitted from each sector radar $SR_s$ goes around to enter the radar receiver $Rx_s$ directly, a measurement can be performed with its influence eliminated. With the above restriction of the measurement range (the range of discrete times $k_s$), the coherent integrator $64_s$ and the distance estimator $65_s$ also operate in the same restricted measurement range.

The coherent integrator $64_s$ receives the sliding correlation values $AC_s(k\ m_s)$ that are output from the correlation value calculator $63_s$. The coherent integrator $64_s$ adds together sliding correlation values $AC_s(k\ m_s)$ in a prescribed number (NP) of transmission cycles $T_r$ (a period NP×$T_r$) on the basis of sets of sliding correlation values $AC_s(k\ m_s)$ that have been calculated in the $m_s$th transmission cycle $T_r$ for the respective discrete times $k_s$.

The coherent integrator $64_s$ calculates a $v_s$th coherent integration value $ACC_s(k_s, v_s)$ for each discrete time k by adding together, for each discrete time $k_s$, sliding correlation values $AC_s(k_s, m_s)$ in the prescribed number (NP) of transmission cycles $T_r$ (period NP×$T_r$) according to Equation (18). Parameter NP represents the number of times of coherent integration performed in the coherent integrator $64_s$. Parameter $v_s$ is the ordinal number of each set of NP times of coherent integration. The coherent integrator $64_s$ outputs the calculated coherent integration values $ACC_s(k_s, v_s)$ to the distance estimator $65_s$.

[Formula 18]

$$ACC_s(k_s, v_s) = \sum_{m_s=1}^{NP} AC_s(k_s, NP(v_s-1) + m_s) \quad (18)$$

By setting the prescribed number NP at an integer multiple of $2\pi/\phi_s$ in Equation (18), the coherent integrator $64_s$ can reduce influences of the circuit errors even if a reflection wave signal contains circuit errors such as a DC offset component and IQ imbalance. That is, by setting the prescribed number NP at an integer multiple of $2\pi/\phi_s$ in the sector radar Sly, the radar apparatus 10 can prevent degradation of the target ranging performance even if a reflection wave signal contains circuit errors such as a DC offset component and IQ imbalance. Furthermore, the radar apparatus 10 can improve the reception quality (SNR: signal to noise ratio) of a reflection wave signal by suppressing noise components contained in the reflection wave signal by performing NP times of coherent integration.

FIG. 8(a) is an explanatory diagram showing a relationship between a DC offset component and a Doppler frequency component which are contained in a reception signal of a conventional radar apparatus. FIG. 8(b) is an explanatory diagram showing a relationship between a DC offset component and a Doppler frequency component which are contained in a reception signal, before reception phase shifting, of each sector radar $ST_s$ of the radar apparatus 10 of this disclosure. FIG. 8(c) is an explanatory diagram showing a relationship between a DC offset component and a Doppler frequency component which are contained in a reception signal, after the reception phase shifting, of each sector radar $ST_s$ of the radar apparatus 10 of this disclosure.

Detection, by a pulse radar, of a Doppler frequency component contained in reflection waves coming from a target is disclosed in the following Referential non-patent document 2, for example:
(Referential non-patent document 2) Sang-Dong KIM, Jong-Hun LEE, "A Memory-Efficient Hardware Architecture for a Pulse Doppler Radar Vehicle Detector." IEICE Trans. Fundamentals, Vol. E94-A, No. 5, pp. 1210-1213, 2011.

FIGS. 8(a)-8(c) are of a case that a reception signal contains a DC offset component stationarily. Assuming a moving target $TAR_s$, $f_a$ represents the Doppler frequency of a reflection wave signal reflected from the target $TAR_s$, $f_{dmax}$ represents a maximum value of $f_a$ in the positive direction, and $-F_{dmax}$ represents a maximum value of $f_d$ in the negative direction.

In the reception signal of the conventional radar apparatus shown in FIG. 8(a), a DC offset component appears in a Doppler spectrum in a range ($2F_{dmax}$) of values the Doppler frequency $f_d$ can take in the reflection wave signal. It is therefore difficult to separate the DC offset component and the Doppler spectrum from each other. Therefore, the conventional radar apparatus is affected by the DC offset component, as a result of which the range sidelobe ratio in a reflection wave signal becomes large and the target ranging characteristic is lowered.

The radar transmitter $Tx_s$ of each sector radar $SR_s$ generates a radio-frequency radar transmission signal by giving a transmission phase shift corresponding to each transmission cycle to a baseband transmission signal which uses prescribed code sequences as a compression code.

Let $\phi_s$ and $T_r$ represent the phase rotation amount of the transmission phase shift and the transmission cycle, respectively. Then the Doppler spectrum in the range ($2F_{dmax}$) of values the Doppler frequency $f_d$ can take is shifted by $\phi_s/2\pi T_r$ as a result of the transmission phase shifting (see FIG. 8(b)). FIG. 8(b) is of a case that Equation (19) holds between the phase rotation amount $\phi_s$, the transmission cycle $T_r$, and the maximum Doppler frequency $F_{dmax}$.

With this measure, as shown in FIG. 8(b), each sector radar $SR_s$ can separate the DC offset component and the Doppler spectrum in the range ($2F_{dmax}$) of values the Doppler frequency $f_d$ can take in a reflection wave signal from each other.

[Formula 19]

$$\phi_s = 2\pi \times (2F_{dmax}) \times T_r \quad (19)$$

Furthermore, in each sector radar $SR_s$, the radar transmitter $Tx_s$ converts a radio-frequency reception signal into a baseband reception signal and gives the baseband reception signal a reception phase shift whose phase rotation amount is opposite in direction to that of the transmission phase shift.

That is, as shown in FIG. 8(c), each sector radar $SR_s$ shifts, by $-\phi_s/2\pi T_r$, the DC offset and the Doppler spectrum in the range ($2F_{dmax}$) of values the Doppler frequency $f_d$ can take in the reception signal. As a result, the radar apparatus 10 can separate the DC offset component and the Doppler spectrum from each other and suppress influence of the transmission phase shift on the Doppler spectrum.

In the embodiment, interference between a radar transmission signal transmitted from the sector radar $SR_1$ and a radar transmission signal transmitted from the sector radar $SR_2$ can be suppressed effectively by performing coherent integration every two transmission cycles by means of each coherent integrator $64_s$. A description will be made of how the interference suppression effect is obtained. For example, assume a case that a radar transmission signal transmitted from the sector radar $SR_2$ arrives at the sector radar $SR_1$ as an interference wave signal.

The output of the A/D converter $61_s$ (s=1) is given by Equation (20) in the case where a reception signal of an $m_1$th transmission cycle $T_r$ of the sector radar $SR_1$ and a radar transmission signal (interference wave signal) coming from the sector radar $SR_2$ are involved.

[Formula 20]

$$\begin{aligned} X_1(N_v(m_1-1)+k_1) &= h_{11}GP_1(N_{TR}\{N_v(m_1-1)+k_1-\lfloor \tau_{11}/\Delta_1 \rfloor\}) + \\ & h_{12}GP_2(N_{TR}\{\lfloor \Delta_1\{N_v(m_1-1)+k_1\}/\Delta_2\rfloor - \lfloor \tau_{12}/\Delta_2 \rfloor\}) = \\ & h_{11}GP_1(N_{TR}\{N_v(m_1-1)+k_1-\lfloor \tau_{11}/\Delta_1 \rfloor\}) + \\ & h_{12}GP_2(N_{TR}\{N_v(m_2-1)+N_{delay}\}) \end{aligned} \quad (20)$$

The first term of Equation (20) represents a desired signal component that is transmitted from the radar transmitter $TX_s$ of the sector radar $SR_1$ as a radar transmission signal, reflected by a target $TAR_s$, and received by the radar receiver $RX_s$ of the sector radar $SR_1$. The second term of Equation (20) represents an interference wave signal component that is transmitted from the radar transmitter $TX_s$ of the sector radar $SR_2$ as a radar transmission signal, reflected by the same target $TAR_s$, and received by the radar receiver $RX_s$ of the sector radar $SR_1$.

Parameter $h_{11}$ is an amplitude and phase complex attenuation coefficient of a case that a radar transmission signal transmitted from the sector radar $SR_1$ is received by the sector radar $SR_1$. Parameter $h_{12}$ is an amplitude and phase complex attenuation coefficient of a case that a radar transmission signal transmitted from the sector radar $SR_2$ is received by the sector radar $SR_1$. Parameters $m_2$ and $N_{delay}$ are given by Equations (21) and (22), respectively:

[Formula 21]

$$m_2 = \lfloor \{\lfloor \Delta_1\{N_v(m_1-1)+k_1\}/\Delta_2\rfloor - \lfloor \tau_{12}/\Delta_2 \rfloor\}/N_v \rfloor - 1 \quad (21)$$

[Formula 22]

$$N_{delay} = \mathrm{mod}\{\lfloor \Delta_1\{N_v(m_1-1)+k_1\}/\Delta_2\rfloor - \lfloor \tau_{12}/\Delta_2 \rfloor\}, N_v\} \quad (22)$$

Symbol "$\lfloor x \rfloor$" is an operator of outputting the integer part of a real number x. Parameter $\tau_{11}$ is the delay time that is taken by a radar transmission signal transmitted from the sector radar $SR_1$ to be reflected by a target $TAR_s$ (s=1) and received by the sector radar $SR_1$. Parameter $T_{12}$ is the delay time that is taken by a radar transmission signal transmitted from the sector radar $SR_2$ to be reflected by a target $TAR_s$ (s=2) or travel directly and be received by the sector radar $SR_1$. To simplify the description, no filter response characteristics of the radar transmitter $TX_s$ and the radar receiver $Rx_s$ of each sector radar $SR_s$ are taken into consideration.

Furthermore, the output of the A/D converter $61_s$ of the sector radar $SR_1$ is given by Equation (23) in the case where a reception signal of the sector radar $SR_1$ in an $(m_1+1)$th transmission cycle $T_r$ and a radar transmission signal (interference wave signal) coming from the sector radar $SR_2$ are involved if it is assumed that the propagation environment is the same as in the $m_1$th transmission cycle $T_r$. The phrase "the propagation environment is the same as in the $m_1$th transmission cycle $T_r$" means that the complex attenuation coefficients $h_{11}$ and $h_{12}$ and the delay times $\tau_{11}$ and $\tau_{12}$ can be regarded as remaining unchanged.

[Formula 23]

$$X_1(N_v m_1 + k_1) = h_{11}GP_1(N_{TR}\{N_v m_1 + k_1 - \lfloor \tau_{11}/\Delta_1 \rfloor\}) + \\ h_{12}GP_2(N_{TR}\{N_v m_2 + N_{delay}\}) \quad (23)$$

The addition value of outputs, that is, sliding correlation values, of the correlation value calculator $63_s$ of the sector radar $SR_1$ in two transmission cycles, that is, an $m_1$th transmission cycle and an $(m_1+1)$th transmission cycle, is given by Equation (24):

[Formula 24]

$$AC_1(k_1, m_1) + AC_1(k_1, m_1 + 1) = \sum_{n=1}^{L} XP_1\left(N_v(m_1 - 1) + \frac{N_o}{N_{TR}}(n-1) + k_1\right)C_n^* + \sum_{n=1}^{L} XP_1\left(N_v m_1 + \frac{N_o}{N_{TR}}(n-1) + k_1\right)C_n^* \quad (24)$$

The outputs of the sth reception phase shifter $62_s$ of the sector radar $SR_1$ in the $m_1$th transmission cycle $T_r$ and the $(m_1+1)$th transmission cycle $T_r$ are given by Equations (25) and (26), respectively:

[Formula 25]

$$XP_1(N_v(m_1 - 1) + k_1) = \exp(-j(m_1 - 1)\phi_1)X_1(N_v(m_1 - 1) + k_1) = \quad (25)$$
$$\exp(-j(m_1 - 1)\phi_1)[h_{11}GP_1(N_{TR}\{N_v(m_1 - 1) + k_1 - \lfloor\tau_{11}/\Delta_1\rfloor\}) + h_{12}GP_2(N_{TR}\{N_v(m_2 - 1) + N_{delay}\})] = \exp(-j(m_1 - 1)\phi_1)[$$
$$h_{11}\exp(j(m_1 - 1)\phi_1)G_1(N_{TR}\{N_v(m_1 - 1) + k_1 - \lfloor\tau_{11}/\Delta_1\rfloor\}) + h_{12}\exp(j(m_2 - 1)\phi_2)G_2(N_{TR}\{N_v(m_2 - 1) + N_{delay}\})] =$$
$$h_{11}G_1(N_{TR}\{N_v(m_1 - 1) + k_1 - \lfloor\tau_{11}/\Delta_1\rfloor\}) + h_{12}\exp(j[(m_2 - 1)\phi_2 - (m_1 - 1)\phi_1])$$
$$G_2(N_{TR}\{N_v(m_2 - 1) + N_{delay}\})$$

[Formula 26]

$$XP_1(N_v m_1 + k_1) = \exp(-jm_1\phi_1)X_1(N_v m_1 + k_1) = \quad (26)$$
$$\exp(-jm_1\phi_1)[h_{11}GP_1(N_{TR}\{N_v m_1 + k_1 - \lfloor\tau_{11}/\Delta_1\rfloor\}) + h_{12}GP_2(N_{TR}\{N_v m_2 + N_{delay}\})] =$$
$$\exp(-jm_1\phi_1)[h_{11}\exp(jm_1\phi_1)G_1(N_{TR}\{N_v m_1 + k_1 - \lfloor\tau_{11}/\Delta_1\rfloor\}) + h_{12}\exp(jm_2\phi_2)G_2(N_{TR}\{N_v m_2 + N_{delay}\})] =$$
$$h_{11}G_1(N_{TR}\{N_v m_1 + k_1 - \lfloor\tau_{11}/\Delta_1\rfloor\}) + h_{12}\exp(j[(m_2\phi_2 - m_1\phi_1])G_2(N_{TR}\{N_v m_2 + N_{delay}\})$$

The first term of each of Equations (25) and (26) represents a desired signal component that is transmitted from the radar transmitter $TX_s$ of the sector radar $SR_1$ as a radar transmission signal, reflected by a target $TAR_s$, and received by the radar receiver $RX_s$ of the sector radar $SR_1$. Therefore, the first terms of the respective Equations (25) and (26) are in phase (see Equation (27)) and hence can provide a coherent integration gain when subjected to the coherent integration according to Equation (24). Symbol $\angle[x]$ is an operator of outputting the phase component of a complex number x.

[Formula 27]

$$\angle[h_{11}G_1(N_{TR}\{N_v(m_1-1)+k_1-\lfloor\tau_{11}/\Delta_1\rfloor\})] = \angle[h_{11}G_1 (N_{TR}\{N_v m_1+k_1-\lfloor\tau_{11}/\Delta_1\rfloor\})] \quad (27)$$

On the other hand, the second term of each of Equations (25) and (26) represents an interference wave signal component that is transmitted from the radar transmitter $TX_s$ of the sector radar $SR_2$ as a radar transmission signal, reflected by the target $TAR_s$, and received by the radar receiver $RX_s$ of the sector radar $SR_1$.

If the carrier frequency errors of the sector radars $SR_1$ and $SR_2$ are approximately equal, that is, if Equation (28) holds, the interference wave signal components in the $m_1$th transmission cycle and the $(m_1+1)$th transmission cycle are approximately opposite to each other in phase (see Equation (29)). Therefore, the radar apparatus 10 can suppress the interference wave signal components effectively by performing the coherent integration according to Equation (24).

[Formula 28]

$$N_v\Delta_1 \approx N_v\Delta_2 \quad (28)$$

[Formula 29]

$$\angle h_{12}\exp(j[(m_2\phi_2-m_1\phi_1)])G_2(N_{TR}\{N_v m_2+N_{delay}\}) - \angle h_{12}\exp(j[(m_2-1)\phi_2-(m_1-1)\phi_1])G_2(N_{TR} \{N_v(m_2-1)+N_{delay}\}) = \phi_2-\phi_1+2\pi f_{dev}T_r \approx -\pi \quad (29)$$

Parameter $f_{dev}$ represents the carrier frequency error between the sector radars $SR_1$ and $SR_2$ which is defined by a carrier frequency error due to a frequency error of the transmission reference clock signal and a sampling frequency error due to a frequency error of the reception reference clock signal.

For example, assume that the carrier frequency of the RF transmitter $3_s$ of the sector radar $SR_1$ is 76 GHz, the carrier frequency error between the sector radars $SR_1$ and $SR_2$ is 0.5 ppm ($=0.5 \times 10^{-6}$), and the transmission cycle $T_r$ is 300 ns. Even if the measurable distance of the sector radar $SR_1$ is equal to 45 m ($=C_0 \times T_r/2$; $C_0$: speed of light), the phase variation due to the carrier frequency error $f_{dev}$ between the sector radars $SR_1$ and $SR_2$ is smaller than 5° (see FIG. 9).

Figure 9:
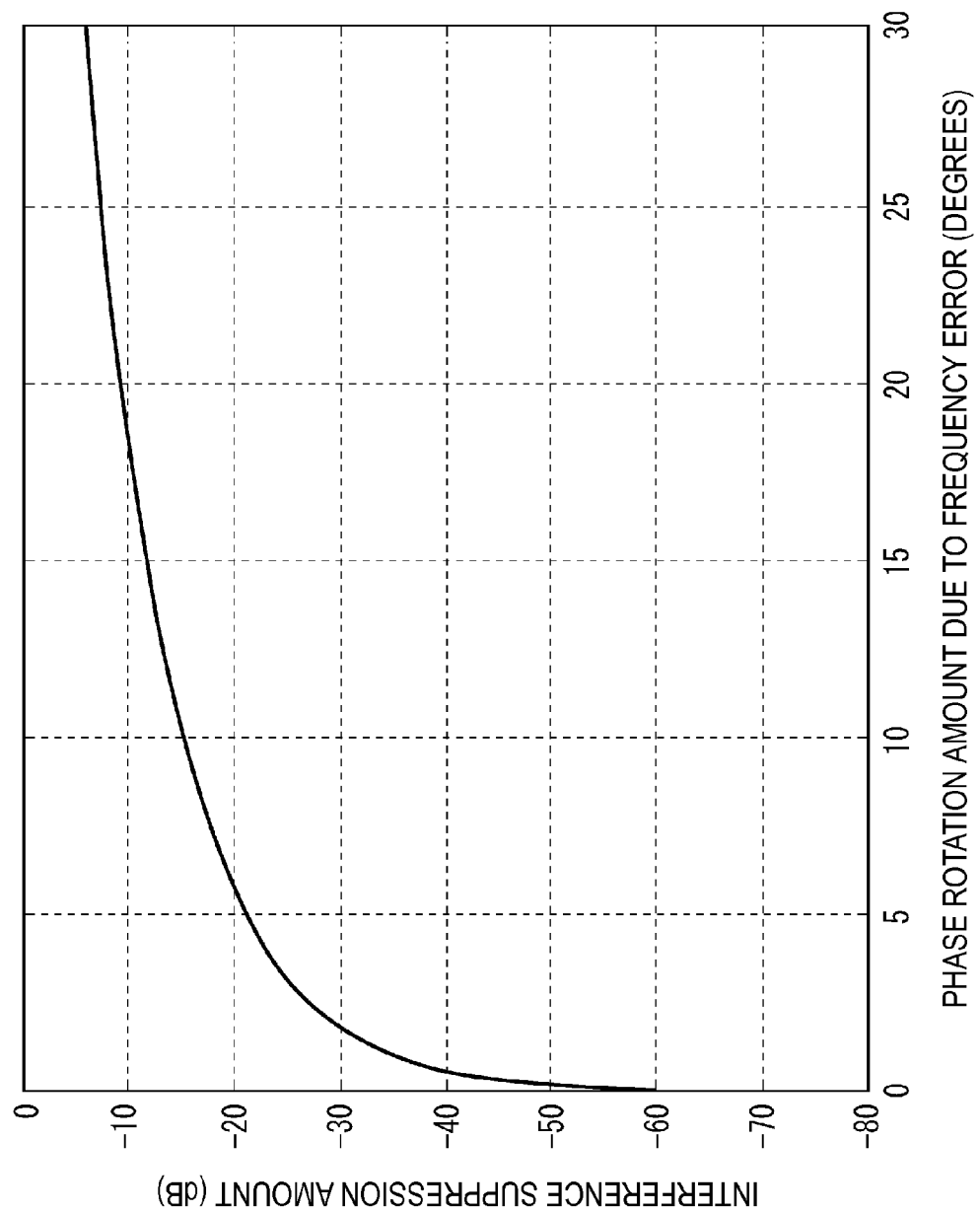
FIG. 9 is a graph showing a relationship between the phase rotation amount due to the frequency error between the sector radars $SR_1$ and $SR_2$ and the interference suppression amount of an interference signal coming from the other sector radar in the self sector radar.

That is, as indicated by Equation (30), the phase variation due to the carrier frequency error $f_{dev}$ between the sector radars $SR_1$ and $SR_2$ is calculated as 4.1°, which is about 2.5% of 180° and hence is negligible. The radar apparatus 10 can thus suppress interference wave components by 20 dB or more. FIG. 9 is a graph showing a relationship between the phase rotation amount due to the frequency error between the sector radars $SR_1$ and $SR_2$ and the interference suppression amount of an interference signal coming from the other sector radar in the self sector radar.

[Formula 30]

$$2\pi \times f_{dev} \times T_r = 2\pi \times (76\text{ GHz} \times 0.5\text{ ppm}) \times 300\text{ ns} \approx 0.07[\text{rad}] = 4.1° \quad (30)$$

Although the above description assumes a case that an interference wave signal that originates from the sector radar $SR_2$ arrives at the sector radar $SR_1$, the same discussion is likewise applicable to a case that an interference wave signal that originates from the sector radar $SR_1$ arrives at the sector radar $SR_2$.

The distance estimator $65_s$ receives coherent integration values $ACC_s(k_s, v_s)$ at respective discrete times $k_s$ that are output from the coherent integrator $64_s$ every NP transmission cycles $T_r$. The distance estimator $65_s$ estimates a distance to the target TAR on the basis of the received coherent integration values $ACC_s(k_s, v)$ at the respective discrete times $k_s$. For example, the estimation method disclosed in the following Referential non-patent document 3 can be applied to the distance estimation performed in the distance estimator $65_s$:

(Referential non-patent document 3) Bussgang, J. J., Nesbeda, P., and Safran, H., "A Unified Analysis of Range Performance of CW, Pulse, and Pulse Doppler Radar," Proceedings of the IRE, Vol. 47, Issue 10, pp. 1753-1762, 1959.

The square of the absolute value of each of coherent integration values that are obtained in the $v_s$th output cycle ($v_s \times NP \times T_r$) and supplied from the coherent integrator $64_s$, $|ACC_s(k_s, v_s)|^2$, corresponds to a reception level of a reflection wave signal at each discrete time $k_s$. The distance estimator $65_s$ estimates a distance Range($k_{ps}$) according to Equation (31) on the basis of a detection time $k_p$, of a peak reception level that is higher than an environment noise level of the sector radar $SR_s$ by a prescribed value or more. In Equation (31), parameter $C_0$ represents the speed of light.

[Formula 31]

$$\text{Range}(k_{ps}) = C_0 \times (k_{ps} - 1) \times \frac{1}{2 f_{R \times BB}} \quad (31)$$

Operating in the above-described manner, in the case where plural sector radars are installed being opposed to each other, the radar apparatus 10 according to the first embodiment can suppress interference between the sector radars with a simple configuration by making it unnecessary to synchronize transmission cycles between the sector radars opposed to each other. Furthermore, the radar apparatus 10 can prevent increase of range sidelobes and suppress degradation of the target ranging performance effectively without incorporating circuit error correction circuits even in the case where circuit errors such as a DC offset and IQ imbalance occur.

In the embodiment, the same code sequence $C_n$ having the code length L is used in the sector radars $SR_1$ and $SR_2$. However, the invention is not limited to the case of using the same code sequence $C_n$ and different code sequences $C(1)_n$ and $C(2)_n$ having the code length L may be used. In particular, in the radar apparatus 10, interference between the sector radars $SR_s$ can be suppressed further if the code generaters $21_s$ of the respective sector radars $SR_1$ and $SR_2$ employ code sequences whose cross-correlation is low as the different code sequences $C(1)_n$ and $C(2)_n$.

The embodiment may be modified so that different code sequences $C(1)_{n1}$ and $C(2)_{n2}$ having different code lengths $L_1$ and $L_2$ are used in the sector radars $SR_1$ and $SR_2$, respectively. In particular, in the radar apparatus 10, interference between the sector radars $SR_s$ can be suppressed further if the code generaters $21_s$ of the respective sector radars $SR_1$ and $SR_2$ employ code sequences whose cross-correlation is low as the different code sequences $C(1)_{n1}$ and $C(2)_{n2}$. Since the sector radars $SR_1$ and $SR_2$ transmit radar transmission signals of the different code sequences $C(1)_n1$ and $C(2)_{n2}$, the radar transmission signals transmitted from the respective sector radars $SR_1$ and $SR_2$ have different transmission intervals (see FIGS. 10($a$) and 10($b$)).

Figure 10:
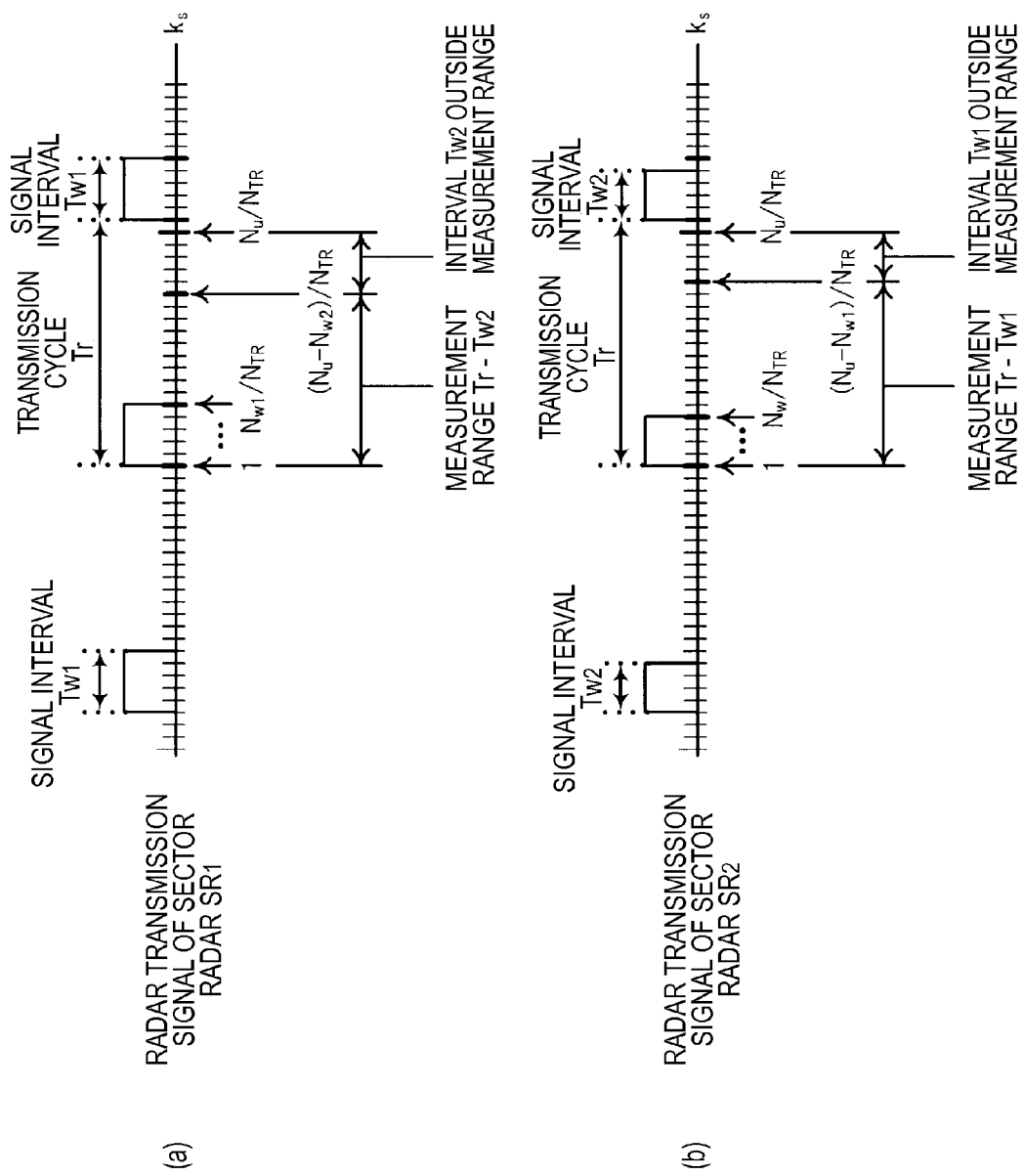
FIG. 10(a) is an explanatory diagram illustrating a measurement range of the sector radar $SR_1$ in a case that transmission codes used in the respective sector radars $SR_1$ and $SR_2$ have different code lengths.
FIG. 10(b) is an explanatory diagram illustrating a measurement range of the sector radar $SR_2$ in a case that the transmission codes used in the respective sector radars $SR_1$ and $SR_2$ have different code lengths.

FIG. 10($a$) is an explanatory diagram illustrating a measurement range of the sector radar $SR_1$ in a case that the transmission codes used in the respective sector radars $SR_1$ and $SR_2$ have different code lengths. FIG. 10($b$) is an explanatory diagram illustrating a measurement range of the sector radar $SR_2$ in a case that the transmission codes used in the respective sector radars $SR_1$ and $SR_2$ have different code lengths.

In the radar apparatus 10, where each transmission interval of a radar transmission signal transmitted from the sector radar $SR_2$ includes the start of the corresponding transmission cycle $T_r$ of a radar transmission signal transmitted from the sector radar $SR_1$, the interval from the start of each transmission interval of the radar transmission signal transmitted from the sector radar $SR_2$ to the start of the corresponding transmission cycle $T_r$ of the sector radar $SR_1$ is excluded from the measurement range.

That is, as shown in FIG. 10($a$), in the sector radar $SR_1$, the transmission interval $T_{w1}$ corresponds to discrete times $k_s=1$ to $N_{w1}/N_{TR}$, the measurement range interval $T_r-T_{w2}$ corresponds to discrete times $k_s=1$ to $(N_u-N_{w2})/N_{TR}$ which include the transmission interval $T_{w1}$, and the interval $T_s$ ($=T_{w1}$) which is outside the measurement range corresponds to discrete times $k_s=(N_u-N_{w2})/N_{TR}$ to $N_u/N_{TR}$.

As shown in FIG. 10($b$), in the sector radar $SR_2$, the transmission interval $T_{w2}$ corresponds to discrete times $k_s=1$ to $N_{w2}/N_{TR}$, the measurement range interval $T_r-T_{w1}$ corresponds to discrete times $k_s=1$ to $(N_u-N_{w1})/N_{TR}$ which include the transmission interval $T_{w2}$, and the interval $T_s$ ($=T_{w2}$) which is outside the measurement range corresponds to discrete times $k_s=(N_u-N_{wt})/N_{TR}$ to $N_u/N_{TR}$.

Furthermore, in the embodiment, the transmission phase shift $\phi_1$ of the sth transmission phase shifter $25_s$ of the sector radar $SR_1$ is set at 90° and the reception phase shift $\phi_2$ of the sth transmission phase shifter $25_s$ of the sector radar $SR_2$ is set at −90°, $\phi_1$ and $\phi_2$ are not restricted to 90° and −90°, respectively.

The sth transmission phase shifter $25_s$ of the sector radar $SR_1$ and the sth transmission phase shifter $25_s$ of the sector radar $SR_2$ give the different phase shifts $(\phi_1, \phi_2)=(\phi(q, N_i)+\alpha, -\phi(q, N_i)+\alpha)$ $(=(q\pi/N_i+\alpha, -q\pi/N_i+\alpha))$. With this measure, each of the sector radars $SR_1$ and $SR_2$ which are installed being opposed to each other can suppress an interference wave signal coming from the other sector radar, and can prevent increase of range sidelobes and suppress degradation of the target ranging performance effectively without incorporating circuit error correction circuits even in the case where circuit errors such as a DC offset and IQ imbalance occur.

Parameter q takes values 1 to $N_i$, parameter $N_i$ is a natural number that is larger than or equal to 2, and parameter $\alpha$ is a fixed phase value. By performing coherent integration every $N_i$ transmission cycles, each coherent integrator $64_s$ can effectively suppress interference between radar transmission signals coming from the respective sector radars $SR_1$ and $SR_2$.

For example, where $N_i=3$, q=1, and $\alpha=0$, the phase shifts $(\phi_1, \phi_2)=(\phi(1, 3), -\phi(1, 3))$ become $(\pi/3, -\pi/3)$. Where $N_i=3$, q=2, and $\alpha=0$, the phase shifts $(\phi_1, \phi_2)=\phi(2, 3), -\phi(2, 3))$ become $(2\pi/3, -2\pi/3)$. Performing coherent integration every three transmission cycles, each coherent integrator $64_s$ can effectively suppress interference between radar transmission signals coming from the respective sector radars $SR_1$ and $SR_2$.

How the interference suppression effect is obtained will be described in a general case of $N_i$ transmission cycles instead of three transmission cycles. Assume an example case that the sector radar $SR_1$ receives a radar transmission signal of the sector radar $SR_2$ as an interference wave signal.

The output of the A/D converter $61_s$ (s=1) is given by Equation (20) in the case where a reception signal of an $m_1$th transmission cycle $T_r$ of the sector radar $SR_1$ and a radar transmission signal (interference wave signal) coming from the sector radar $SR_2$ are involved.

Furthermore, the output of the A/D converter $61_s$ of the sector radar $SR_1$ is given by Equation (32) in the case where a reception signal of the sector radar $SR_1$ in each of an $(m_1+1)$th to $(m_1+(N_1-1))$th transmission cycles $T_r$ and a radar transmission signal (interference wave signal) coming from the sector radar $SR_2$ are involved if the propagation environment remains the same as in the $m_1$th transmission cycle $T_r$. In Equation (32), parameter w takes values 1 to $(N_i-1)$.

[Formula 32]

$$X_1(N_v(m_1+w-1)+k_1)=h_{11}GP_1(N_{TR}\{N_v(m_1+w-1)+k_1-\lfloor\tau_{11}/\Delta_1\rfloor\})+h_{12}GP_2(N_{TR}\{N_v(m_2+w-1)+N_{delay}\}) \quad (32)$$

The output, that is, the addition value of sliding correlation values, of the correlation value calculator $63_s$ of the sector radar $SR_1$ in the $m_1$th to $(m_1+(N_i-1))$th transmission cycles is given by Equation (33):

[Formula 33]

$$AC_1(k_1, m_1) + \sum_{w=1}^{N_i-1} AC_1(k_1, m_1+w-1) = \quad (33)$$

$$\sum_{n=1}^{L} XP_1\left(N_v(m_1-1) + \frac{N_o}{N_{TR}}(n-1) + k_1\right)C_n^* +$$

$$\sum_{w=1}^{N_i-1}\sum_{n=1}^{L} XP_1\left(N_v(m_1+w-1) + \frac{N_o}{N_{TR}}(n-1) + k_1\right)C_n^*$$

The outputs of the sth reception phase shifter $62_s$ of the sector radar $SR_1$ in the $m_1$th transmission cycle $T_r$ and the $(m_1+w)$th transmission cycle $T_r$ are given by Equations (34) and (35), respectively:

[Formula 34]

$$XP_1(N_v(m_1-1)+k_1) = \exp(-j(m_1-1)\phi_1)X_1(N_v(m_1-1)+k_1) = \quad (34)$$
$$\exp(-j(m_1-1)\phi_1)[h_{11}GP_1(N_{TR}\{N_v(m_1-1)+k_1-\lfloor\tau_{11}/\Delta_1\rfloor\}) +$$
$$h_{12}GP_2(N_{TR}\{N_v(m_2-1)+N_{delay}\})] =$$
$$\exp(-j(m_1-1)\phi_1)[h_{11}\exp(j(m_1-1)\phi_1)$$
$$G_1(N_{TR}\{N_v(m_1-1)+k_1-\lfloor\tau_{11}/\Delta_1\rfloor\}) +$$
$$h_{12}\exp(j(m_2-1)\phi_2)G_2(N_{TR}\{N_v(m_2-1)+N_{delay}\})] =$$
$$h_{11}G_1(N_{TR}\{N_v(m_1-1)+k_1-\lfloor\tau_{11}/\Delta_1\rfloor\}) +$$
$$h_{12}\exp(j[(m_2-1)\phi_2-(m_1-1)\phi_1])$$
$$G_2(N_{TR}\{N_v(m_2-1)+N_{delay}\})$$

[Formula 35]

$$XP_1(N_v(m_1+w-1)+k_1) = \quad (35)$$
$$\exp(-j(m_1+w-1)\phi_1)X_1(N_v(m_1+w-1)+k_1) =$$
$$\exp(-j(m_1+w-1)\phi_1)$$
$$[h_{11}GP_1(N_{TR}\{N_v(m_1+w-1)+k_1-\lfloor\tau_{11}/\Delta_1\rfloor\}) +$$
$$h_{12}GP_2(N_{TR}\{N_v(m_2+w-1)+N_{delay}\})] =$$
$$\exp(-j(m_1+w-1)\phi_1)[h_{11}\exp(j(m_1+w-1)\phi_1)$$
$$G_1(N_{TR}\{N_v(m_1+w-1)+k_1-\lfloor\tau_{11}/\Delta_1\rfloor\}) +$$
$$h_{12}\exp(j(m_2+w-1)\phi_2)$$
$$G_2(N_{TR}\{N_v(m_2+w-1)+N_{delay}\})] =$$
$$h_{11}G_1(N_{TR}\{N_v(m_1+w-1)+k_1-\lfloor\tau_{11}/\Delta_1\rfloor\}) +$$
$$h_{12}\exp(j[((m_2+w-1)\phi_2-(m_1+w-1)\phi_1])$$
$$G_2(N_{TR}\{N_v(m_2+w-1)+N_{delay}\})$$

The first term of each of Equations (34) and (35) represents a desired signal component that is transmitted from the radar transmitter $TX_s$ of the sector radar $SR_1$ as a radar transmission signal, reflected by a target $TAR_s$, and received by the radar receiver $RX_s$ of the sector radar $SR_1$. Therefore, the first terms of the respective Equations (34) and (35) are in phase (see Equation (36)) and hence can provide a coherent integration gain when subjected to the coherent integration according to Equation (33). Symbol $\angle[x]$ is an operator of outputting the phase component of a complex number x.

[Formula 36]

$$\angle[h_{11}G_1(N_{TR}\{N_s(m_1-1)+k_1-\lfloor\tau_{11}/\Delta_1\rfloor\})]=\angle[h_{11}G_1 \quad (N_{TR}\{N_v(m_1+w-1)+k_1-\lfloor\tau_{11}/\Delta_1\rfloor\})] \quad (36)$$

On the other hand, the second term of each of Equations (34) and (35) represents an interference wave signal component that is transmitted from the radar transmitter $TX_s$ of the sector radar $SR_2$ as a radar transmission signal, reflected by the target $TAR_s$, and received by the radar receiver $RX_s$ of the sector radar $SR_1$.

If the carrier frequency error between the sector radars $SR_1$ and $SR_2$ is within an allowable range, that is, if Equation (28) holds, the interference wave signal components in the $m_1$th to $(m_1+w)$th transmission cycles have a phase relationship indicated by Equation (37). Equation (38) represents a result of coherent integration performed on interference wave signal components by the coherent integrator $64_s$ of the sector radar $SR_1$. Therefore, in the radar apparatus 10, the interference components have such a phase relationship as to be canceled out each other as is understood from Equation (38) and hence the interference wave signal components can be suppressed effectively. However, the radar apparatus 10 becomes more prone to be affected by phase variations due to the frequency error $f_{dev}$ as $N_i$ increases. Therefore, $N_i$ has an upper limit that depends on the frequency accuracy of the reference clock signals used in the radar apparatus 10.

[Formula 37]

$$\angle h_{12}\exp(j[(m_2+w-1)\phi_2-((m_1+w-1)\phi_1]) \quad (37)$$
$$G_2(N_{TR}\{N_v(m_2+w-1)+N_{delay}\}) -$$
$$\angle h_{12}\exp(j[(m_2-1)\phi_2-(m_1-1)\phi_1])$$
$$G_2(N_{TR}\{N_v(m_2-1)+N_{delay}\}) =$$
$$w\{\phi_2-\phi_1\}+2\pi f_{dev}wT_r = -2\frac{\pi q}{N_i}w+2\pi f_{dev}wT_r$$

[Formula 38]

$$\left\{AC_1(k_1, m_1) + \sum_{w=1}^{N_i-1} AC_1(k_1, m_1+w-1)\right\}_{INTERFERENCE} = \quad (38)$$

$$\{AC_1(k_1, m_1)\}_{INTERFERENCE}$$

$$\left\{1 + \sum_{w=1}^{N_i-1}\exp(jw(\phi_2-\phi_1)+2\pi f_{dev}wT_r)\right\} =$$

$$\{AC_1(k_1, m_1)\}_{INTERFERENCE}$$

$$\left\{1 + \sum_{w=1}^{N_i-1}\exp\left[-j\left(\frac{2\pi q}{N_i}w+2\pi f_{dev}wT_r\right)\right]\right\} \cong 0$$

Although the above description assumes the case that an interference wave signal that originates from the sector radar $SR_2$ arrives at the sector radar $SR_1$, the same discussion is likewise applicable to a case that an interference wave signal that originates from the sector radar $SR_1$ arrives at the sector radar $SR_2$.

Modification of Embodiment 1

Figure 11:
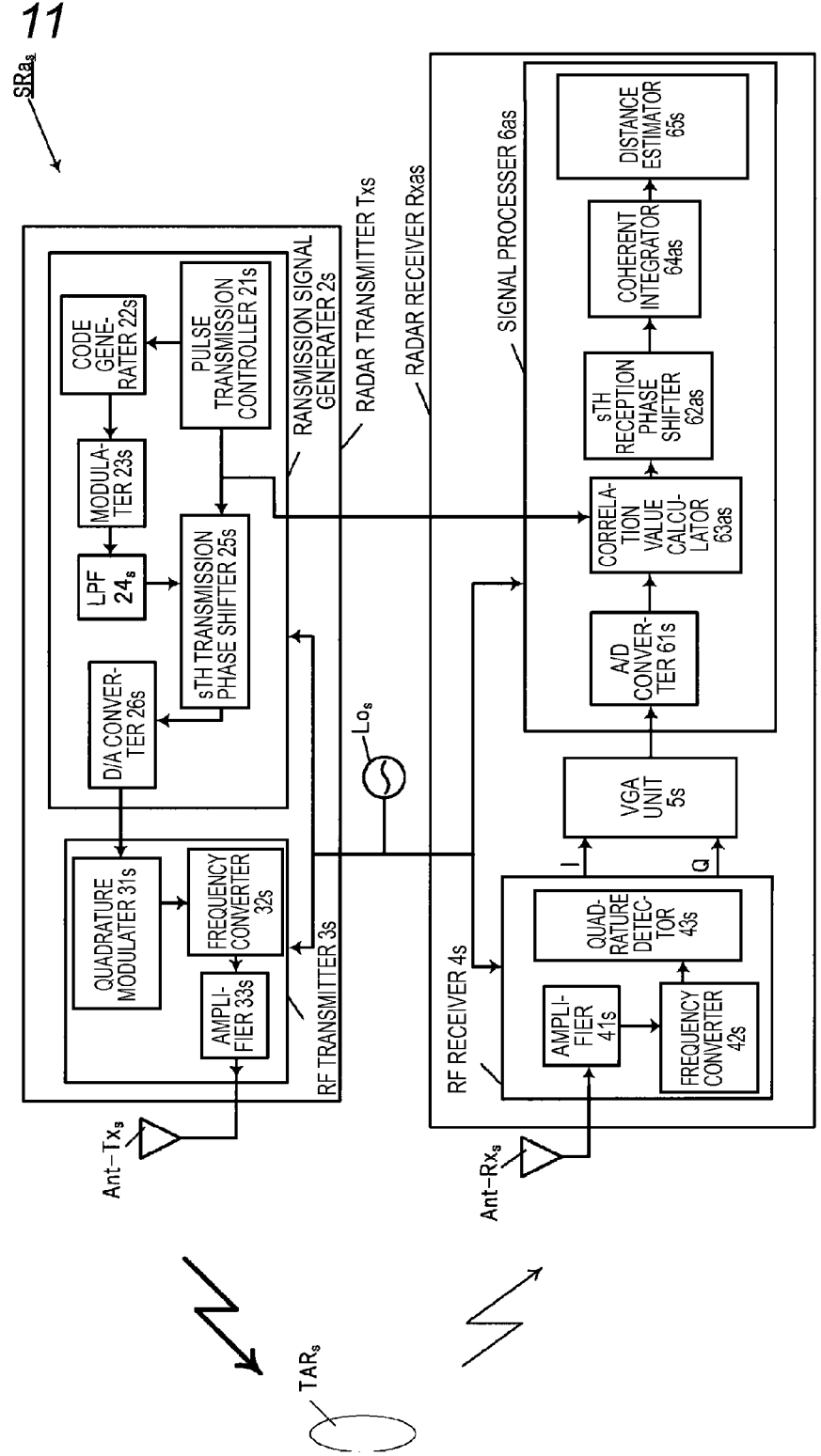
FIG. 11 is a block diagram showing, in detail, the internal configuration of a sector radar $SRa_s$ of a radar apparatus according to a modification of the first embodiment.

In a modification of the first embodiment, the sth reception phase shifter $62_s$ of the sector radar $SR_s$ is modified so as to give a reception phase shift to sliding correlation values $AC_s(k_s, m_s)$ that are output from the correlation value calculator $63_s$ (see FIG. 11).

FIG. 11 is a block diagram showing, in detail, the internal configuration of a sector radar $SRa_s$ of a radar apparatus 10 according to the modification of the first embodiment. Units (blocks) of the sector radar $SRa_s$ having the same (in configuration and operation) units in the sector radar $SR_s$ will be given the same reference symbols as the latter, and their configurations and operations will not be described (only differences will be described).

As shown in FIG. 11, a radar receiver $Rxa_s$ is configured so as to include the RF receiver $4_s$, the VGA unit $5_s$, and a signal processer $6a_s$. The signal processer $6a_s$ is configured so as to include the A/D converter $61_s$, a correlation value calculator $63a_s$, an sth reception phase shifter $62a_s$, a coherent integrator $64a_s$, and the distance estimator $65_s$.

The correlation value calculator $63a$, receives a reception signal $X_s(N_v(m_s-1)+k_s)$ that is output from the A/D converter $61_s$. Based on a reception reference clock signal obtained by multiplying a reference signal by a prescribed number, the correlation value calculator $63a_s$ periodically generates, for discrete times $k_s$, a transmission code of a code sequence $C_n$ having a code length L transmitted in an $m_s$th transmission cycle $T_r$.

The correlation value calculator $63a$, calculates sliding correlation values $AC_s(k_s, m_s)$ between the received reception signal $X_s(N_v(m_s-1)+k_s)$ and the transmission code $C_n$.

More specifically, the correlation value calculator $63a$, calculates sliding correlation values $AC_s(k\ m_s)$ at discrete times $k_s$ (=1 to $(N_u-N_w)/N_{TR}$) in an $m_s$th transmission cycle $T_r$ (each transmission cycle $T_r$) according to Equation (39). The correlation value calculator $63a_s$ outputs the sliding correlation values $AC_s(k_s, m_s)$ calculated according to Equation (39) to the sth reception phase shifter $62a_s$. In Equation (39), the asterisk "*" is the complex conjugate operator.

[Formula 39]

$$AC_s(k_s, m_s) = \sum_{n=1}^{L} X_s\left(N_v(m_s - 1) + \frac{N_o(n-1)}{N_{TR}} + k_s\right)C_n^* \quad (39)$$

Now, how the sth reception phase shifter $62a_s$ of the specific sector radar $SRa_s$ (s=1) will be described. The sth reception phase shifter $62a_s$ receives the sliding correlation values $AC_s(k_s, m_s)$ that are output from the correlation value calculator $63a_s$. The sth reception phase shifter $62a_s$ gives a reception phase shift that is opposite in direction to the phase shift component that was given by the sth transmission phase shifter $25_s$ to the received sliding correlation values $AC_s(k_s, m_s)$ every transmission cycle on the basis of a transmission timing signal that is supplied from the pulse transmission controller $21_s$ in the $m_s$th transmission cycle $T_r$.

More specifically, based on a transmission timing signal that is supplied from the sth pulse transmission controller $21_s$ in the $m_s$th transmission cycle $T_r$, the reception phase shifter $62a_s$ gives a reception phase shift $\exp(j(m_s-1)(-\phi))$ corresponding to the ordinal number of the transmission cycle $T_r$ to the sliding correlation values $AC_s(k_s, m_s)$ every transmission cycle (see Equation (40)). The sth reception phase shifter $62a_s$ outputs reception-phase-shift-added sliding correlation values $ACP_s(k_s, m_s)$ to the coherent integrator $64a_s$.

[Formula 40]

$$ACP_1(k_1, m_1) = \exp(-j(m_1-1)\phi_1)AC_1(k_1, m_1) \quad (40)$$

The sth reception phase shifter $62a_s$ of the sector radar $SRa_s$ (s=2) operates differently from that of the sector radar $SRa_s$ (s=1) in that parameter $\phi_2$ representing the phase rotation amount is different from $\phi_1$ (see Equation (41)). For example, parameters $\phi_1$ and $\phi_2$ are 90° and −90°, respectively.

[Formula 41]

$$ACP_2(k_2, m_2) = \exp(-j(m_2-1)\phi_2)AC_2(k_2, m_2) \quad (41)$$

The coherent integrator $64a_s$ receives the sliding correlation values $ACP_s(k_s, m_s)$ that are output from the sth reception phase shifter $62a_s$. The coherent integrator $64a_s$ adds together, for each discrete time $k_s$, sliding correlation values $ACP_s(k_s, m_s)$ in a prescribed number (NP) of transmission cycles $T_r$ (a period NP×$T_r$) on the basis of sets of sliding correlation values $ACP_s(k_s, m_s)$ that have been calculated in the $m_s$th transmission cycle $T_r$ for the respective discrete times $k_s$.

The coherent integrator $64a_s$ calculates a $v_s$th coherent integration value $ACC_s(k_s, v_s)$ for each discrete time $k_s$ by adding together, for each discrete time $k_s$, sliding correlation values $ACP_s(k_s, m_s)$ in the prescribed number (NP) of transmission cycles $T_r$ (period NP×$T_r$) according to Equation (42). Parameter NP represents the number of times of coherent integration performed in the coherent integrator $64a_s$. The coherent integrator $64a_s$ outputs the calculated coherent integration values $ACC_s(k_s, v_s)$ to the distance estimator $65_s$.

[Formula 42]

$$ACC_s(k_s, v_s) = \sum_{m_s=1}^{NP} ACP_s(k_s, NP(v_s - 1) + m_s) \quad (42)$$

By setting the prescribed number NP at an integer multiple of $2\pi/\phi_s$ in Equation (42), the coherent integrator $64a_s$ can reduce influences of circuit errors even if a reflection wave signal contains circuit errors such as a DC offset component and IQ imbalance. That is, by setting the prescribed number NP at an integer multiple of $2\pi/\phi_s$ in the sector radar $SRa_s$, the radar apparatus 10 can prevent degradation of the target ranging performance even if a reflection wave signal contains circuit errors such as a DC offset component and IQ imbalance. Furthermore, the radar apparatus 10 can improve the reception quality (SNR) of a reflection wave signal by suppressing noise components contained in the reflection wave signal by performing NP times of coherent integration.

As such, the radar apparatus 10 according to the modification of the first embodiment can provide the same advantages as the radar apparatus 10 according to the first embodiment.

Embodiment 2

The first embodiment is directed to the case of using, as the transmission code, one of code sequences capable of providing a low range sidelobe characteristic such as a Barker code sequence, an M-sequence code, and a Gold code sequence. A second embodiment is directed to a case of using a complementary code as the transmission code.

Figure 12:
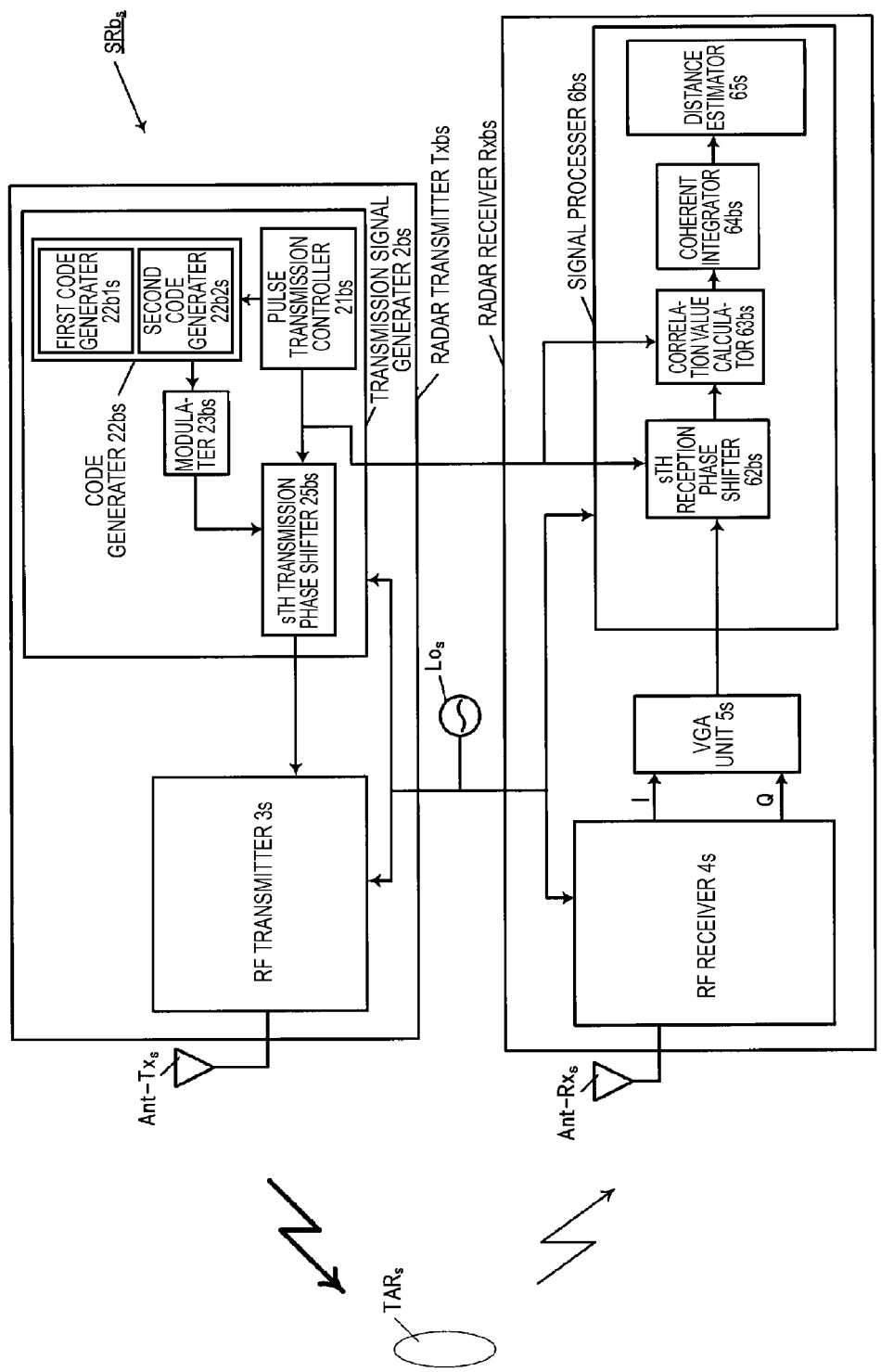
FIG. 12 is a block diagram showing, in a simplified manner, the internal configuration of each sector radar $SRb_s$ (s=1, 2) of a radar apparatus according to the second embodiment.
Figure 13:
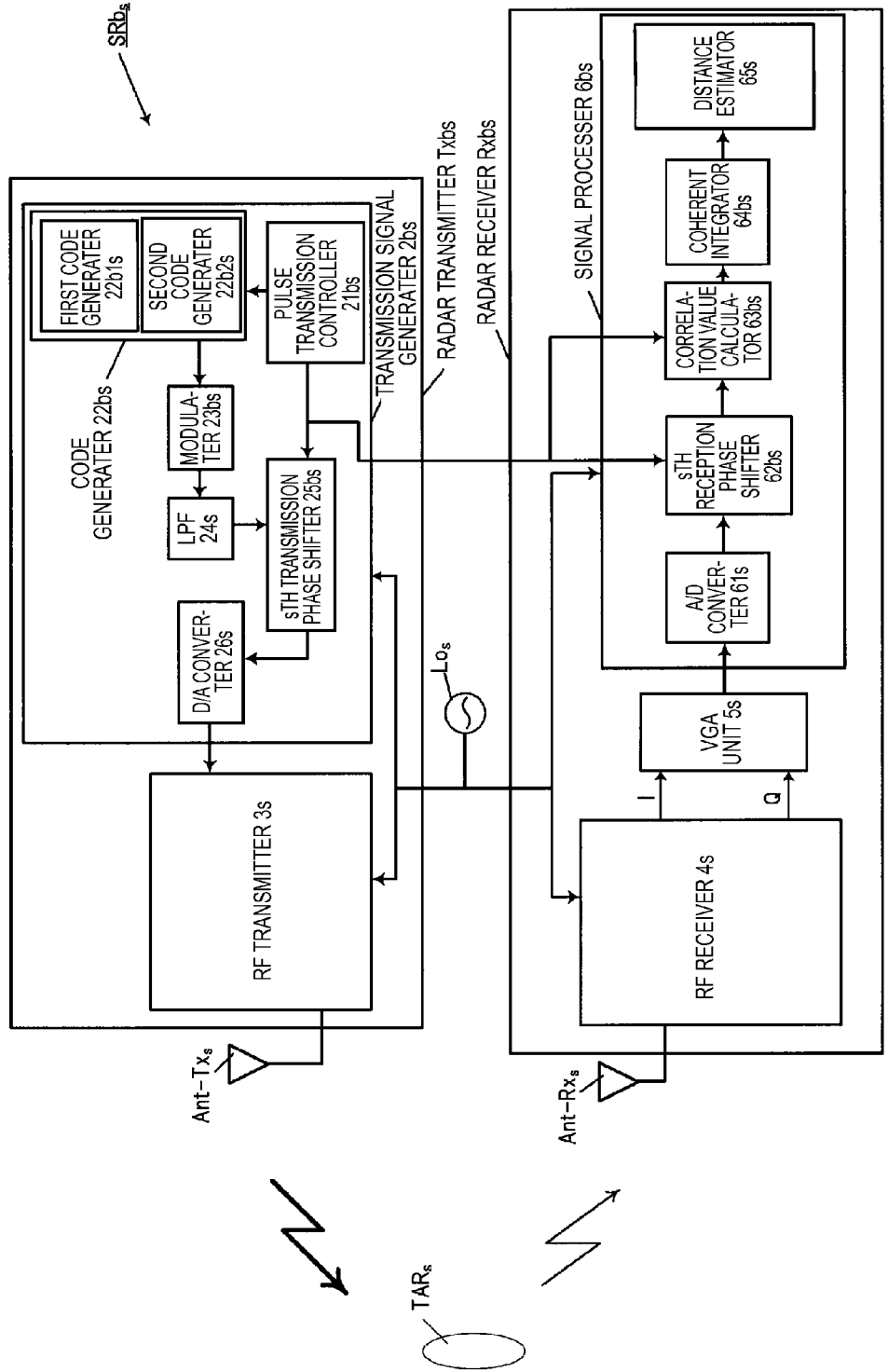
FIG. 13 is a block diagram showing, in detail, the internal configuration of each sector radar $SRb_s$ (s=1, 2) of the radar apparatus according to the second embodiment.
Figure 14:
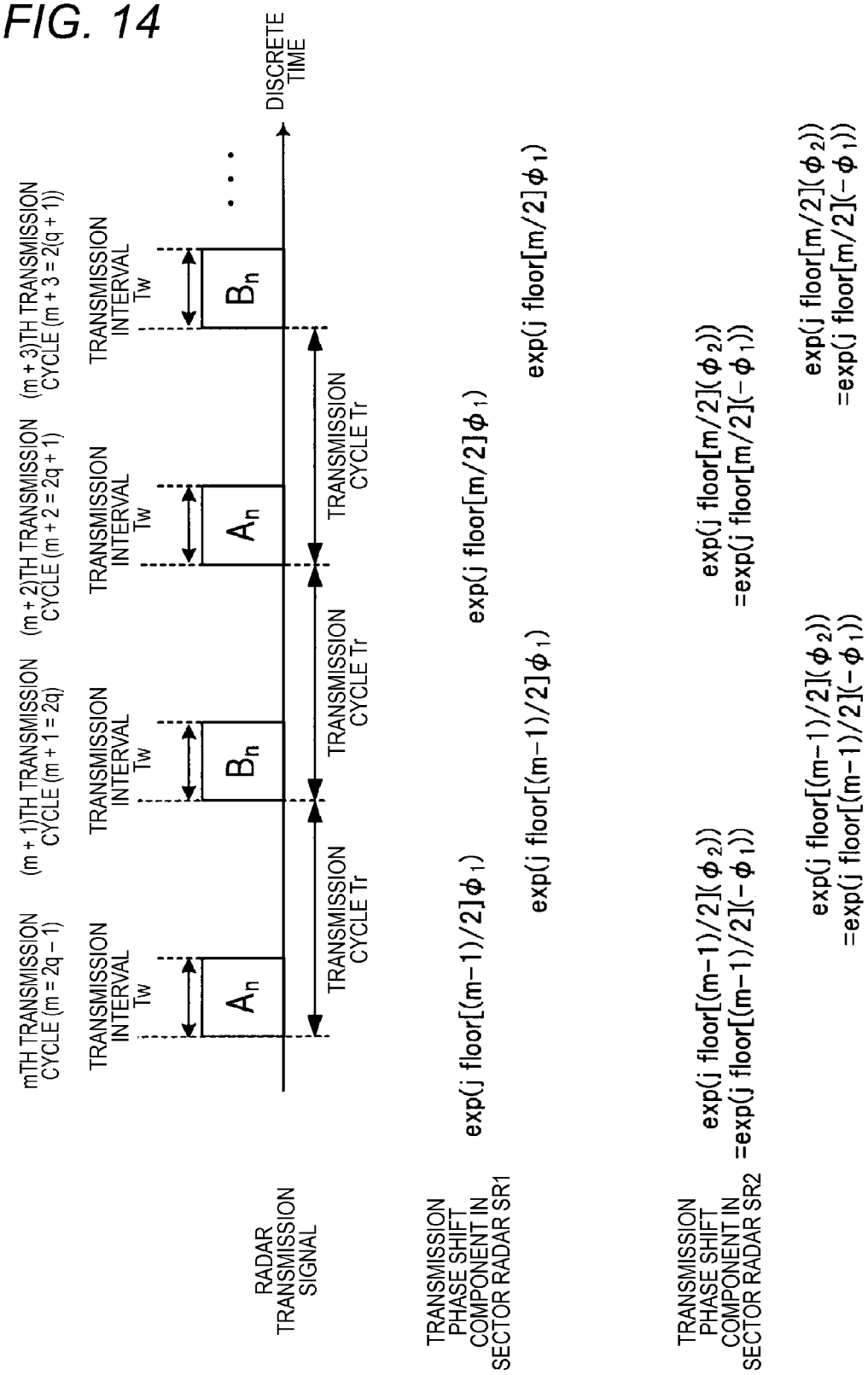
FIG. 14 is an explanatory diagram showing relationships between individual transmission intervals, individual transmission cycles, and individual transmission phase shift components of a radar transmission signal of each sector radar $SRb_s$ (s=1, 2) of the radar apparatus according to the second embodiment.

How each of sector radars $SRb_s$ (s=1, 2) constituting a radar apparatus 10 according to the second embodiment is configured and operates will be described with reference to FIGS. 12-14. FIG. 12 is a block diagram showing, in a simplified manner, the internal configuration of each sector radar $SRb_s$ (s=1, 2) of the radar apparatus 10 according to the second embodiment. FIG. 13 is a block diagram showing, in detail, the internal configuration of each sector radar $SRb_s$ (s=1, 2) of the radar apparatus 10 according to the second embodiment. FIG. 14 is an explanatory diagram showing relationships between individual transmission intervals, individual transmission cycles, and individual transmission phase shift components of a radar transmission signal of each sector radar $SRb_s$ (s=1, 2) of the radar apparatus 10 according to the second embodiment.

Units (blocks) of the sector radar $SRb_s$ having the same (in configuration and operation) units in the sector radar $SR_s$ will be given the same reference symbols as the latter, and their configurations and operations will not be described (only differences will be described).

As shown in FIG. 12, the radar apparatus $SRb_s$ is configured so as to include the reference signal oscillator $Lo_s$, a radar transmitter $Txb_s$, and a radar receiver $Rxb_s$. The radar transmitter $Txb_s$ is configured so as to have a transmission signal generator $2b_s$ and the RF transmitter $3_s$ which is connected to the transmission antenna $Ant-Tx_s$. The transmission signal generator $2b_s$ is configured so as to include a pulse transmission controller $21b_s$, a code generator $22b_s$, a modulator $23b_s$, and an sth transmission phase shifter $25b_s$. The code generator $22b_s$ includes, as at least one code generator, a first code generator $22b1_s$ and a second code generator $22b2_s$ and generates at least one code sequence.

The radar transmitter $Txb_s$ and the radar receiver $Rxb_s$ are connected to the reference signal oscillator $Lo_s$ and are supplied with a reference signal from the reference signal oscillator $Lo_s$, whereby processing performed by the radar transmitter $Txb_s$ and processing performed by the radar receiver $Rxb_s$ are synchronized with each other.

The radar receiver $Rxb_s$ is configured so as to have the RF receiver $4_s$, the VGA unit $5_s$, and a signal processor $6b_s$. The signal processor $6b_s$ is configured so as to include an sth reception phase shifter $62b_s$, a correlation value calculator $63b_s$, a coherent integrator $64b_s$, and the distance estimator $65_s$.

(Radar Transmitter)

Next, how the individual units of the radar transmitter $Txb_s$ are configured and operate will be described in detail with reference to FIG. 13.

The transmission signal generator $2b_s$ is configured so as to include the pulse transmission controller $21b_s$, the code generator $22b_s$, the modulator $23b_s$, the LPF $24_s$, the sth transmission phase shifter $25b_s$, and the D/A converter $26_s$. Although in FIG. 12 the transmission signal generator $2b_s$ includes the LPF $24_s$, the LPF $24_s$ may be provided in the radar transmitter $Txb_s$ independently of the transmission signal generator $2b_s$. The configuration and the manner of operation of the RF transmitter $3_s$ are the same as those of the RF transmitter $3_s$ of the sector radar $SR_s$, and hence descriptions therefor will be omitted.

Next, how the individual units of the radar transmitter $Txb_s$ operate will be described in detail.

The transmission signal generator $2b_s$ generates a transmission reference clock signal by multiplying the reference signal generated by the reference signal oscillator $Lo_s$ by a prescribed number. The individual units of the transmission signal generator $2b_s$ operate on the basis of the generated transmission reference clock signal. Let $f_{TxBB}$ represent the transmission reference clock frequency; then the transmission cycle $T_r$ is expressed as an integer $N_r$ multiple of a discrete time interval $1/f_{TxBB}$ which is determined by the transmission reference clock frequency $f_{TxBB}$ (see Equation (5)).

The transmission signal generator $2b_s$ periodically generates a baseband transmission signal $G_s(t_s)$ (see Equation (6)) by modulating a complementary code sequence $A_n$ or $B_n$ having a code length L on the basis of a transmission timing signal (for a radar transmission signal) which is output from the pulse transmission controller $21b_s$ every transmission cycle $T_r$. Parameter n takes values 1 to L, and parameter L represents the code length of each of the code sequences $A_n$ and $B_n$. Parameter j is the imaginary number unit which satisfies $j^2=-1$. Parameter $t_s$ represents discrete time.

For example, as shown in FIG. 14, the transmission signal $G_s(n_s)$ is such that each code element of the complementary code sequence $A_n$ or $B_n$ is modulated using $N_o$ samples of the transmission reference clock signal in the transmission interval $T_w$ (s) of each transmission cycle $T_r$. Therefore, in each transmission interval $T_w$, modulation is done using $N_w$ ($=N_o\times L$) samples. In the silent interval $(T_r-T_w)$ (s) of each transmission cycle $T_r$, modulation is done using $N_u$ ($=N_r-N_w$) samples. Therefore, the transmission signal $G_s(n_s)$ of Equation (6) is expressed as Equation (7).

The pulse transmission controller $21b_s$ generates a transmission timing signal for a radio-frequency radar transmission signal every transmission cycle $T_r$ and outputs it to each of the code generator $22b_s$, the sth transmission phase shifter $25b_s$, and the sth reception phase shifter $62b_s$.

The first code generator $22b1_s$ generates a transmission code of the one complementary code sequence $A_n$ of the complementary code sequences $A_n$ and $B_n$ having the code length L on the basis of a transmission timing signal that is output from the pulse transmission controller $21b_s$ every odd-numbered transmission cycle $T_r$. The first code generator $22b1_s$ outputs the generated transmission code of the complementary code sequence $A_n$ to the modulator $23b_s$. In the following description, for the sake of convenience, the transmission code of the complementary code sequence $A_n$ will be written as a transmission code $A_n$.

The second code generator $22b2_s$ generates a transmission code of the other complementary code sequence $B_n$ of the complementary code sequences $A_n$ and $B_n$ having the code length L on the basis of a transmission timing signal that is output from the pulse transmission controller $21b_s$ every even-numbered transmission cycle $T_r$. The second code generator $22b2_s$ outputs the generated transmission code of the complementary code sequence $B_n$ to the modulator $23b_s$. In the following description, for the sake of convenience, the transmission code of the complementary code sequence $B_n$ will be written as a transmission code $B_n$.

It has been described above that in this embodiment the first code generator $22b1_s$ generates a complementary code sequence $A_n$ having a code length L and the second code generator $22b2_s$ generates a complementary code sequence $B_n$ having a code length L. However, the first code generator $22b1_s$ and the second code generator $22b2_s$ may generate a complementary code sequence $B_n$ having a code length L and a complementary code sequence $A_n$ having a code length L, respectively.

The modulator $23b_s$ receives the transmission code $A_n$ or $B_n$ that is output from the code generator $22_s$. The modulater $23b_s$ generates a baseband transmission signal $G_s(t_s)$ of Equation (6) by pulse-modulating the received transmission code $A_n$ or $B_n$. The modulator $23b_s$ outputs a transmission signal $G_s(t_s)$, in a preset limited band or lower, of the generated transmission signal $G_s(n_s)$ to the sth transmission phase shifter $25b_s$ via the LPF $24_s$.

Now, how the sth transmission phase shifter $25b_s$ of the specific sector radar $SRb_s$ (s=1) will be described. The sth transmission phase shifter $25b_s$ receives the transmission signal $G_s(t_s)$ that is output from the modulator $23b_s$ or the LPF $24_s$. The sth transmission phase shifter $25b_s$ gives a prescribed transmission phase shift to the received transmission signal $G_s(t_s)$ every two transmission cycles on the basis of a transmission timing signal that is output from the pulse transmission controller $21b_s$ every transmission cycle $T_r$ (see FIG. 14).

More specifically, based on a transmission timing signal that is supplied from the pulse transmission controller $21b_s$ in an $m_s$th transmission cycles $T_r$, the sth transmission phase shifter $25b_s$ gives a transmission phase shift $\exp(j \cdot \text{floor}[(m_s-1)/2]\phi_s)$ corresponding to the ordinal number of the transmission cycle $T_r$ to the transmission signal $G_s(t_s)$ every two transmission cycles (see Equation (43)). Parameter $\phi_s$ represents a phase rotation amount (e.g., 90°) that is given in the sth transmission phase shifter $25b_s$, and it is preferable that parameter $\phi_s$ satisfy the relationship of Inequality (9). The sth transmission phase shifter $25b_s$ outputs a transmission-phase-shift-added transmission signal $GP_s(N_r(m_s-1)+t_s)$ to the D/A converter $26_s$. Symbol floor[x] is an operator of outputting an integer obtained by rounding down a real number x.

[Formula 43]

$$GP_1(N_r(m_1 - 1) + t_1) = \exp\left(j \text{ floor}\left[\frac{m_1 - 1}{2}\right]\phi_1\right)G_1(N_r(m_1 - 1) + t_1) \quad (43)$$

The manner of operation of the sth transmission phase shifter $25b_s$ of the sector radar $SRb_s$ (s=2) is different from that of the sth transmission phase shifter $25b_s$ of the sector radar $SRb_s$ (s=1) in that parameter $\phi_s$ representing the phase rotation amount in the transmission phase shift $\exp(j \cdot \text{floor}[(m_s-1)/2]\phi_s)$ in Equation (44) is different from parameter $\phi_1$. For example, parameters $\phi_1$ and $\phi_2$ are 90° and −90°, respectively. That is, parameters $\phi_1$ (s=1) and $\phi_2$ (s=2) are opposite in phase ($\phi_1 = \phi_2$).

[Formula 44]

$$GP_2(N_r(m_2 - 1) + t_2) = \exp\left(j \text{ floor}\left[\frac{m_2 - 1}{2}\right]\phi_2\right)G_2(N_r(m_2 - 1) + t_2) \quad (44)$$

(Radar Receiver)

Next, how the individual units of the radar receiver $Rxb_s$ are configured will be described in detail with reference to FIG. 13.

As shown in FIG. 13, the radar receiver $Rxb_s$ is configured so as to include the RF receiver $4_s$ to which the reception antenna $Ant\text{-}Rx_s$ is connected, the VGA unit 5 and the signal processor $6b_s$. The signal processor $6b_s$ is configured so as to include the A/D converter $61_s$, the sth reception phase shifter $62b_s$, the correlation value calculator $63b_s$, the coherent integrator $64b_s$, and the distance estimator $65_s$. Each unit of the signal processor $6b_s$ performs a calculation periodically with each transmission cycle $T_r$ as a signal processing interval.

Next, how the individual units of the radar receiver $Rxb_s$ operate will be described in detail.

Like the RF receiver $4_s$, the signal processor $6b_s$ generates a reception reference clock signal by multiplying a reference signal generated by the reference signal oscillator $Lo_s$ by a prescribed number. The individual units of the signal processor $6b_s$ operate on the basis of the generated reception reference clock signal.

Now, how the sth reception phase shifter $62b_s$ of the specific sector radar $SRb_s$ (s=1) will be described. The sth reception phase shifter $62b_s$ receives a reception signal $X_s(N_v(m_s-1)+k_s)$ that is output from the A/D converter $61_s$. The sth reception phase shifter $62b_s$ gives a reception phase shift that is opposite in direction to the phase shift component that was given by the sth transmission phase shifter $25b_s$ to the received reception signal $X_s(N_v(m_s-1)+k_s)$ every two transmission cycles on the basis of a transmission timing signal that is output from the pulse transmission controller $21b_s$ every transmission cycle $T_r$.

More specifically, based on a transmission timing signal that is supplied from the pulse transmission controller $21b_s$ in an $m_s$th transmission cycle $T_r$, the reception phase shifter $62b_s$ gives a reception phase shift $\exp(-j \cdot \text{floor}[(m_s-1)/2](-\phi_s))$ corresponding to the ordinal number of the transmission cycle $T_r$ to the reception signal $X_s(N_v(m_s-1)+k_s)$ every two transmission cycles (see Equation (45)). The sth reception phase shifter $62b_s$ outputs a reception-phase-shift-added reception signal $XP_s(N_v(m_s-1)+k)$ to the correlation value calculator $63b_s$.

[Formula 45]

$$XP_1(N_v(m_1 - 1) + k_1) = \exp\left(-j \text{ floor}\left[\frac{m_1 - 1}{2}\right]\phi_1\right)X_1(N_v(m_1 - 1) + k_1) \quad (45)$$

The sth reception phase shifter $62b_s$ of the sector radar $SR_s$ (s=2) operates differently from that of the sector radar $SR_s$ (s=1) in that parameter $\phi_2$ representing a reception rotation amount is different from $\phi_1$ (see Equation (46)). For example, parameters $\phi_1$ and $\phi_2$ are 90° and −90°, respectively.

[Formula 46]

$$XP_2(N_v(m_2 - 1) + k_2) = \exp\left(-j \text{ floor}\left[\frac{m_2 - 1}{2}\right]\phi_2\right)X_2(N_v(m_2 - 1) + k_2) \quad (46)$$

The correlation value calculator $63b_s$ receives the reception signal $XP_s(N_v(m_s1)+k_s)$ that is output from the sth reception phase shifter $62b_s$. Based on the reception reference clock signal obtained by multiplying the reference signal by the prescribed number, the correlation value calculator $63b_s$ periodically generates, for discrete times $k_s$, a transmission code of the code sequence $A_n$ having the code length L transmitted in an $m_s$th transmission cycle $T_r$ ($m_s$ (odd number)=$2z_s-1$ where $z_s$ is a natural number).

Furthermore, based on the reception reference clock signal obtained by multiplying the reference signal by the prescribed number, the correlation value calculator $63b_s$ periodically generates, for discrete times $k_s$, a transmission code of the code sequence $B_n$ having the code length L transmitted in an $m_s$th transmission cycle $T_r$ ($m_s$ (even number)=$2z_s$).

The correlation value calculator $63b_s$ calculates sliding correlation values $AC_s(k_s, m_s)$ between the received reception signal $XP_s(N_v(m_s-1)+k_s)$ and the transmission code $A_n$ or $B_n$. Each sliding correlation value $AC_s(k_s, m)$ is calculated by performing a sliding correlation operation on the transmission code and the reception signal at each discrete time $k_s$ in the $m_s$th transmission cycle $T_r$.

More specifically, the correlation value calculator $63b_s$ calculates sliding correlation values $AC_s(k_s, 2z_s-1)$ at discrete times $k_s$ (=1 to $(N_u-N_w)/N_{TR}$) in an $m_s$th ($m_s$ (odd number)=$2z_s-1$) transmission cycle $T_r$ (each transmission cycle $T_r$) according to Equation (47). The correlation value calculator $63b_s$ outputs the sliding correlation values $AC_s(k_s, 2z_s-1)$ calculated according to Equation (47) to the coherent integrator $64b_s$. In Equation (47), the asterisk "*" is the complex conjugate operator.

[Formula 47]

$$AC_s(k_s, 2z_s - 1) = \sum_{n=1}^{L} XP_s\left(2N_v(z_s - 1) + \frac{N_o(n-1)}{N_{TR}} + k_s\right)A_n^* \quad (47)$$

Furthermore, the correlation value calculator $63b_s$ calculates sliding correlation values $AC_s(k_s, 2z_s)$ at discrete times $k_s$ (=1 to $(N_u-N_w)/N_{TR}$) in an $m_s$th ($m_s$ (even number)=$2z_s$) transmission cycle $T_r$ (each transmission cycle $T_r$) according to Equation (48). The correlation value calculator $63b_s$ outputs the sliding correlation values $AC_s(k_s, 2z_s)$ calculated according to Equation (48) to the coherent integrator $64b_s$. In Equation (48), the asterisk "*" is the complex conjugate operator.

[Formula 48]

$$AC_s(k_s, 2z_s) = \sum_{n=1}^{L} XP_s\left(N_v(2z_s - 1) + \frac{N_o(n-1)}{N_{TR}} + k_s\right)B_n^* \quad (48)$$

Although in each of the embodiments including this embodiment the correlation value calculator $63b_s$ performs calculations at discrete times $k_s$=1 to $(N_u-N_w)/N_{TR}$, the measurement range (discrete time $k_s$ range) may be narrowed further to, for example, $k_s=N_w/N_{TR}+1$ to $(N_u-N_w)/N_{TR}$ according to the range of presence of a target $TAR_s$ which is a measurement target of the radar apparatus 10. With this measure, the radar apparatus 10 can further reduce the amount of calculation of the correlation value calculator $63b_s$. That is, the radar apparatus 10 can reduce the power consumption further as a result of reduction in the calculation amount of the signal processor $6b_s$.

Where the correlation value calculator $63b_s$ calculates sliding correlation values $AC_s(k_s, m_s)$ at discrete times $k_s=N_w/N_{TR}+1$ to $(N_u-N_w)/N_{TR}$, the radar apparatus 10 can omit measurement of a reflection wave signal in each transmission interval $T_w$ of the radar transmission signal.

In the radar apparatus 10, even if a radar transmission signal coming from the radar transmitter $Txb_s$ of each sector radar $SR_s$ goes around to enter the radar receiver $Rxb_s$ directly, a measurement can be performed with its influence eliminated. With the above restriction of the measurement range (discrete time $k_s$ range), the coherent integrator $64b_s$ and the distance estimator $65b_s$ also operate in the same restricted measurement range.

The coherent integrator $64b_s$ receives the sliding correlation values $AC_s(k_s, 2z_s-1)$ and $AC_s(k_s, 2z_s)$ that are output from the correlation value calculator $63b_s$. The coherent integrator $64b_s$ adds together sliding correlation values $AC_s(k_s, 2z_s-1)$ and $AC_s(k_s, 2z_s)$ in a prescribed number (2NP) of transmission cycles $T_r$ (a period 2NP×$T_r$) on the basis of sets of sliding correlation values $AC_s(k_s, 2z_s-1)$ and $AC_s(k_s, 2z_s)$ that have been calculated in the two (odd-numbered and even-numbered) transmission cycles $T_r$ for the respective discrete times $k_s$.

The coherent integrator $64b_s$ calculates a $v_s$th coherent integration value $ACC_s(k_s, v_s)$ for each discrete time $k_s$ by adding together, for each discrete time $k_s$, sliding correlation values $AC_s(k_s, 2z_s-1)$ and $AC_s(k_s, 2z_s)$ in the prescribed number 2NP of periods (period 2NP×$T_r$) according to Equation (49). Parameter 2NP represents the number of times of coherent integration performed in the coherent integrator $64b_s$. The coherent integrator $64b_s$ outputs the calculated coherent integration values $ACC_s(k_s, v_s)$ to the distance estimator $65_s$.

[Formula 49]

$$ACC_s(k_s, v_s) = \sum_{m_s=1}^{2NP} AC_s(k_s, NP(v_s - 1) + m_s) \quad (49)$$

By setting the prescribed number 2NP at an integer multiple of $2\pi\phi_s$ in Equation (49), the coherent integrator $64b_s$ can reduce influences of circuit errors even if a reflection wave signal contains circuit errors such as a DC offset component and IQ imbalance. That is, by setting the prescribed number 2NP at an integer multiple of $2\pi/\phi_s$, the radar apparatus 10 can prevent degradation of the target ranging performance even if a reflection wave signal contains circuit errors such as a DC offset component and IQ imbalance. Furthermore, the radar apparatus 10 can improve the reception quality (SNR) of a reflection wave signal by suppressing noise components contained in the reflection wave signal by performing 2NP times of coherent integration.

As such, the radar apparatus 10 according to the second embodiment can provide advantages that are equivalent to the advantages of the radar apparatus 10 according to the first embodiment even in the case of using a complementary code as a transmission code.

Modification of Embodiment 2

Figure 15:
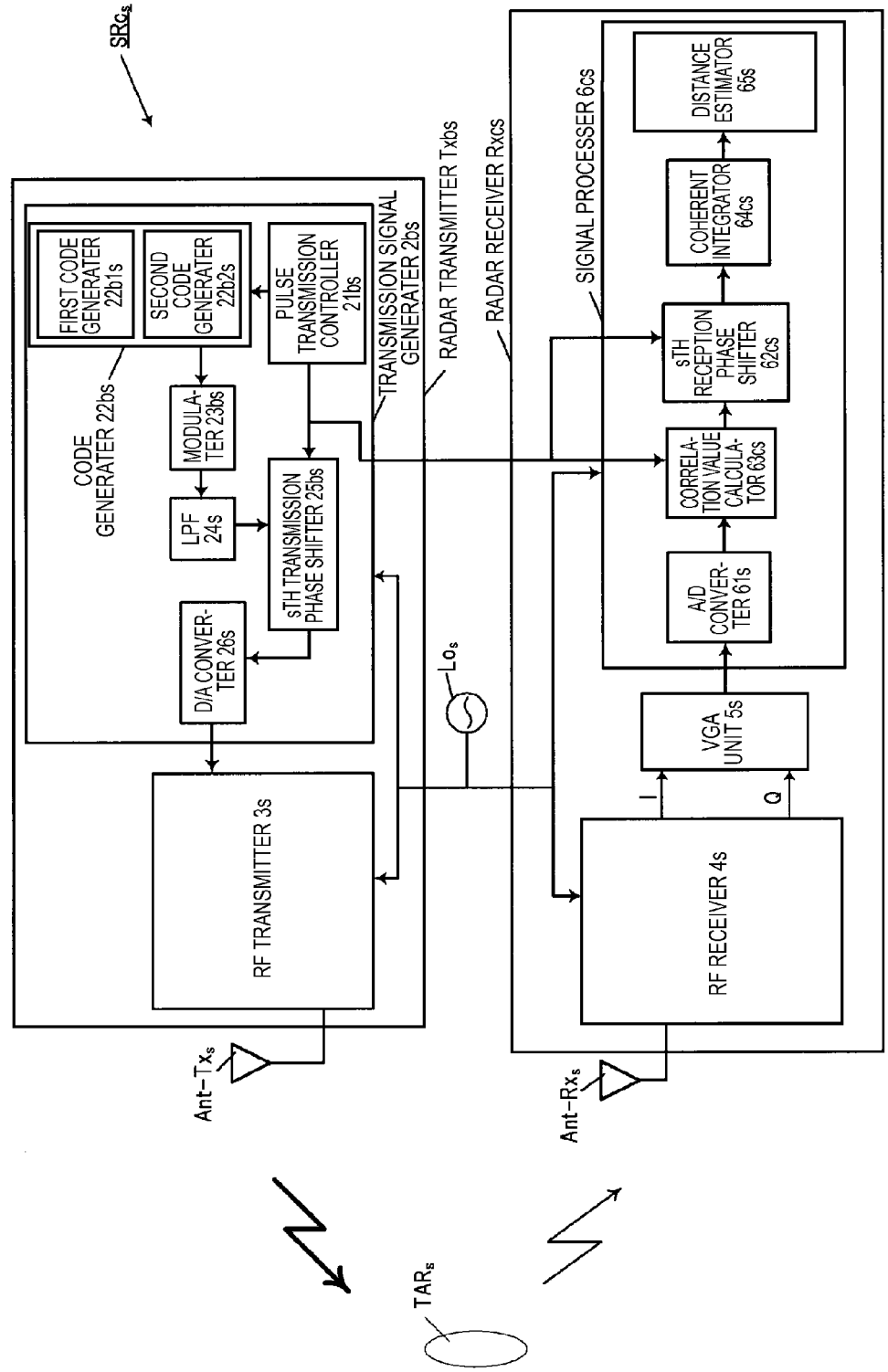
FIG. 15 is a block diagram showing, in detail, the internal configuration of a sector radar $SRc_s$ of a radar apparatus according to a modification of the second embodiment.

In a modification of the second embodiment, as in the modification of the first embodiment, the sth reception phase shifter $62b_s$ used in the second embodiment is modified so as to give a reception phase shift to sliding correlation values $AC_s(k_s, 2z_s)$ and $AC_s(k_s, 2z_s-1)$ that are output from the correlation value calculator $63b_s$ (see FIG. 15).

FIG. 15 is a block diagram showing, in detail, the internal configuration of a sector radar $SRc_s$ of a radar apparatus 10 according to the modification of the second embodiment. Units (blocks) of the sector radar $SRc_s$ having the same (in configuration and operation) units in the sector radar $SRb_s$ will be given the same reference symbols as the latter, and their configurations and operations will not be described (only differences will be described).

As shown in FIG. 15, a radar receiver $Rxc_s$ is configured so as to include the RF receiver $4_s$, the VGA unit $5_s$, and a signal processor $6c_s$. The signal processor $6c_s$ is configured so as to include the A/D converter $61_s$, a correlation value calculator $63c_s$, an sth reception phase shifter $62c_s$, a coherent integrator $64c_s$, and the distance estimator $65_s$.

The correlation value calculator $63c_s$ receives a reception signal $X_s(N_v(m_s-1)+k_s)$ that is output from the A/D converter $61_s$. Based on a reception reference clock signal obtained by multiplying a reference signal by a prescribed number, the correlation value calculator $63c_s$ periodically generates, for discrete times $k_s$, a transmission code of a code sequence $A_n$ having a code length L transmitted in an $m_s$th transmission cycle $T_r$ ($m_s$ (odd number)=$2z_s-1$).

Based on the reception reference clock signal obtained by multiplying the reference signal by the prescribed number, the correlation value calculator $63c$, periodically generates, for discrete times $k_s$, a transmission code of a code sequence $B_n$ having the code length L transmitted in an $m_s$th transmission cycle $T_r$ ($m_s$ (even number)=$2z_s$). The correlation value calculator $63c_s$ calculates sliding correlation values $AC_s(k_s, m_s)$ between the received reception signal $X_s(N_v(m_s-1)+k_s)$ and the pulse compression code $A_n$ or $B_n$.

More specifically, the correlation value calculator $63c_s$ calculates sliding correlation values $AC_s(k_s, 2z_s-1)$ at discrete times $k_s$ (=1 to $(N_u-N_w)/N_{TR}$) in an $m_s$th transmission cycle $T_r$ (each transmission cycle $T_r$; $m_s$: odd number) according to Equation (50). The correlation value calculator $63c_s$ outputs the sliding correlation values $AC_s(k_s, 2z_s-1)$ calculated according to Equation (50) to the sth reception phase shifter $62c_s$. In Equation (50), the asterisk "*" is the complex conjugate operator.

[Formula 50]

$$AC_s(k_s, 2z_s - 1) = \sum_{n=1}^{L} X_s\left(2N_v(z_s - 1) + \frac{N_o(n-1)}{N_{TR}} + k_s\right)A_n^* \quad (50)$$

Furthermore, the correlation value calculator $63c_s$ calculates sliding correlation values $AC_s(k_s, 2z_s)$ at discrete times $k_s$ (=1 to $(N_u-N_w)/N_{TR}$) in an $m_s$th transmission cycle $T_r$ (each transmission cycle $T_r$; $m_s$: even number) according to Equation (51). The correlation value calculator $63c_s$ outputs the sliding correlation values $AC_s(k_s, 2z_s)$ calculated according to Equation (51) to the sth reception phase shifter $62c_s$. In Equation (51), the asterisk "*" is the complex conjugate operator.

[Formula 51]

$$AC_s(k_s, 2z_s) = \sum_{n=1}^{L} X_s\left(N_v(2z_s - 1) + \frac{N_o(n-1)}{N_{TR}} + k_s\right)B_n^* \quad (51)$$

Now, how the sth reception phase shifter $62c_s$ of the specific sector radar $SRc_s$ (s=1) will be described. The sth reception phase shifter $62c_s$ receives the sliding correlation values $AC_s(k_s, 2z_s-1)$ and $AC_s(k_s, 2z_s)$, that is, the sliding correlation values $AC_s(k_s, m_s)$, that are output from the correlation value calculator $63c_s$. The sth reception phase shifter $62c_s$ gives a reception phase shift that is opposite in direction to the phase shift component that was given by the sth transmission phase shifter $25_s$ to the received sliding correlation values $AC_s(k_s, m_s)$ every two transmission cycles on the basis of a transmission timing signal that is supplied from the pulse transmission controller $21_s$ in the $m_s$th transmission cycle $T_r$.

More specifically, based on a transmission timing signal that is supplied from the pulse transmission controller $21_s$ in the $m_s$th transmission cycle $T_r$, the sth reception phase shifter $62c_s$ gives a reception phase shift $\exp(j\cdot\text{floor}[(m_s-1)/2](-\phi_s))$ corresponding to the ordinal number of the transmission cycle $T_r$ to the sliding correlation values $AC_s(k_s, m_s)$ every two transmission cycles (see Equation (52)). The sth reception phase shifter $62c_s$ outputs reception-phase-shift-added sliding correlation values $ACP_s(k_s, m_s)$ to the coherent integrator $64c_s$.

[Formula 52]

$$ACP_1(k_1, m_1) = \exp\left(-j \text{ floor}\left[\frac{m_1 - 1}{2}\right]\phi_1\right)AC_1(k_1, m_1) \quad (52)$$

The sth reception phase shifter $62c_s$ of the sector radar $SRc_s$ (s=2) operates differently from that of the sector radar $SRc_s$ (s=1) in that parameter $\phi_2$ representing the phase rotation amount is different from $\phi_1$ (see Equation (53)). For example, parameters $\phi_1$ and $\phi_2$ are 90° and −90°, respectively.

[Formula 53]

$$ACP_2(k_2, m_2) = \exp\left(-j \text{ floor}\left[\frac{m_2 - 1}{2}\right]\phi_2\right)AC_2(k_2, m_2) \quad (53)$$

The coherent integrator $64c_s$ receives the sliding correlation values $ACP_s(k_s, m_s)$ that are output from the sth reception phase shifter $62c_s$. The coherent integrator $64c_s$ adds together, for each discrete time $k_s$, sliding correlation values $ACP_s(k_s, m_s)$ in a prescribed number (2NP) of transmission cycles $T_r$ (a period $2NP \times T_r$) on the basis of sets of sliding correlation values $ACP_s(k_s, m_s)$ that have been calculated in the $m_s$th transmission cycle $T_r$ for the respective discrete times $k_s$.

The coherent integrator $64c_s$ calculates a $v_s$th coherent integration value $ACC_s(k_s, v_s)$ for each discrete time $k_s$ by adding together, for each discrete time $k_s$, sliding correlation values $ACP_s(k_s, m_s)$ in the prescribed number (2NP) or more of transmission cycles $T_r$ (period $2NP \times T_r$) according to Equation (54). Parameter 2NP represents the number of times of coherent integration performed in the coherent integrator $64c_s$. The coherent integrator $64c_s$ outputs the calculated coherent integration values $ACC_s(k_s, v_s)$ to the distance estimator $65_s$.

[Formula 54]

$$ACC_s(k_s, v_s) = \sum_{m=1}^{2NP} ACP_s(k_s, NP(v_s - 1) + m_s) \quad (54)$$

By setting the prescribed number 2NP at an integer multiple of $2\pi/\phi_s$ in Equation (54), the coherent integrator $64c_s$ can reduce influences of circuit errors even if a reflection wave signal contains circuit errors such as a DC offset component and IQ imbalance. That is, by setting the prescribed number 2NP at an integer multiple of $2\pi/\phi_s$, the radar apparatus 10 can prevent degradation of the target ranging performance even if a reflection wave signal contains circuit errors such as a DC offset component and IQ imbalance. Furthermore, the radar apparatus 10 can improve the reception quality (SNR) of a reflection wave signal by suppressing noise components contained in the reflection wave signal by performing 2NP times of coherent integration.

As such, the radar apparatus 10 according to the modification of the second embodiment can provide the same advantages as the radar apparatus 10 according to the first embodiment.

Embodiment 3

Each of the above embodiments are directed to the case of suppressing interference between radar transmission signals that are transmitted in an asynchronous manner between the two sector radars $SR_1$ and $SR_2$ which are installed being opposed to each other. A third embodiment is directed to a case of suppressing interference between radar transmission signals that are transmitted in an asynchronous manner between $N_R$ sector radars ($N_R$ (natural number)≥3).

In this embodiment, parameter s takes values 1 to $N_R$ and each sector radar is configured in the same manner as the sector radar $SRb_s$ according to the second embodiment or the sector radar $SRc_s$ according to the modification of the second embodiment. In this embodiment, only differences from, for example, the sector radar $STb_s$ according to the second embodiment will be described.

Although this embodiment is directed to a case of using a complementary code as in the second embodiment, the concept of this embodiment is likewise applicable to a case of using the same kind of transmission code as used in the first embodiment. In this case, each sector radar is configured in the same manner as the sector radar Sly according to the first embodiment or the sector radar $SRa_s$ according to the modification of the first embodiment.
(Radar Transmitter)

The sth transmission phase shifter $25b_s$ of the sector radar $SRb_s$ receives a transmission signal $G_s(t_s)$ that is output from the modulator $23b_s$ or the LPF $24_s$. The sth transmission phase shifter $25b_s$ gives a prescribed transmission phase shift to the received transmission signal $G_s(t_s)$ every two transmission cycles on the basis of a transmission timing signal that is output from the pulse transmission controller $21b_s$ every transmission cycle $T_r$ (see FIG. 14).

More specifically, based on a transmission timing signal that is supplied from the pulse transmission controller $21b_s$ in an $m_s$th transmission cycles $T_r$, the sth transmission phase shifter $25b_s$ gives a transmission phase shift $\exp(j\cdot\text{floor}[(m_s-1)/2]\phi_s)$ corresponding to the ordinal number $m_s$ of the transmission cycles $T_r$ to the transmission signal $G_s(t_s)$ every two transmission cycles (see Equation (43)). Parameter $\phi_s$ represents a phase rotation amount (e.g., 90°) that is given in the sth transmission phase shifter $25b_s$, and it is preferable that parameter $\phi_s$ satisfy the relationship of Inequality (9). The sth transmission phase shifter $25b_s$ outputs a transmission-phase-shift-added transmission signal $GP_s(N_r(m_s-1)+t_s)$ to the D/A converter $26_s$.
(Radar Receiver)

The sth reception phase shifter $62b_s$ receives a reception signal $X_s(N_v(m_s-1)+k_s)$ that is output from the A/D converter $61_s$. The sth reception phase shifter $62b_s$ gives a reception phase shift that is opposite in direction to the phase shift component that was given by the sth transmission phase shifter $25b_s$ to the received reception signal $X_s(N_v(m_s-1)+k_s)$ every two transmission cycles on the basis of a transmission timing signal that is output from the pulse transmission controller $21b_s$ every transmission cycle $T_r$.

More specifically, based on a transmission timing signal that is supplied from the pulse transmission controller $21b_s$ in an $m_s$th transmission cycle $T_r$, the reception phase shifter $62b_s$ gives a reception phase shift $\exp(-j\cdot\text{floor}[(m_s-1)/2](-\phi_s))$ corresponding to the ordinal number $m_s$ of the transmission cycle $T_r$ to the reception signal $X_s(N_v(m_s-1)+k_s)$ every two transmission cycles (see Equation (45)). The sth reception phase shifter $62b_s$ outputs a reception-phase-shift-added reception signal $XP_s(N_v(m_s-1)+k_s)$ to the correlation value calculator $63b_s$.

The coherent integrator $64b_s$ receives sliding correlation values $AC_s(k_s, 2z_s-1)$ and $AC_s(k_s, 2z_s)$ that are output from the correlation value calculator $63b_s$. The coherent integrator $64b_s$ adds together sliding correlation values $AC_s(k_s, 2z_s)$ and $AC_s(k_s, 2z_s)$ in a prescribed number (2NP) of transmission cycles $T_r$ (a period 2NP×$T_r$) on the basis of sets of sliding correlation values $AC_s(k_s, 2z_s)$ and $AC_s(k_s, 2z_s)$ that have been calculated in the two (odd-numbered and even-numbered) transmission cycles $T_r$ for the respective discrete times $k_s$.

The coherent integrator $64b_s$ calculates a $v_s$th coherent integration value $ACC_s(k_s, v_s)$ for each discrete time $k_s$ by adding together, for each discrete time $k_s$, sliding correlation values $AC(k_s, 2z_s-1)$ and $AC_s(k_s, 2z_s)$ in the prescribed number 2NP of periods (period 2NP×$T_r$) according to Equation (49). Parameter 2NP represents the number of times of coherent integration performed in the coherent integrator $64b_s$. The coherent integrator $64b_s$ outputs the calculated coherent integration values $ACC_s(k_s, v_s)$ to the distance estimator $65_s$.

By setting the prescribed number 2NP at an integer multiple of $2\pi/\phi_s$ in Equation (49), the coherent integrator $64b_s$ can reduce influences of circuit errors even if a reflection wave signal contains circuit errors such as a DC offset component and IQ imbalance. That is, by setting the prescribed number 2NP at an integer multiple of $2\pi/\phi_s$, the radar apparatus 10 can prevent degradation of the target ranging performance even if a reflection wave signal contains circuit errors such as a DC offset component and IQ imbalance. Furthermore, the radar apparatus 10 can improve the reception quality (SNR) of a reflection wave signal by suppressing noise components contained in the reflection wave signal by performing 2NP times of coherent integration.

The sth transmission phase shifters $25_s$ of the sector radars $SRb_s$ (s=1 to $N_R$) give phase shifts $\phi_s=\phi(q_s, N_R)+\alpha(=((2q_s-1)\pi/N_R)+\alpha)$ that are different from each other in phase rotation direction. With this measure, the sector radars $SRb_s$ can suppress an interference wave signal coming from the other sector radar in similar manners, and can prevent increase of range sidelobes and suppress degradation of the target ranging performance effectively without incorporating circuit error correction circuits even in the case where circuit errors such as a DC offset and IQ imbalance occur.

Parameter $q_s$ (=s−1) takes values 0 to $N_R$−1, and parameter $\alpha$ is a fixed phase value. By performing coherent integration every $2N_R$ transmission cycles, the sth coherent integrator $64_s$ can effectively suppress interference between a radar transmission signal of the sector radar it belongs to and a radar transmission signal coming from another sector radar.

For example, where $N_R$=3 and $\alpha$=0, phase shifts ($\phi_1$, $\phi_2$, $\phi_3$)=($\phi$(−1, 3), $\phi$(1, 3), $\phi$(2, 3)) are set at ($\pi/3$, $-\pi/3$, $\pi$). Performing coherent integration every $2N_R$ transmission cycles, the sth coherent integrator $64b_s$ can effectively suppress interference between a radar transmission signal of the sector radar it belongs to and a radar transmission signal coming from another sector radar.

How the interference suppression effect is obtained will be described for a general case of $2N_R$ transmission cycles. Assume an example case that the sector radar $SR_1$ receives a radar transmission signal of a zth sector radar as an interference wave signal. Parameter z takes values 2 to $N_R$.

The output of the A/D converter $61_s$ (s=1) is given by Equation (55) in the case where a reception signal of an $m_1$th transmission cycle $T_r$ of the sector radar $SR_1$ and a radar transmission signal (interference wave signal) coming from the zth sector radar are involved. Parameters $m_z$ and $N_{delay(z)}$ are given by Equations (56) and (57), respectively.

Furthermore, the output of the A/D converter $61_s$ of the sector radar $SR_1$ is given by Equation (58) in the case where a reception signal of the sector radar $SR_1$ in each of an $(m_1+1)$th to $(m_1+(2N_R-1))$th transmission cycles $T_r$ and a radar transmission signal (interference wave signal) coming from the zth sector radar $SR_z$ are involved if the propagation environment remains the same as in the $m_1$th transmission cycle $T_r$. In Equation (58), parameter w takes values 1 to $(2N_R-1)$.

[Formula 55]

$$X_1(N_v(m_1-1)+k_1) = h_{11}GP_1(N_{TR}\{N_v(m_1-1)+k_1-\lfloor \tau_{11}/\Delta_1 \rfloor\}) + \quad (55)$$
$$\sum_{z=1}^{N_R} h_{1z}GP_z(N_{TR}\{\lfloor \Delta_1\{N_v(m_1-1)+k_1\}/\Delta_z \rfloor - \lfloor \tau_{1z}/\Delta_z \rfloor\}) =$$
$$h_{11}GP_1(N_{TR}\{N_v(m_1-1)+k_1-\lfloor \tau_{11}/\Delta_1 \rfloor\}) +$$
$$h_{1z}GP_z(N_{TR}\{N_v(m_z-1)+N_{delay(z)}\})$$

[Formula 56]

$$m_z = \lfloor \{\lfloor \Delta_1\{N_v(m_1-1)+k_1\}/\Delta_z \rfloor - \lfloor \tau_{1z}/\Delta_z \rfloor\}/N_v \rfloor - 1 \quad (56)$$

[Formula 57]

$$N_{delay(z)} = \mathrm{mod}\{\lfloor \Delta_1\{N_v(m_1-1)+k_1\}/\Delta_z \rfloor - \lfloor \tau_{1z}/\Delta_z \rfloor\}, N_v\} \quad (57)$$

[Formula 58]

$$X_1(N_v(m_1+w-1)+k_1) = \quad (58)$$
$$h_{11}GP_1(N_{TR}\{N_v(m_1+w-1)+k_1-\lfloor \tau_{11}/\Delta_1 \rfloor\}) +$$
$$\sum_{z=1}^{N_R} h_{1z}GP_z(N_{TR}\{N_v(m_z+w-1)+N_{delay(z)}\})$$

The addition value of outputs, that is, sliding correlation values, of the correlation value calculator $63b_s$ of the sector radar $SR_1$ in the $m_1$th to $(m_1+(2N_R-1))$th transmission cycles is given by Equation (59). In Equation (59), the code sequence $C_n$ is one of the complementary code sequences $A_n$ and $B_n$.

[Formula 59]

$$AC_1(k_1, m_1) + \sum_{w=1}^{2N_R-1} AC_1(k_1, m_1+w-1) = \quad (59)$$
$$\sum_{n=1}^{L} XP_1\left(N_v(m_1-1) + \frac{N_o}{N_{TR}}(n-1) + k_1\right)C_n^* +$$
$$\sum_{w=1}^{2N_R-1} \sum_{n=1}^{L} XP_1\left(N_v(m_1+w-1) + \frac{N_o}{N_{TR}}(n-1) + k_1\right)C_n^*$$

The outputs of the sth reception phase shifter $62_s$ of the sector radar $SR_1$ in the $m_1$th transmission cycle $T_r$ and the $(m_1+w)$th transmission cycle $T_r$ are given by Equations (60) and (61), respectively:

[Formula 60]

$$XP_1(N_v(m_1-1)+k_1) = \exp(-j(m_1-1)\phi_1)X_1(N_v(m_1-1)+k_1) = \quad (60)$$
$$\exp(-j(m_1-1)\phi_1)\Big[h_{11}GP_1(N_{TR}\{N_v(m_1-1)+k_1-\lfloor \tau_{11}/\Delta_1 \rfloor\}) +$$
$$\sum_{z=1}^{N_R} h_{1z}GP_z(N_{TR}\{N_v(m_z-1)+N_{delay(z)}\})\Big] =$$
$$h_{11}G_1(N_{TR}\{N_v(m_1-1)+k_1-\lfloor \tau_{11}/\Delta_1 \rfloor\}) +$$
$$\sum_{z=1}^{N_R} h_{1z}\exp(j[(m_z-1)\phi_z-(m_1-1)\phi_1])$$
$$G_2(N_{TR}\{N_v(m_z-1)+N_{delay(z)}\})$$

[Formula 61]

$$XP_1(N_v(m_1+w-1)+k_1) = \quad (61)$$
$$\exp(-j(m_1+w-1)\phi_1)X_1(N_v(m_1+w-1)+k_1) =$$
$$\exp(-j(m_1+w-1)\phi_1)$$
$$[h_{11}GP_1(N_{TR}\{N_v(m_1+w-1)+k_1-\lfloor \tau_{11}/\Delta_1 \rfloor\}) +$$
$$h_{12}GP_2(N_{TR}\{N_v(m_2+w-1)+N_{delay}\})] =$$
$$h_{11}G_1(N_{TR}\{N_v(m_1+w-1)+k_1-\lfloor \tau_{11}/\Delta_1 \rfloor\}) +$$
$$\sum_{z=1}^{N_R} h_{1z}\exp(j[((m_z+w-1)\phi_z-(m_1+w-1)\phi_1])$$
$$G_2(N_{TR}\{N_v(m_z+w-1)+N_{delay(z)}\})$$

The first term of each of Equations (60) and (61) represents a desired signal component that is transmitted from the radar transmitter $TXb_s$ of the sector radar $SR_1$ as a radar transmission signal, reflected by a target $TAR_s$, and received by the radar receiver $RXb_s$ of the sector radar $SR_1$. Therefore, the first terms of the respective Equations (60) and (61) are in phase (see Equation (62)) and hence can provide a coherent integration gain when subjected to the coherent integration according to Equation (59). Symbol $\angle[x]$ is an operator of outputting the phase component of a complex number x.

[Formula 62]

$$\angle[h_{11}G(N_{TR}\{N_v(m_1-1)+k_1-\lfloor \tau_{11}/\Delta_1 \rfloor\})] = \angle[h_{11}G$$
$$(N_{TR}\{N_v(m_1+w-1)+k_1-\lfloor \tau_{11}/\Delta_1 \rfloor\})] \quad (62)$$

On the other hand, the second term of each of Equations (60) and (61) represents an interference wave signal component that is transmitted from the radar transmitter of the zth sector radar as a radar transmission signal, reflected by the target, and received by the radar receiver $RXTb_s$ of the sector radar $SR_1$.

If the carrier frequency error between the sector radar $SR_1$ and the zth sector radar is within an allowable range, that is, if Inequalities (63) hold, the interference wave signal components in the $m_1$th to $(m_1+w)$th transmission cycles have a phase relationship indicated by Equation (64). Equation (65) represents a result of coherent integration of the interference wave signal components by the coherent integrator $64b_s$. Therefore, in the radar apparatus 10, the interference signal components have such a relationship that their signal components are canceled out each other by the coherent integration according to Equation (59) and hence the interference wave signal components can be suppressed effectively as is understood from Equation (65). However, the radar apparatus 10 becomes more prone to be affected by phase variations due to the frequency error $f_{dev}$ as $N_R$ increases. Therefore, $N_R$ has an upper limit that depends on the frequency accuracy of the reference clock signals used in the radar apparatus 10.

[Formulae 63]

$$N_v \Delta_1 \cong N_v \Delta_z, \quad 2\pi f_{dev(z)} wT_r \ll 0.1\pi \tag{63}$$

[Formula 64]

$$Lh_{1z}\exp\left(j[((m_z+w-1)\phi_z - (m_1+w-1)\phi_1])\right)$$
$$G(N_{TR}\{N_v(m_z+w-1) + N_{delay(z)})] -$$
$$Lh_{1z}\exp(j[(m_z-1)\phi_z - (m_1-1)\phi_1])$$
$$G(N_{TR}\{N_v(m_z-1) + N_{delay(z)}\}) =$$
$$w\{\phi_z - \phi_1\} + 2\pi f_{dev} wTr = \frac{2\pi}{N_R}zw + 2\pi f_{dev(z)}wTr \cong \frac{2\pi}{N_R}zw \tag{64}$$

[Formula 65]

$$\left\{AC_1(k_1, m_1) + \sum_{w=1}^{N_R-1} AC_1(k_1, m_1+w-1)\right\}_{INTERFERENCE(z)} = \tag{65}$$

$$\sum_{z=1}^{N_R} |AC_1(k_1, m_1)|_{INTERFERENCE(z)}$$

$$\left\{1 + \sum_{w=1}^{N_R-1} \exp(jw(\phi_z - \phi_1) + 2\pi f_{dev}wTr)\right\} =$$

$$\sum_{z=1}^{N_R} |AC_1(k_1, m_1)|_{INTERFERENCE(z)}$$

$$\left\{1 + \sum_{w=1}^{N_R-1} \exp\left(j\frac{2\pi}{N_R}zw + 2\pi f_{dev}wTr\right)\right\} \cong$$

$$\sum_{z=1}^{N_R} |AC_1(k_1, m_1)|_{INTERFERENCE(z)}$$

$$\left\{1 + \sum_{w=1}^{N_R-1} \exp\left(j\frac{2\pi}{N_R}zw\right)\right\} = 0$$

Although the above description assumes the case that an interference wave signal that originates from the zth sector radar arrives at the sector radar $SR_1$, the same discussion is likewise applicable to a case that an interference wave signal that originates from the sector radar $SR_1$ arrives at the zth sector radar.

Embodiment 4

Figure 16:
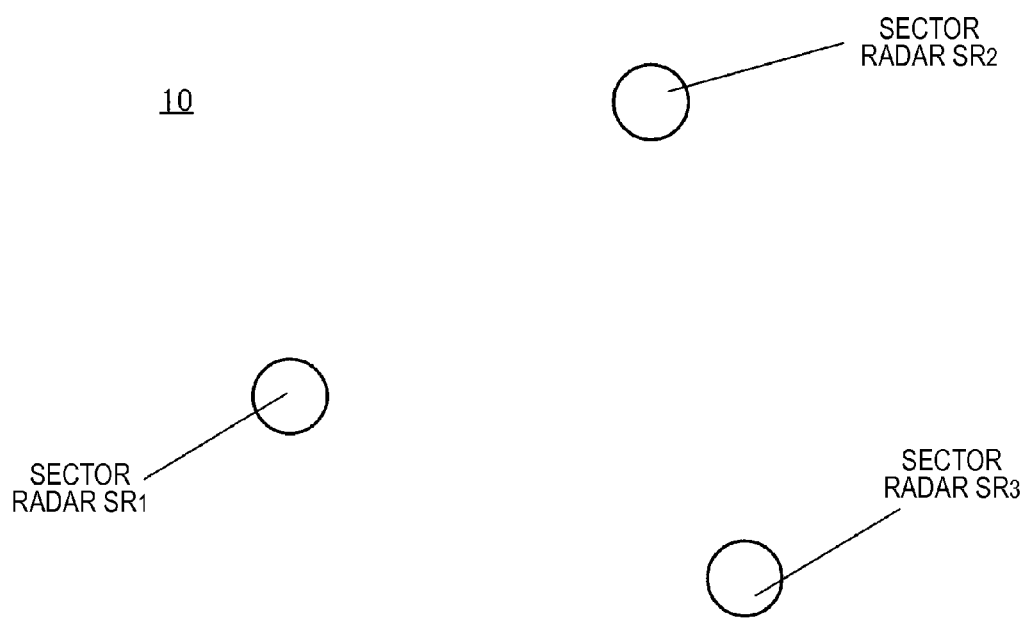
FIG. 16 is an explanatory diagram showing sector radars constituting a radar apparatus according to a third embodiment.

Each of the above embodiments are directed to the case of suppressing interference between radar transmission signals that are transmitted in an asynchronous manner between plural sector radars that are installed being opposed to each other. A fourth embodiment is directed to a case of suppressing interference between radar transmission signals that are transmitted in an asynchronous manner between plural sector radars that are installed being opposed to each other and each of which has plural radar transmitters that transmit radar transmission signals in a synchronous manner and plural radar receivers. The plural sector radars constituting a radar apparatus 10 according to this embodiment installed being opposed to each other as shown in FIG. 2 or 16, for example. In the following description, it is assumed that two sector radars constitute the radar apparatus 10 and hence parameter s takes values 1 and 2.

Figure 17:
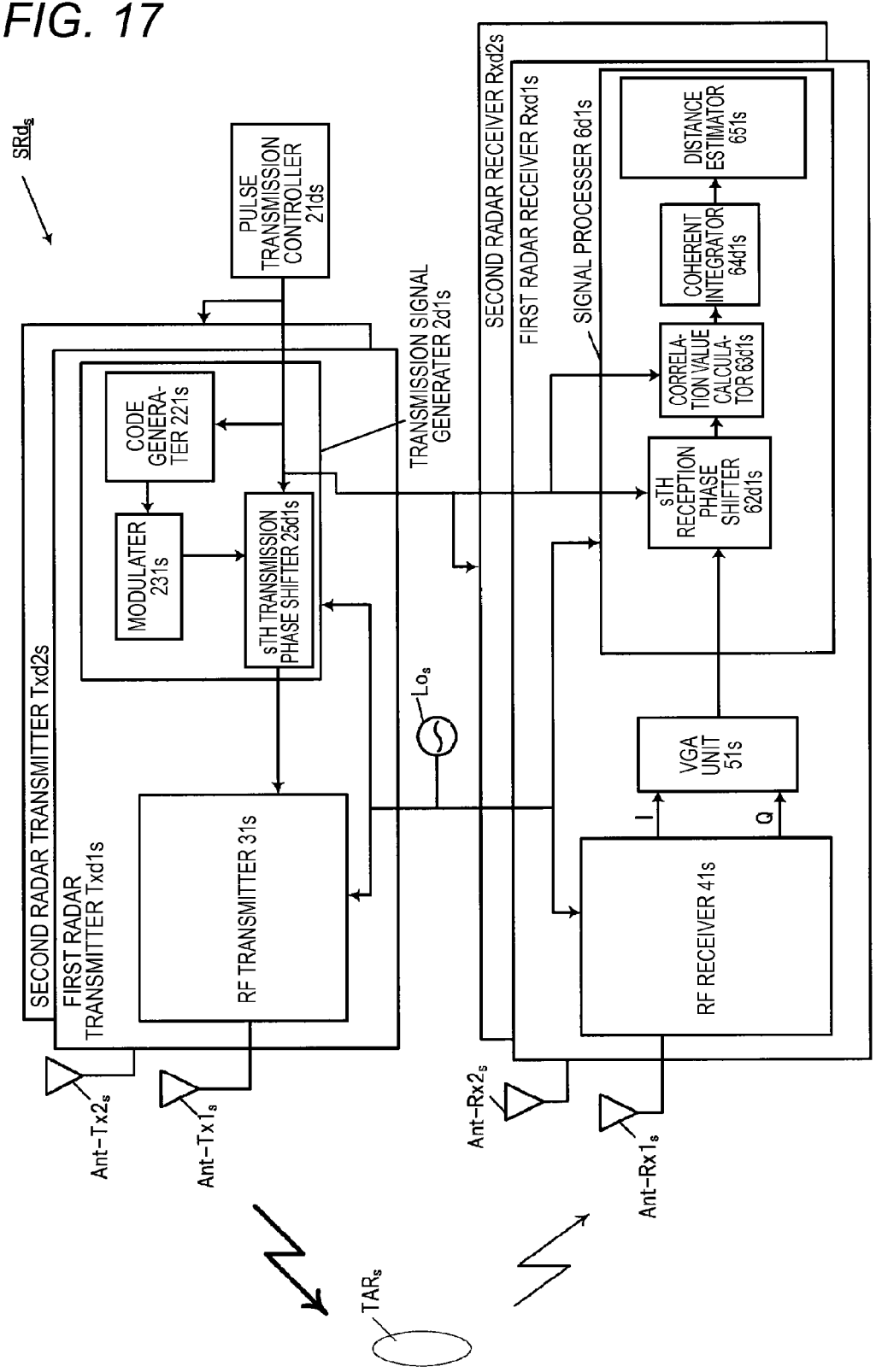
FIG. 17 is a block diagram showing, in a simplified manner, the internal configuration of each sector radar $SRd_s$ (s=1, 2) of a radar apparatus according to a fourth embodiment.
Figure 18:
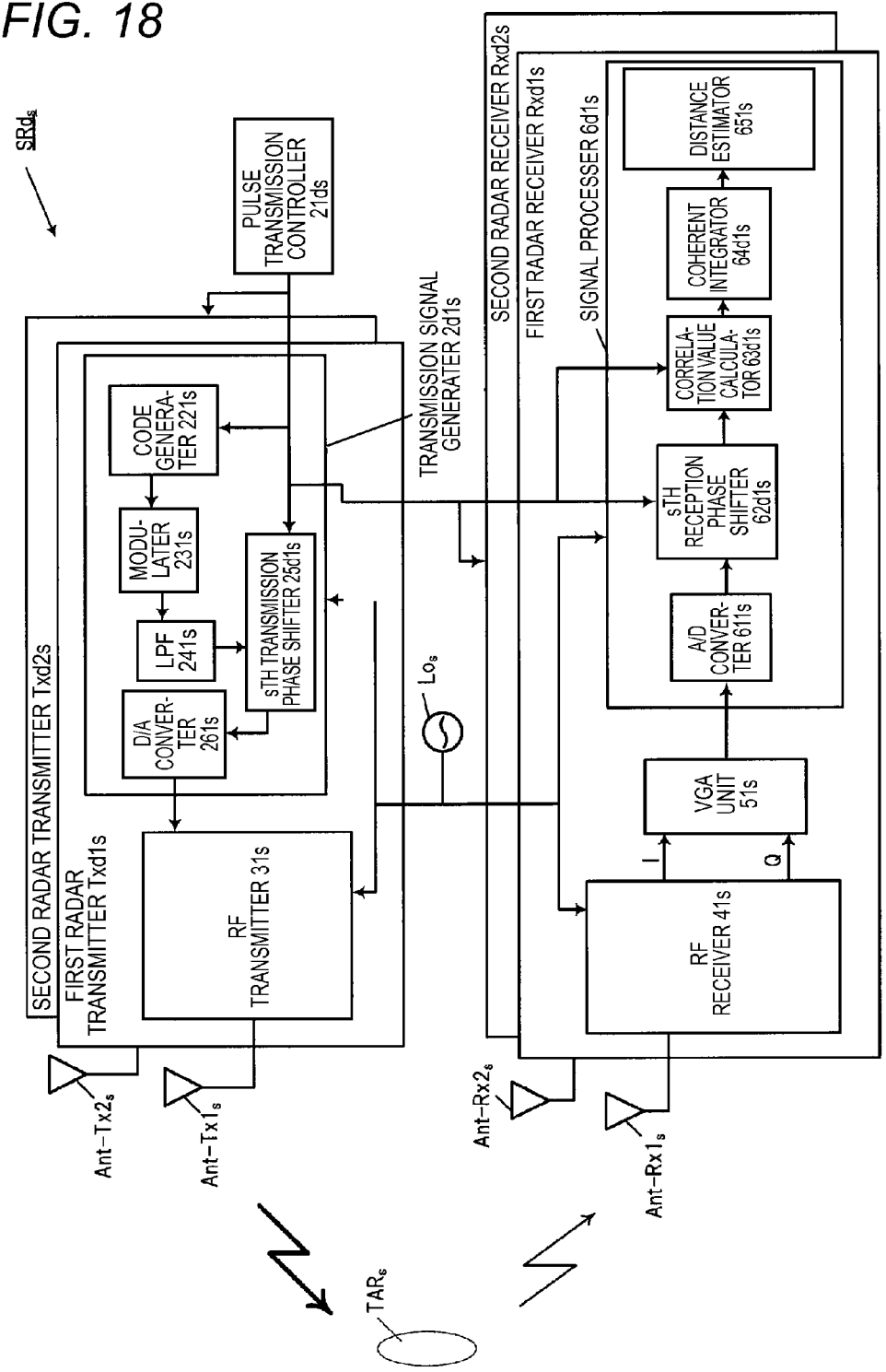
FIG. 18 is a block diagram showing, in detail, the internal configuration of each sector radar $SRd_s$ (s=1, 2) of the radar apparatus according to the fourth embodiment.
Figure 19:
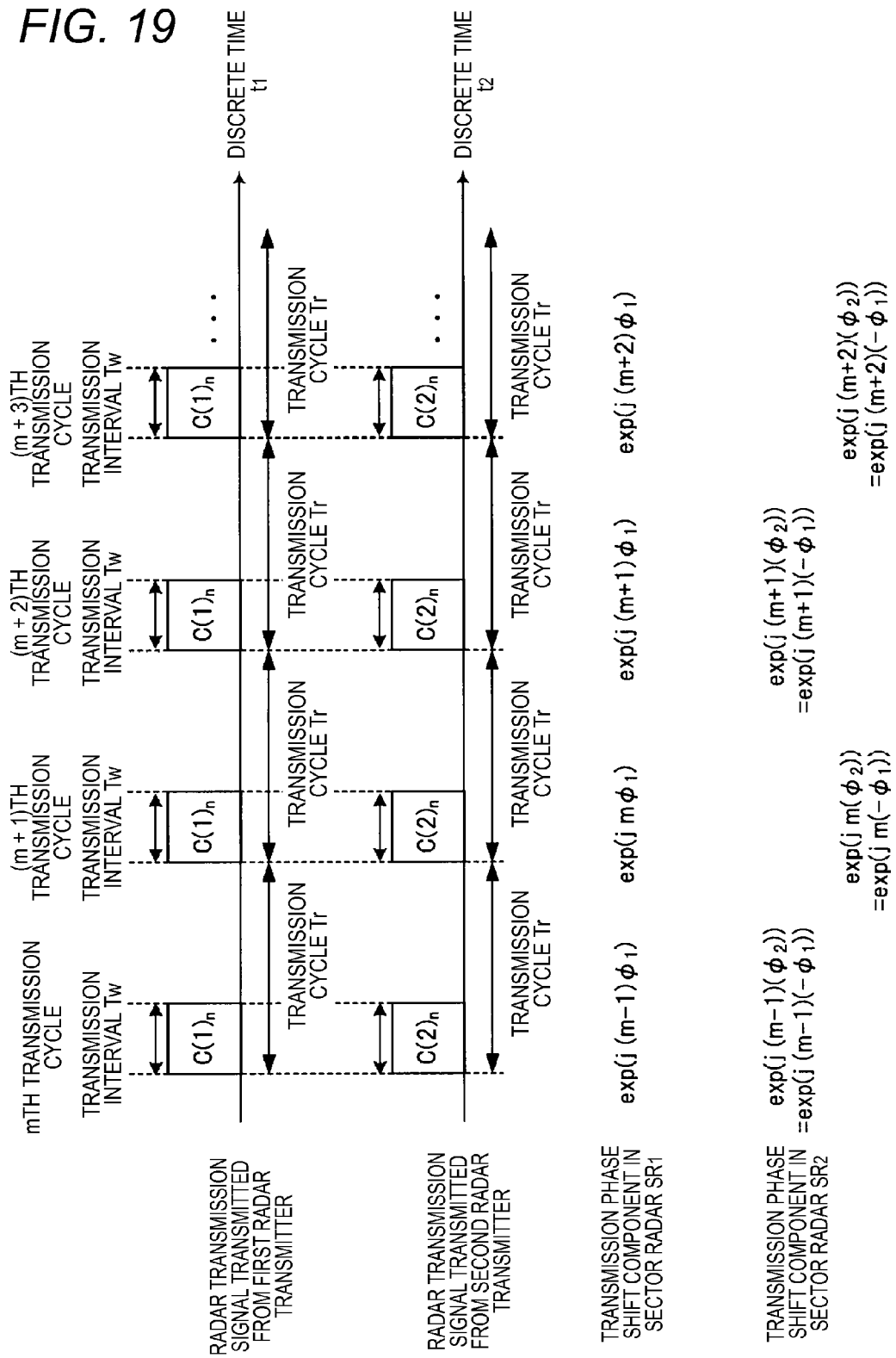
FIG. 19 is an explanatory diagram showing relationships between individual transmission intervals, individual transmission cycles, and individual transmission codes of radar transmission signals of a first radar transmitter and a second radar transmitter of each sector radar $SRd_s$ (s=1, 2) of the radar apparatus according to the fourth embodiment.

FIG. 17 is a block diagram showing, in a simplified manner, the internal configuration of each sector radar $SRd_s$ (s=1, 2) of the radar apparatus 10 according to the fourth embodiment. FIG. 18 is a block diagram showing, in detail, the internal configuration of each sector radar $SRd_s$ (s=1, 2) of the radar apparatus 10 according to the fourth embodiment. FIG. 19 is an explanatory diagram showing relationships between individual transmission intervals, individual transmission cycles, and individual transmission codes of radar transmission signals of a first radar transmitter and a second radar transmitter of each sector radar $SRd_s$ (s=1, 2) of the radar apparatus 10 according to the fourth embodiment.

First, how the individual units of the sector radar $SRd_s$ are configured will be described in a simplified manner. In the following description, operations that are common to the plural radar transmitters or the plural radar receivers of the same sector radar $SRd_s$ will be described in a generic manner using parameter y and different operations of the plural radar transmitters or the plural radar receivers will be described individually. Parameter y takes a value 1 or 2 and represents the ordinal number of each of the radar transmitters and each of the radar receivers of the same sector radar $SRd_s$.

The sector radar $SRd_s$ shown in FIG. 17 is configured so as to include a reference signal oscillator $Lo_s$, a pulse transmission controller $2d1_s$, a first radar transmitter $Txd1_s$, a second radar transmitter $Txd2_s$, a first radar receiver $Rxd1_s$, and a second radar receiver $Rxd2_s$. The first radar transmitter $Txd1_s$ is configured so as to have a transmission signal generator $2d1_s$ and a RF transmitter $31_s$ which is connected to a transmission antenna Ant-$Tx1_s$. The transmission signal generator $2d1_s$ is configured so as to include a code generater $221_s$, a modulator $231_s$, and an sth transmission phase shifter $25d_s$. The transmission antenna Ant-$Tx1_s$ or a reception antenna Ant-$Rx1_s$ may be configured using a transmission antenna element or a reception antenna element. The configuration of the second radar transmitter $Txd2_s$ is the same as that of the first radar transmitter $Txd1_s$ and hence a description therefor will be omitted.

The first radar transmitter $Txd1_s$, the second radar transmitter $Txd2_s$, the first radar receiver $Rxd1_s$, and the second radar receiver $Rxd2_s$ are connected to the reference signal oscillator $Lo_s$ and are supplied with a reference signal from the reference signal oscillator $Lo_s$, whereby pieces of processing performed by the first radar transmitter $Txd1_s$, the second radar transmitter $Txd2_s$, the first radar receiver $Rxd1_s$, and the second radar receiver $Rxd2_s$ are synchronized with each other.

The first radar receiver $Rxd1_s$ is configured so as to have a RF receiver $41_s$, a VGA unit $51_s$, and a signal processor $6d1_s$. The signal processor $6d1_s$ is configured so as to include an sth reception phase shifter $62d1_s$, a correlation value calculator $63d1_s$, a coherent integrator $64d1_s$, and a distance estimator $651_s$. The configuration of the second radar receiver $Rxd2_s$ is the same as that of the first radar receiver $Rxd1_s$ and hence a description therefor will be omitted.

(Yth Radar Transmitter (y=1 or 2))

Next, how the individual units of the yth first radar transmitter Txd1 (y=1) of the sector radar $SRd_s$ are configured will be described in detail with reference to FIG. 18.

The transmission signal generator $2d1_s$ is configured so as to include the code generater $221_s$, the modulater $231_s$, an LPF $241_s$, the sth transmission phase shifter $25d1_s$, and a D/A converter $261_s$. Although in FIG. 18 the transmission signal generater $2d1_s$ includes the LPF $241_s$, the LPF $241_s$ may be provided in the first radar transmitter $Txd1_s$ independently of the transmission signal generater $2d1_s$. The configuration and the manner of operation of the RF transmitter $31_s$ are the same as those of the RF transmitter $3_s$ used in each of the above embodiments, and hence descriptions therefor will be omitted.

Next, how the individual units of each radar transmitter operate will be described in detail for an example case that y is equal to 1 (first radar transmitter $Txd1_s$). However, the following description is likewise applicable to the other case that y is equal to 2 (second radar transmitter $Txd2_s$). In each of the following embodiments, operations that are common to the plural radar transmitters of the same sector radar $SRd_s$ will be described in a generic manner using parameter y and different operations of the plural radar transmitters will be described individually.

The pulse transmission controller $21d_s$ generates a transmission timing signal for a radio-frequency radar transmission signal every transmission cycle $T_r$. The pulse transmission controller $21d_s$ outputs the generated transmission timing signal to the code generator and the sth transmission phase shifter of each of the first radar transmitter $Txd1_s$ and the second radar transmitter $Txd2_s$ and the sth reception phase shifter of each of the first radar receiver $Rxd1_s$ and the second radar receiver $Rxd2_s$.

The transmission signal generater $2d1_s$ generates a transmission reference clock signal by multiplying the reference signal generated by the reference signal oscillator $Lo_s$ by a prescribed number. The individual units of the transmission signal generater $2d1_s$ operate on the basis of the generated transmission reference clock signal. Let $f_{TxBB}$ represent the transmission reference clock frequency; then the transmission cycle $T_r$ is expressed as an integer $N_r$ multiple of a discrete time interval $1/f_{TxBB}$ which is determined by the transmission reference clock frequency $f_{TxBB}$ (see Equation (66)). The transmission reference clock frequency $f_{TxBB}$ is a nominal value and, in actuality, includes a frequency error that varies depending on the radar transmitters $Tx_s$.

[Formula 66]

$$T_r = N_r \times \frac{1}{f_{TxBB}} \quad (66)$$

The transmission signal generater $2d1_s$ periodically generates a baseband transmission signal $G^y_s(t_s)$ (see Equation (67)) by modulating a code sequence $C(1)_n$ having a code length L on the basis of a transmission timing signal (for a radar transmission signal) which is output from the pulse transmission controller $21d_s$ every transmission cycle $T_r$. Parameter n takes values 1 to L, and parameter L represents the code length of the code sequence $C(1)_n$. Parameter j is the imaginary number unit which satisfies $j^2=-1$. Parameter $t_s$ represents discrete time.

[Formula 67]

$$G^y_s(t_s) = I^y_s(t_s) + jQ^y_s(t_s) \quad (67)$$

The transmission signal generater of the second radar transmitter $Txd2_s$ periodically generates a baseband transmission signal $G^y_s(t_s)$ (see Equation (67)) by modulating a code sequence $C(2)_n$ having the code length L on the basis of a transmission timing signal (for a radar transmission signal) which is output from the pulse transmission controller $21d_s$ every transmission cycle $T_r$. The code sequences $C(1)_n$ and $C(2)_n$ are different code sequences which are orthogonal or low in correlation.

As shown in FIG. 19, the transmission signal $G^y_s(t_s)$ is such that, for example, each code element of the code sequence $C(1)_n$ or $C(2)_n$ is modulated using $N_o$ samples of the transmission reference clock signal in the transmission interval $T_w$ (s) of each transmission cycle $T_r$. Therefore, in each transmission interval $T_w$, modulation is done using $N_w$ ($=N_o \times L$) samples. In the silent interval $(T_r-T_w)$ (s) of each transmission cycle $T_r$, modulation is done using $N_u$ ($=N_r-N_w$) samples. Therefore, the transmission signal $G^y_s(t_s)$ of Equation (6) is expressed as Equation (68):

[Formula 68]

$$G^y_s(N_r(m_s-1)+t_s) = I^y_s(N_r(m_s-1)+t_s) + jQ^y_s(N_r(m_s-1)+t_s) \quad (68)$$

The code generator $221_s$ generates a transmission code of the code sequence $C(1)_n$ having the code length L on the basis of a transmission timing signal that is output from the pulse transmission controller $21d_s$ every transmission cycle $T_r$. The code generator $221_s$ outputs the generated transmission code of the code sequence $C(1)_n$ to the modulater $231_s$. That is, the single code generator $221_s$ generates a single code sequence.

The code generator of the second radar transmitter $Txd2_s$ generates a transmission code of the code sequence $C(2)_n$ having the code length L on the basis of a transmission timing signal that is output from the pulse transmission controller $21d_s$ every transmission cycle $T_r$. The code generater outputs the generated transmission code of the code sequence $C(2)_n$ to the modulater. That is, the single code generater generates a single code sequence.

For example, the elements of each of the code sequences $C(1)_n$ and $C(2)_n$ are formed using two values $[-1, 1]$ or four values $[1, -1, j, -j]$. The transmission code is a code sequence of one of, for example, a Barker code sequence, an M-sequence code, and a Gold code sequence which provides a low range sidelobe characteristic.

The modulater $231_s$ receives the transmission code $C(1)_n$ or $C(2)_n$ that is output from the code generator $221_s$. The modulater $231_s$ generates a baseband transmission signal $G^y_s(t_s)$ of Equation (67) by pulse-modulating the received transmission code $C(1)_n$ or $C(2)_n$.

In the baseband transmission signal $G_s(t_s)$ of Equation (67), $I^y_s(t)$ and $Q^y_s(t_s)$ represent the in-phase component and the quadrate component of a modulation signal, respectively. The modulater $231_s$ outputs a transmission signal $G^y_s(t_s)$, in a preset limited band or lower, of the generated transmission signal $G^y_s(t_s)$ to the sth transmission phase shifter $25d1_s$ via the LPF $241_s$. The LPF $241_s$ may be omitted in the transmission signal generater $2d1_s$. This also applies to each of the following embodiments.

Now, how the sth transmission phase shifters of the specific sector radar $SRd_s$ (s=1) operate will be described.

The sth transmission phase shifters of the first radar transmitter Txd1$_s$ and the second radar transmitter Txd1$_s$ receive the transmission signals G$^y_s$(t$_s$) that are output from the modulators or the LPFs, respectively. The transmission phase shifters give a common, prescribed transmission phase shift to the received transmission signals G$^y_s$(t$_s$) every transmission cycle T$_r$ on the basis of a transmission timing signal that is output from the pulse transmission controller 21$d_s$ (see FIG. 19).

More specifically, based on a transmission timing signal that is supplied from the pulse transmission controller 21$d_s$ in an m$_s$th transmission cycle T$_r$, the sth transmission phase shifters of the first radar transmitter Txd1$_s$ and the second radar transmitter Txd1$_s$ give the transmission signals G$^y_s$(t$_s$) a common transmission phase shift exp(j(m$_s$−1)φ$_s$) corresponding to the ordinal number of the transmission cycle T$_r$ every transmission cycle (see Equation (69)). Parameter m$_s$ is a natural number and represents the ordinal number of the transmission cycle T$_r$. Parameter φ$_s$ represents a phase rotation amount (e.g., 90°) given by the sth transmission phase shifters, and it is preferable that parameter φ$_s$ satisfy the relationship of Inequality (9). The sth transmission phase shifters output transmission-phase-shift-added transmission signals GP$^y_s$(N$_r$(m$_s$−1)+t$_s$) to the D/A converters 261$_s$ respectively.

[Formula 69]

$$GP_t^y(N_r(m_1-1)+t_1)=\exp(j(m_1-1)\phi_1)G_t^y(N_r(m_1-1)+t_z) \quad (69)$$

The manner of operation of the sth transmission phase shifters of the sector radar SRd$_s$ (s=2) is different from that of the sth transmission phase shifters of the sector radar SRd$_s$ (s=1) in that parameter φ$_2$ representing the phase rotation amount in the transmission phase shift exp(j(m$_2$−1)φ$_2$) in Equation (70) is different from parameter φ$_1$. For example, parameters φ$_1$ and φ$_2$ are 90° and −90°, respectively.

Furthermore, parameter φ$_1$ in the transmission phase shift given by the sth transmission phase shifters of the first radar transmitter Txd1$_s$ and the second radar transmitter Txd2$_s$ of the sector radar SRd$_s$ (s=1) and parameter φ$_2$ in the transmission phase shift given by the sth transmission phase shifters of the first radar transmitter and the second radar transmitter of the sector radar SRd$_s$ (s=2) are opposite in phase (φ$_1$=φ$_2$).

[Formula 70]

$$GP_2^y(N_r(m_2-1)+t_2)=\exp(j(m_2-1)\phi_2)G_2^y(N_r(m_2-1)+t_2) \quad (70)$$

The D/A converter 261$_s$ converts the digital transmission signal GP$^y_s$(N$_r$(m$_s$−1)+t$_s$) that is output from the sth transmission phase shifter 25$d1_s$ into an analog transmission signal. The D/A converter 261$_s$ outputs the analog transmission signal to the RF transmitter 31$_s$.

(Yth Radar Receiver (y=1 or 2))

Next, how the individual units of the yth first radar receiver Rxd1$_s$ (y=1) of the sector radar SRd$_s$ are configured will be described in detail with reference to FIG. 18.

The first radar receiver Rxd1$_s$ is configured so as to include the RF receiver 41$_s$ to which the reception antenna Ant-Rx1$_s$ is connected, the VGA unit 51$_s$, and the signal processor 6$d1_s$. The configuration and the manner of operation of the RF receiver 41$_s$ are the same as those of the RF receiver 4$_s$ used in each of the above embodiments, and hence descriptions therefor will be omitted. The signal processor 6$d1_s$ is configured so as to include an A/D converter 611$_s$, the sth reception phase shifter 62$d1_s$, the correlation value calculator 63$d1_s$, the coherent integrator 64$d1_s$, and the distance estimator 651$_s$. Each unit of the signal processor 6$d1_s$ performs a calculation periodically with each transmission cycle T$_r$ as a signal processing interval.

Next, how the individual units of each yth radar receiver operate will be described in detail for an example case that y is equal to 1 (first radar receiver Rxd1$_s$). However, the following description is likewise applicable to the other case that y is equal to 2 (second radar transmitter Rxd2$_s$).

The reception antenna Ant-Rx1$_s$ receives a reflection wave signal that is a radar transmission signal transmitted from the first radar transmitter Txd1$_s$ or the second radar transmitter Txd2$_s$ and reflected by a target TAR$_s$ and a radar transmission signal coming from the other sector radar which is installed so as to be opposed to the sector radar SR$_s$ concerned. Each reception signal received by the reception antenna Ant-Rx1$_s$ is input to the RF receiver 41$_s$.

Like the RF transmitter 31$_s$, the RF receiver 41$_s$ generates a reception reference signal in the carrier frequency band by multiplying the reference signal generated by the reference signal oscillator Lo$_s$ by a prescribed number.

The VGA unit 51$_s$ receives a baseband reception signal that is output from the RF receiver 41$_s$ and includes an I signal and a Q signal, and adjusts the output level of the received baseband reception signal into an input range (dynamic range) of the A/D converter 611$_s$.

The VGA unit 51$_s$ outputs the output-level-adjusted baseband reception signal including the I signal and the Q signal to the A/D converter 611$_s$. In the embodiment, to simplify the description, it is assumed that the gain of the VGA unit 51$_s$ is adjusted in advance so that the output level of a reception signal falls within the input range (dynamic range) of the A/D converter 611$_s$.

Like the RF receiver 41$_s$, the signal processor 6$d1_s$ generates a reception reference clock signal by multiplying the reference signal generated by the reference signal oscillator Lo$_s$ by a prescribed number. The individual units of the signal processor 61$_s$ operate on the basis of the generated reception reference clock signal.

Let f$_{RxBB}$ represent the reception reference clock frequency; then the transmission cycle T$_r$ is expressed as an integer N$_v$ multiple of a discrete time interval 1/f$_{RxBB}$ which is determined by the reception reference clock frequency f$_{RxBB}$ (see Equation (71)). It is assumed that the transmission reference clock frequency f$_{TxBB}$ is equal to an integer N$_{TR}$ multiple of the reception reference clock frequency f$_{RxBB}$ (see Equation (72)).

[Formula 71]

$$T_r = N_v \times \frac{1}{f_{R \times BB}} \quad (71)$$

[Formula 72]

$$f_{T \times BB} = N_{TR} \times f_{R \times BB} \quad (72)$$

The A/D converter 611$_s$ receives the reception signal that is output from the VGA unit 51$_s$ and includes the I signal and the Q signal, and converts the analog data reception signal into digital data by sampling the received reception signal including the I signal and the Q signal every discrete time $1/f_{RxBB}$ on the basis of the reception reference clock frequency $f_{RxBB}$.

The A/D converter $611_s$ outputs the digital data reception signal obtained through the conversion done every discrete time k, to the sth reception phase shifter $621$, in the form of discrete sample values. A reception signal $x_s(k_s)$ which is a converted, discrete sample value is expressed as a complex number (see Equation (73)) using an I signal $Ir^y_s(k_s)$ and a Q signal $Q^y r_s(k_s)$ which are discrete sample values at a discrete time $k_s$:

[Formula 73]

$$x^y_s(k_s) = Ir^y_s(k_s) + jQr^y_s(k_s) \quad (73)$$

In an $m_s$th transmission cycle $T_r$, the reception signal $x_s(k_s)$ of Equation (73) which is output from the A/D converter $611_s$ is expressed as a complex baseband signal $X^y_s(N_v(m_s-1)+k_s)$ (see Equation (74)).

[Formula 74]

$$X^y_s(N_v(m_s-1)+k_s) = Ir^y_s(N_v(m_s-1)+k_s) + jQr^y_s(N_v(m_s-1)+k_s) \quad (74)$$

Now, how the sth reception phase shifters of the specific sector radar $SRd_s$ (s=1) operate will be described. The sth reception phase shifters of the first radar receiver $Rx1_s$ and the second radar receiver $Rx2_s$ receive the reception signals $X^y_s(N_v(m_s-1)+k_s)$ that are output from the A/D converters, respectively. The sth reception phase shifters give a common reception phase shift that is opposite in direction to the phase shift component that was given by the sth transmission phase shifters to the received reception signal $X^y_s(N_v(m_s-1)+k_s)$ every transmission cycle on the basis of a transmission timing signal that is output from the pulse transmission controller $21d_s$ every transmission cycle $T_r$.

More specifically, based on a transmission timing signal that is supplied from the pulse transmission controller $21d_s$ in an $m_s$th transmission cycle $T_r$, the sth reception phase shifters give a common reception phase shift $\exp(j(m_s-1)(-\phi_s))$ corresponding to the ordinal number of the transmission cycle $T_r$ to the reception signals $X^y_s(N_v(M_s-1)+k_s)$ every transmission cycle (see Equation (75)), respectively. Parameter $\phi_s$ represents the common phase rotation amount (e.g., $\phi_1=-90°$ given by the sth reception phase shifters, and it is preferable that parameter $\phi_s$ satisfy Inequality (9). The sth reception phase shifters output reception-phase-shift-added reception signals $XP^y_s(N_v(m_s-1)+k_s)$ to the correlation value calculators, respectively.

[Formula 75]

$$XP^y_1(N_v(m_1-1)+k_1) = \exp(-j(m_1-1)\phi_1)X^y_1(N_v(m_1-1)+k_1) \quad (75)$$

The sth reception phase shifters of the sector radar $SRd_s$ (s=2) operate differently from those of the sector radar $SRd_s$ (s=1) in that the phase shift $\phi_2$ representing a phase rotation amount is different from $\phi_1$ (see Equation (76)). For example, parameters $\phi_1$ and $\phi_2$ are 90° and -90°, respectively.

[Formula 76]

$$XP^y_2(N_v(m_2-1)+k_2) = \exp(-j(m_2-1)\phi_2)X^y_2(N_v(m_2-1)+k_2) \quad (76)$$

The correlation value calculator $63d1_s$ receives the reception signal $XP^y_s(N_v(m_s-1)+k_s)$ that is output from the sth reception phase shifter $62d1_s$. Based on the reception reference clock signal obtained by multiplying the reference signal by the prescribed number, the correlation value calculator $63d1_s$ periodically generates, for discrete times $k_s$, a transmission code of the code sequence $C(y)_n$ having the code length L transmitted in the $m_s$th transmission cycle $T_r$.

The correlation value calculator $63d1_s$ calculates sliding correlation values $AC^y_s(k_s, m_s)$ between the received reception signal $XP^y_s(N_v(m_s-1)+k_s)$ and the transmission code $C(y)_n$. Each sliding correlation value $AC^y_s(k_s, m_s)$ is calculated by performing a sliding correlation operation on the transmission code and the reception signal at each discrete time $k_s$ in the $m_s$th transmission cycle $T_r$.

More specifically, the correlation value calculator $63d1_s$ calculates sliding correlation values $AC^y_s(k_s, m_s)$ at discrete times $k_s$ (=1 to $(N_u-N_w)/N_{TR}$) in an $m_s$th transmission cycle $T_r$ (each transmission cycle $T_r$) according to Equation (77). The correlation value calculator $63d1_s$ outputs the sliding correlation values $AC^y_s(k_s, m_s)$ calculated according to Equation (77) to the coherent integrator $64d1_s$. In Equation (77), the asterisk "*" is the complex conjugate operator.

[Formula 77]

$$AC^y_s(k_s, m_s) = \sum_{n=1}^{L} XP^y_s\left(N_v(m_s-1) + \frac{N_o(n-1)}{N_{TR}} + k_s\right)C(y)^*_n \quad (77)$$

Although in each of the embodiments including this embodiment the correlation value calculator $63d1$, performs calculations at discrete times $k_s=1$ to $(N_u-N_w)/N_{TR}$, the measurement range (the range of discrete times $k_s$) may be narrowed further to, for example, $k_s=N_w/N_{TR}+1$ to $(N_u-N_w)/N_{TR}$ in accordance with the range of presence of a target $TAR_s$ to be measured by the radar apparatus 10. With this measure, in the radar apparatus 10, the amount of calculation of the correlation value calculator $63d1_s$ can be reduced further. That is, in the radar apparatus 10, the power consumption can be reduced further as a result of reduction in the calculation amount of the signal processor $6d1_s$.

In the radar apparatus 10, where the correlation value calculator $63d1_s$ calculates sliding correlation values $AC^y_s(k_s, m_s)$ at discrete times $k_s=N_w/N_{TR}+1$ to $(N_u-N_w)/N_{TR}$, measurement of a reflection wave signal in each transmission interval $T_w$ of a radar transmission signal can be omitted.

In the radar apparatus 10, even if a radar transmission signal transmitted goes around to enter the first radar receiver $Rx1_s$ or the second radar receiver $Rx2_s$ directly, a measurement can be performed with its influence eliminated. With the above restriction of the measurement range (the range of discrete times $k_s$), the coherent integrator $64d1_s$ and the distance estimator $651_s$ also operate in the same restricted measurement range.

The coherent integrator $64d1_s$ receives the sliding correlation values $AC^y_s(k_s, m_s)$ that are output from the correlation value calculator $63d1_s$. The coherent integrator $64_s$ adds together sliding correlation values $AC^y_s(k_s, m_s)$ in a prescribed number (NP) of transmission cycles $T_r$ (a period $NP \times T_r$) on the basis of sets of sliding correlation values $AC^y_s(k_s, m_s)$ that have been calculated in the $m_s$th transmission cycle $T_r$ for the respective discrete times $k_s$.

The coherent integrator $64d1_s$ calculates a $v_s$th coherent integration value $ACC^y_s(k_s, v_s)$ for each discrete time $k_s$ by adding together, for each discrete time $k_s$, sliding correlation values $AC_s(1_s, m_s)$ in the prescribed number (NP) of transmission cycles $T_r$ (period $NP \times T_r$) according to Equation (78). Parameter NP represents the number of times of coherent integration performed in the coherent integrator $64d1_s$. The coherent integrator $64d1_s$ outputs the calculated coherent integration values $ACC^y_s(k_s, v_s)$ to the distance estimator $651_s$.

[Formula 78]

$$ACC^y_s(k_s, v_s) = \sum_{m_s=1}^{NP} AC^y_s(k_s, NP(v_s - 1) + m_s) \quad (78)$$

By setting the prescribed number NP at an integer multiple of $2\pi/\phi_s$ in Equation (78), the coherent integrator $64d1_s$ can reduce influences of the circuit errors even if a reflection wave signal contains circuit errors such as a DC offset component and IQ imbalance. That is, by setting the prescribed number NP at an integer multiple of $2\pi/\phi_s$ in the sector radar $SRd_s$, the radar apparatus 10 can prevent degradation of the target ranging performance even if a reflection wave signal contains circuit errors such as a DC offset component and IQ imbalance. Furthermore, the radar apparatus 10 can improve the reception quality (SNR) of a reflection wave signal by suppressing noise components contained in the reflection wave signal by performing NP times of coherent integration.

The sth transmission phase shifters of the first radar receiver $Rx1_s$ and the second radar receiver $Rx2_s$ of each sector radar $SRd_s$ give phase shifts $\phi_s = \phi(q_s, N_i) + \alpha$ $(=((2q_s-1)\pi/N_i) + \alpha)$ that are different from each other in phase rotation direction. With this measure, the sector radars $SRd_s$ can suppress an interference wave signal coming from the other sector radar in similar manners, and can prevent increase of range sidelobes and suppress degradation of the target ranging performance effectively without incorporating circuit error correction circuits even in the case where circuit errors such as a DC offset and IQ imbalance occur.

Parameter $q_s$ (=s-1) takes values 0 to $N_i$-1, and parameter $\alpha$ is a fixed phase value. By performing coherent integration every $N_i$ transmission cycles, each sth coherent integrator can effectively suppress interference between a radar transmission signal of the sector radar it belongs to and a radar transmission signal coming from the other sector radar.

For example, where $N_i=2$, $q_s=1$, and $\alpha=0$, phase shifts ($\phi_1$, $\phi_2$) are set at ($\pi/2$, $-\pi/2$). Performing coherent integration every $N_i$ (two) transmission cycles, each sth coherent integrator $64_s$ can effectively suppress interference between a radar transmission signal of the sector radar it belongs to and a radar transmission signal coming from the other sector radar.

For example, where $N_i=3$, $q_s=1$, and $\alpha=0$, phase shifts ($\phi_1$, $\phi_2$, $\phi_3$)=($\phi(-1, 3)$, $\phi(1, 3)$, $\phi(2, 3)$) are set at ($\pi/3$, $-\pi/3$, $\pi$). Performing coherent integration every $N_i$ (three) transmission cycles, each sth coherent integrator $64_s$ can effectively suppress interference between a radar transmission signal of the sector radar it belongs to and a radar transmission signal coming from the other sector radar.

In this embodiment, each of the coherent integrators $64d1_s$ of the first radar receiver $Rx1_s$ and the second radar receiver $Rx2_s$ of the sector radar $SRd_s$ (s=1) performs coherent integration every two transmission cycles. With this measure, each of the coherent integrator $64d1_s$ of the first radar receiver $Rx1_s$ and the second radar receiver $Rx2_s$ of the sector radar $SRd_s$ (s=1) can effectively suppress interference between a radar transmission signal of the sector radar $SRd_s$ (s=1) and a radar transmission signal coming from the other sector radar $SRd_s$ (s=2). How the interference suppression effect is obtained will be described. Assume an example case that the sector radar $SRd_s$ (s=1) receives a radar transmission signal of the sector radar $SRd_s$ (s=2) as an interference wave signal.

The output of the A/D converter $611_s$ (s=1) is given by Equation (79) in the case where a reception signal of an $m_1$th transmission cycle $T_r$ of the sector radar $SRd_s$ (s=1) and a radar transmission signal (interference wave signal) coming from the sector radar $SRd_s$ (s=2) are involved.

[Formula 79]

$$X^y_1(N_v(m_1 - 1) + k_1) = \sum_{y=1}^{2} h^y_{11} GP^y_1 \left( N_{TR} \left\{ \begin{array}{c} N_v(m_1 - 1) + \\ k_1 - \lfloor \tau^y_{11}/\Delta_1 \rfloor \end{array} \right\} \right) + \quad (79)$$

$$\sum_{y=1}^{2} h^y_{12} GP^y_2(N_{TR}\{\lfloor \Delta_1\{N_v(m_1 - 1) + k_1\}/\Delta_2 \rfloor - \lfloor \tau^y_{12}/\Delta_2 \rfloor\}) =$$

$$\sum_{y=1}^{2} h^y_{11} GP^y_1 \left( N_{TR} \left\{ \begin{array}{c} N_v(m_1 - 1) + \\ k_1 - \lfloor \tau^y_{11}/\Delta_1 \rfloor \end{array} \right\} \right) +$$

$$\sum_{y=1}^{2} h^y_{12} GP^y_2(N_{TR}\{N_v(m_2 - 1) + N^y_{delay}\})$$

The first term of Equation (79) represents a desired signal component that is transmitted from the respective radar transmitters of the sector radar $SRd_s$ (s=1) as radar transmission signals, reflected by a target $TAR_s$, and received by each radar receiver of the sector radar $SRd_s$ (s=1). The second term of Equation (79) represents an interference wave signal component that is transmitted from the respective radar transmitters of the sector radar $SRd_s$ (s=2) as radar transmission signals, reflected by the same target $TAR_s$, and received by each radar receiver of the sector radar $SRd_s$ (s=1).

In Equation (79), parameter $h^y_{11}$ represents an amplitude and phase attenuation coefficient of a case that a radar transmission signal transmitted from a yth radar transmitter of the sector radar $SRd_s$ (s=1) is received by a yth radar receiver of the sector radar $SRd_s$ (s=1). Parameter $h^y_{12}$ represents an amplitude and phase attenuation coefficient of a case that a radar transmission signal transmitted from a yth radar transmitter of the sector radar $SRd_s$ (s=2) is received by the yth radar receiver of the sector radar $SRd_s$ (s=1). Parameters $m_2$ and $N_{delay}$ are given by Equations (80) and (81), respectively:

[Formula 80]

$$m_2 = \lfloor \{ \lfloor \Delta_1 \{ N_c(m_1-1)+k_1 \}/\Delta_2 \rfloor - \lfloor \tau_{12}^y/\Delta_2 \rfloor \}/N_v \rfloor - 1 \quad (80)$$

[Formula 81]

$$N_{delay}^y = \mathrm{mod}\{ \lfloor \Delta_1\{N_r(m_1-1)+k_1\}/\Delta_2 \rfloor - \lfloor \tau_{12}^y/\Delta_2 \rfloor \}, N_v\} \quad (81)$$

Symbol "$\lfloor x \rfloor$" is an operator of outputting the integer part of a real number x. Parameter $\tau_{11}^y$ is the delay time that is taken by a radar transmission signal transmitted from the sector radar $SRd_s$ (s=1) to be reflected by a target $TAR_s$ (s=1) and received by the sector radar $SRd_s$ (s=1). It is assumed that parameter $\tau_{11}^y$ of the case of y=1 is in the same transmission cycle $T_r$ as parameter $\tau_{11}^y$ of the case of y=2.

Parameter $\tau_{12}^y$ is the delay time that is taken by a radar transmission signal transmitted from the sector radar $SRd_s$ (s=2) to be reflected by a target $TAR_s$ (s=2) or travel directly and be received by the sector radar $SRd_s$ (s=1). It is assumed that parameter $\tau_{12}^y$ of the case of y=1 is in the same transmission cycle $T_r$ as parameter $\tau_{12}^y$ of the case of y=2.

To simplify the description, no filter response characteristics of the radar transmitters $TX_s$ and the radar receivers $Rx_s$ of each sector radar $SRd_s$ are taken into consideration.

Furthermore, the output of the A/D converter $611_s$ of the sector radar $SRd_s$ (s=1) is given by Equation (82) in the case where a reception signal of a yth radar receiver of the sector radar $SRd_s$ (s=1) in an $(m_1+1)$th transmission cycle $T_r$ and a radar transmission signal (interference wave signal) coming from the sector radar $SRd_s$ (s=2) are involved if it is assumed that the propagation environment is the same as in the $m_1$th transmission cycle $T_r$. The phrase "the propagation environment is the same as in the $m_1$th transmission cycle $T_r$" means that the complex attenuation coefficients $h_{11}^y$ and $h_{12}^y$ and the delay times $\tau_{11}^y$ and $\tau_{12}^y$ can be regarded as remaining unchanged.

[Formula 82]

$$X_1^y(N_v(m_1+w-1)+k_1) = \sum_{y=1}^{2} h_{11}^y GP_1^y \left( N_{TR} \left\{ \begin{array}{c} N_v(m_1+w-1)+ \\ k_1 - \lfloor \tau_{11}^y/\Delta_1 \rfloor \end{array} \right\} \right) + \sum_{y=1}^{2} h_{12}^y GP_2^y(N_{TR}\{N_v(m_2+w-1)+N_{delay}^y\}) \quad (82)$$

The addition value of outputs, that is, sliding correlation values, of the correlation value calculator of a yth radar receiver of the sector radar $SRd_s$ (s=1) in $N_i$ transmission cycles, that is, an $m_1$th transmission cycle and an $(m_1+(N_i-1))$th transmission cycle, is given by Equation (83). In Equation (83), the code sequence $C_n$ is one of code sequences $A_n$ and $B_n$.

[Formula 83]

$$AC_1^y(k_1, m_1) + \sum_{w=1}^{N_i-1} AC_1^y(k_1, m_1+w-1) = \quad (83)$$

$$\sum_{n=1}^{L} XP_1^y \left( N_v(m_1-1) + \frac{N_o}{N_{TR}}(n-1) + k_1 \right) C(y)_n^* +$$

$$\sum_{w=1}^{N_i-1} \sum_{n=1}^{L} XP_1^y \left( N_v(m_1+w-1) + \frac{N_o}{N_{TR}}(n-1) + k_1 \right) C(y)_n^*$$

The outputs of each sth reception phase shifter of the sector radar $SRd_s$ (s=1) in the $m_1$th transmission cycle $T_r$ and the $(m_1+w)$th transmission cycle $T_r$ are given by Equations (84) and (85), respectively:

[Formula 84]

$$XP_1^y \left( \begin{array}{c} N_v(m_1-1)+ \\ k_1 \end{array} \right) = \exp(-j(m_1-1)\phi_1) X_1^y(N_v(m_1-1)+k_1) \quad (84)$$

$$= \exp(-j(m_1-1)\phi_1) \left[ \begin{array}{c} \sum_{y=1}^{2} h_{11}^y GP_1^y \left( N_{TR} \left\{ \begin{array}{c} N_v(m_1-1)+ \\ k_1 - \lfloor \tau_{11}^y/\Delta_1 \rfloor \end{array} \right\} \right) + \\ \sum_{y=1}^{2} h_{12}^y GP_2^y \left( N_{TR} \left\{ \begin{array}{c} N_v(m_2-1)+ \\ N_{delay}^y \end{array} \right\} \right) \end{array} \right]$$

$$= \exp(-j(m_1-1)\phi_1) \left[ \begin{array}{c} \sum_{y=1}^{2} h_{11}^y \exp(j(m_1-1)\phi_1) G_1^y \left( N_{TR} \left\{ \begin{array}{c} N_v(m_1-1)+ \\ k_1 - \lfloor \tau_{11}^y/\Delta_1 \rfloor \end{array} \right\} \right) + \\ \sum_{y=1}^{2} h_{12}^y \exp(j(m_2-1)\phi_2) G_1^y \left( N_{TR} \left\{ \begin{array}{c} N_v(m_2-1)+ \\ N_{delay}^y \end{array} \right\} \right) \end{array} \right] +$$

$$\sum_{y=1}^{2} h_{11}^y G_1^y \left( N_{TR} \left\{ \begin{array}{c} N_v(m_1-1)+ \\ k_1 - \lfloor \tau_{11}^y/\Delta_1 \rfloor \end{array} \right\} \right) +$$

$$\sum_{d=1}^{2} h_{12}^y \exp\left( j \left[ \begin{array}{c} (m_2-1)\phi_2 - \\ (m_1-1)\phi_1 \end{array} \right] \right) G_1^y(N_{TR}\{N_v(m_2-1)+N_{delay}^y\})$$

[Formula 85]

$$XP_1^y\begin{pmatrix} N_v\begin{pmatrix} m_1+ \\ w-1 \end{pmatrix}+ \\ k_1 \end{pmatrix} = \exp\left(-j\begin{pmatrix} m_1+ \\ w-1 \end{pmatrix}\phi_1\right)X_1^y\left(N_v\begin{pmatrix} m_1+ \\ w-1 \end{pmatrix}+k_1\right) \qquad (85)$$

$$= \exp\left(-j\begin{pmatrix} m_1+ \\ w-1 \end{pmatrix}\phi_1\right)\begin{bmatrix} \sum_{y=1}^{2} h_{11}^y GP_1^y\left(N_{TR}\left\{\begin{array}{c} N_v\begin{pmatrix} m_1+ \\ w-1 \end{pmatrix}+ \\ k_1-\lfloor\tau_{11}^y/\Delta_1\rfloor \end{array}\right\}\right)+ \\ \sum_{y=1}^{2} h_{12}^y GP_2^y\left(N_{TR}\left\{\begin{array}{c} N_v\begin{pmatrix} m_2+ \\ w-1 \end{pmatrix}+ \\ N_{delay}^y \end{array}\right\}\right) \end{bmatrix}$$

$$= \exp\left(-j\begin{pmatrix} m_1+ \\ w-1 \end{pmatrix}\phi_1\right)\begin{bmatrix} \sum_{y=1}^{2} h_{11}^y\exp\left(j\begin{pmatrix} m_1+ \\ w-1 \end{pmatrix}\phi_1\right)G_1^y\left(N_{TR}\left\{\begin{array}{c} N_v\begin{pmatrix} m_1+ \\ w-1 \end{pmatrix}+ \\ k_1-\lfloor\tau_{11}^y/\Delta_1\rfloor \end{array}\right\}\right)+ \\ \sum_{y=1}^{2} h_{12}^y\exp\left(j\begin{pmatrix} m_2+ \\ w-1 \end{pmatrix}\phi_2\right)G_1^y\left(N_{TR}\left\{\begin{array}{c} N_v\begin{pmatrix} m_2+ \\ w-1 \end{pmatrix}+ \\ N_{delay}^y \end{array}\right\}\right) \end{bmatrix} +$$

$$\sum_{y=1}^{2} h_{11}^y G_1^y\left(N_{TR}\left\{\begin{array}{c} N_v\begin{pmatrix} m_1+ \\ w-1 \end{pmatrix}+ \\ k_1-\lfloor\tau_{11}^y/\Delta_1\rfloor \end{array}\right\}\right) +$$

$$\sum_{y=1}^{2} h_{12}^y\exp\left(j\left[\begin{array}{c} \begin{pmatrix} m_2+ \\ w-1 \end{pmatrix}\phi_2 - \\ \begin{pmatrix} m_1+ \\ w-1 \end{pmatrix}\phi_1 \end{array}\right]\right)G_1^y\left(N_{TR}\left\{N_v\begin{pmatrix} m_2+ \\ w-1 \end{pmatrix}+N_{delay}^y\right\}\right)$$

The first term of each of Equations (84) and (85) represents a desired signal component that is transmitted from the respective radar transmitters TXd1$_s$ of the sector radar SRd$_s$ (s=1) as radar transmission signals, reflected by a target TAR$_s$, and received by the radar receiver RXd1$_s$. Therefore, the first terms of the respective Equations (84) and (85) are in phase (see Equation (86)) and hence can provide a coherent integration gain when subjected to the coherent integration according to Equation (83). Symbol ∠[x] is an operator of outputting the phase component of a complex number x.

[Formula 86]

$$\angle[h_{11}^y G_1^y(N_{TR}\{N_v(m_1-1)+k_1-\lfloor\tau_{11}^y/\Delta_1\rfloor\})] = \angle[h_{11}^y G_1^y \\ (N_{TR}\{N_v(m_1+w-1)+k_1-\lfloor\tau_{11}^y/\Delta_1\rfloor\})] \qquad (86)$$

On the other hand, the second term of each of Equations (84) and (85) represents an interference wave signal component that is transmitted from the radar transmitters of the sector radar SRd$_s$ (s=2) as radar transmission signals, reflected by the target TAR$_s$, and received by each radar receiver RXd1$_s$ of the sector radar SRd$_s$ (s=1).

If the carrier frequency error between the sector radar SRd$_s$ (s=1) and the sector radar SRd$_s$ (s=2) is within an allowable range, that is, if Inequalities (63) hold, interference wave signal components in the m$_1$th transmission cycle and the (m$_1$+w)th transmission cycle are in a phase relationship indicated by Equation (87).

[Formula 87]

$$\angle h_{12}^y\exp(j[(m_2+w-1)\phi_2 - ((m_1+w-1)\phi_1]) \qquad (87)$$
$$G_1^y(N_{TR}\{N_v(m_2+w-1)+N_{delay}^y\}) - $$
$$\angle h_{12}^y\exp(j[(m_2-1)\phi_2 - (m_1-1)\phi_1])$$
$$G_1^y(N_{TR}\{N_v(m_2-1)+N_{delay}\}) = $$
$$w\{\phi_2 - \phi_1\} + 2\pi f_{dev}wTr = -2\frac{\pi q}{N_p}w + 2\pi f_{dev}wTr$$

In Equation (87), parameter f$_{dev}$ represents the carrier frequency error between the sector radar SRd$_s$ (s=1) and the sector radar SRd$_s$ (s=2) which is defined by a carrier frequency error due to a frequency error of the transmission reference clock signal and a sampling frequency error due to a frequency error of the reception reference clock signal.

If the carrier frequency error between the sector radars SRd$_1$ and the sector radar SRd$_2$ is within an allowable range, that is, if Inequalities (63) hold, interference wave signal components in the m$_1$th transmission cycle to the (m$_1$+w)th transmission cycle have a phase relationship indicated by Equation (87). Equation (88) represents a result of coherent integration performed on interference signal components by each coherent integrator 64d$_s$. Therefore, in the radar apparatus 10, the interference components have such a phase relationship as to be canceled out each other as is understood from Equation (88) and hence the interference wave signal components can be suppressed effectively. However, the radar apparatus 10 becomes more prone to be affected by phase variations due to the frequency error f$_{dev}$ as N$_i$ increases. Therefore, $N_i$ has an upper limit that depends on the frequency accuracy of the reference clock signals used in the radar apparatus 10.

[Formula 88]

$$\left\{ AC_1^y(k_1, m_1) + \sum_{w=1}^{N_i-1} AC_1^y(k_1, m_1 + w - 1) \right\}_{INTERFERENCE(y)} = \qquad (88)$$

$$\{AC_1^y(k_1, m_1)\}_{INTERFERENCE(y)}$$

$$\left\{ 1 + \sum_{w=1}^{N_i-1} \exp(jw(\phi_2 - \phi_1) + 2\pi f_{dev} w T_r) \right\} =$$

$$\{AC_1^y(k_1, m_1)\}_{INTERFERENCE(y)}$$

$$\left\{ 1 + \sum_{w=1}^{N_i-1} \exp\left[-j\left(\frac{2\pi q}{N_i} w + 2\pi f_{dev} w T_r\right)\right] \right\} \cong 0$$

Although the above description assumes a case that an interference wave signal that originates from the sector radar $SRd_s$ (s=2) arrives at the sector radar $SRd_s$ (s=1), the same discussion is likewise applicable to a case that an interference wave signal that originates from the sector radar $SRd_s$ (s=1) arrives at the sector radar $SRd_s$ (s=2).

The distance estimator 651$_s$ receives coherent integration values $ACC_s^y(k_s, v_s)$ at respective discrete times $k_s$ that are output from the coherent integrator 641$_s$ every NP transmission cycles $T_r$. The distance estimator 651$_s$ estimates a distance to the target TAR on the basis of the received coherent integration values $ACC_s^y(k_s, v)$ at the respective discrete times $k_s$. For example, the estimation method disclosed in the above-mentioned Referential non-patent document 3 can be applied to the distance estimation performed in the distance estimator 651$_s$.

The square of the absolute value of each of coherent integration values that are obtained in the $v_s$th output cycle ($v_s \times NP \times T_r$) and supplied from the coherent integrator 641$_s$, $|ACC_s^y(k_s, v_s)|^2$, corresponds to a reception level of a reflection wave signal at each discrete time $k_s$. The distance estimator 651$_s$ estimates a distance $\text{Range}(k_{ps})$ according to Equation (31) on the basis of a detection time $k_{ps}$ of a peak reception level that is higher than an environment noise level of the sector radar $SRd_s$ by a prescribed value or more. In Equation (31), parameter $C_0$ represents the speed of light.

Operating in the above-described manner, in the case where plural sector radars are installed being opposed to each other, the radar apparatus 10 according to the fourth embodiment can suppress interference between the sector radars with a simple configuration by making it unnecessary to synchronize transmission cycles between the sector radars opposed to each other. Furthermore, the radar apparatus 10 can prevent increase of range sidelobes and suppress degradation of the target ranging performance effectively without incorporating circuit error correction circuits even in the case where circuit errors such as a DC offset and IQ imbalance occur.

Embodiment 5

The radar apparatus 10 according to the fifth embodiment is different from that according to the fourth embodiment in that a complementary code is used as the transmission code.

Figure 20:
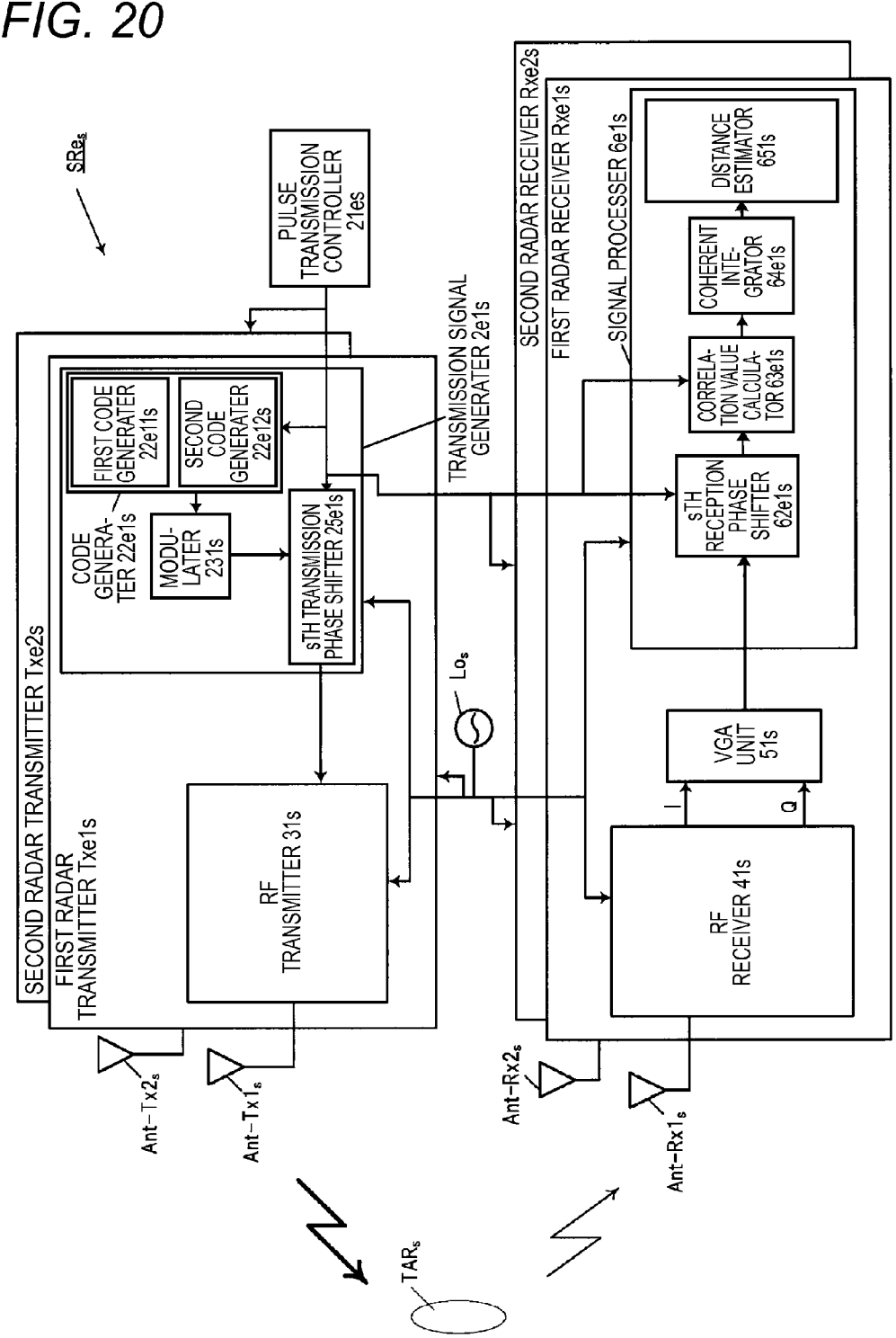
FIG. 20 is a block diagram showing, in a simplified manner, the internal configuration of each sector radar $SRe_s$ (s=1, 2) of a radar apparatus according to a fifth embodiment.
Figure 21:
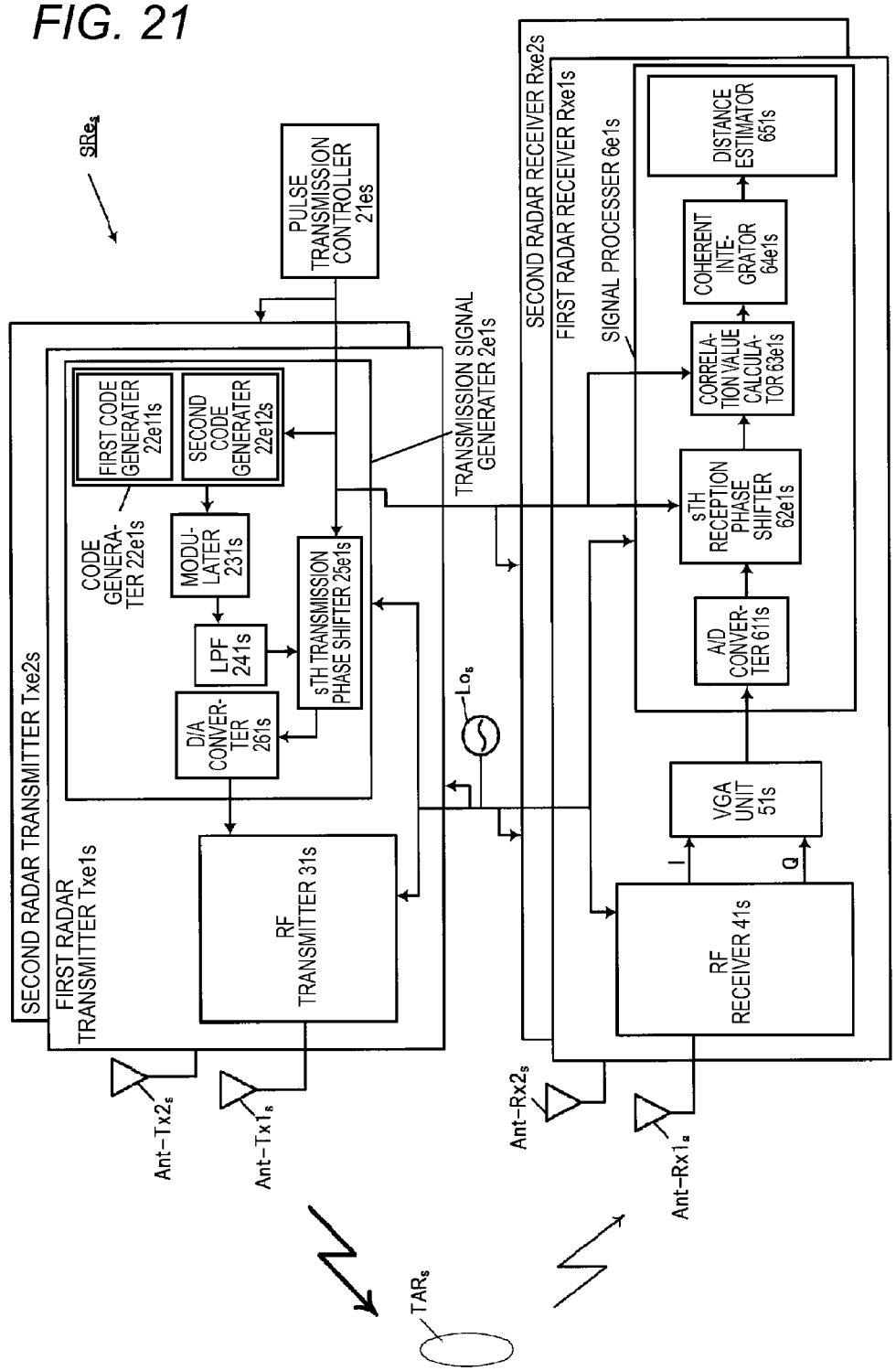
FIG. 21 is a block diagram showing, in detail, the internal configuration of each sector radar $SRe_s$ (s=1, 2) of the radar apparatus according to the fifth embodiment.
Figure 22:
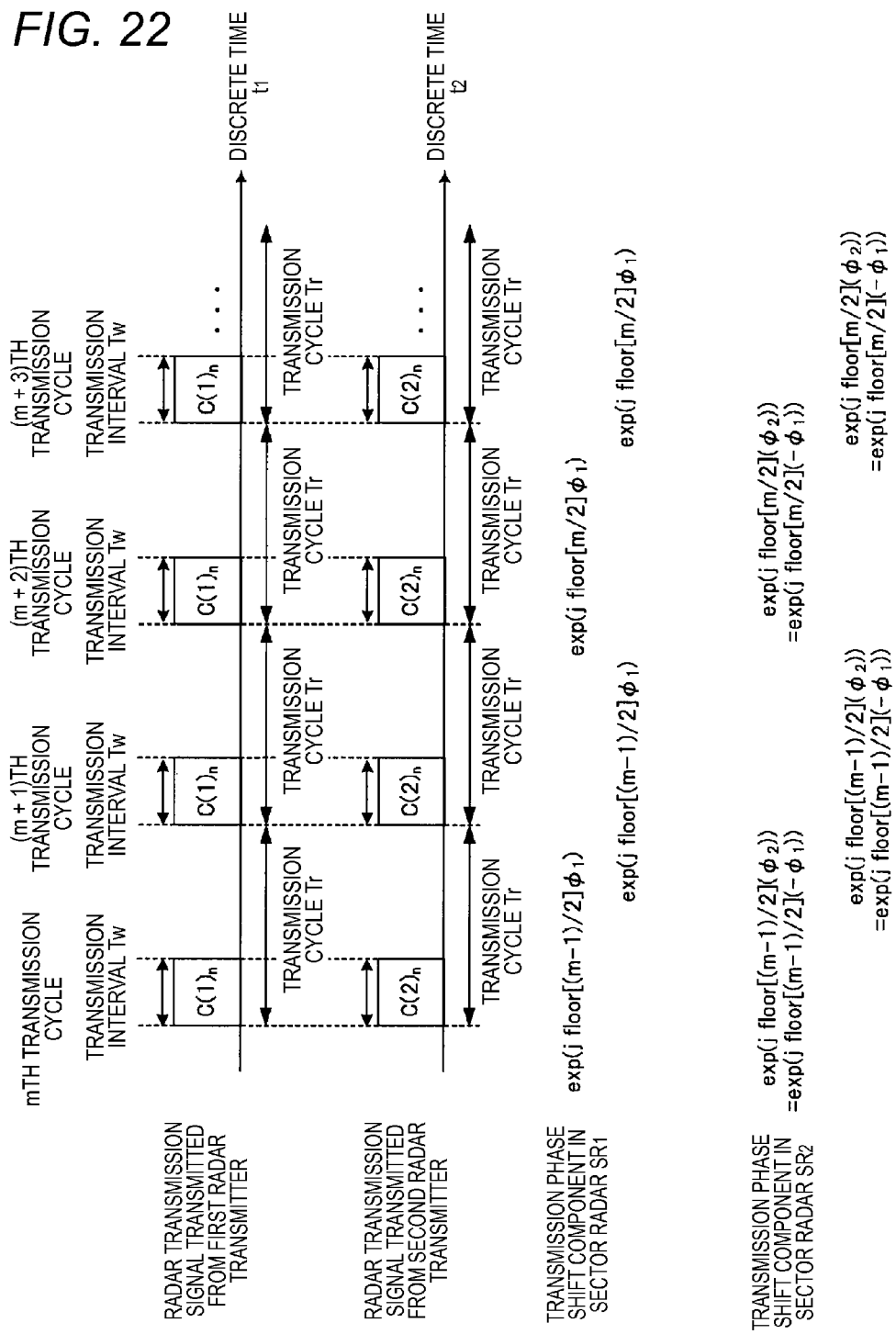
FIG. 22 is an explanatory diagram showing relationships between individual transmission intervals, individual transmission cycles, and individual transmission codes of radar transmission signals of a first radar transmitter and a second radar transmitter of each sector radar $SRe_s$ (s=1, 2) of the radar apparatus according to the fifth embodiment.
Figure 23:
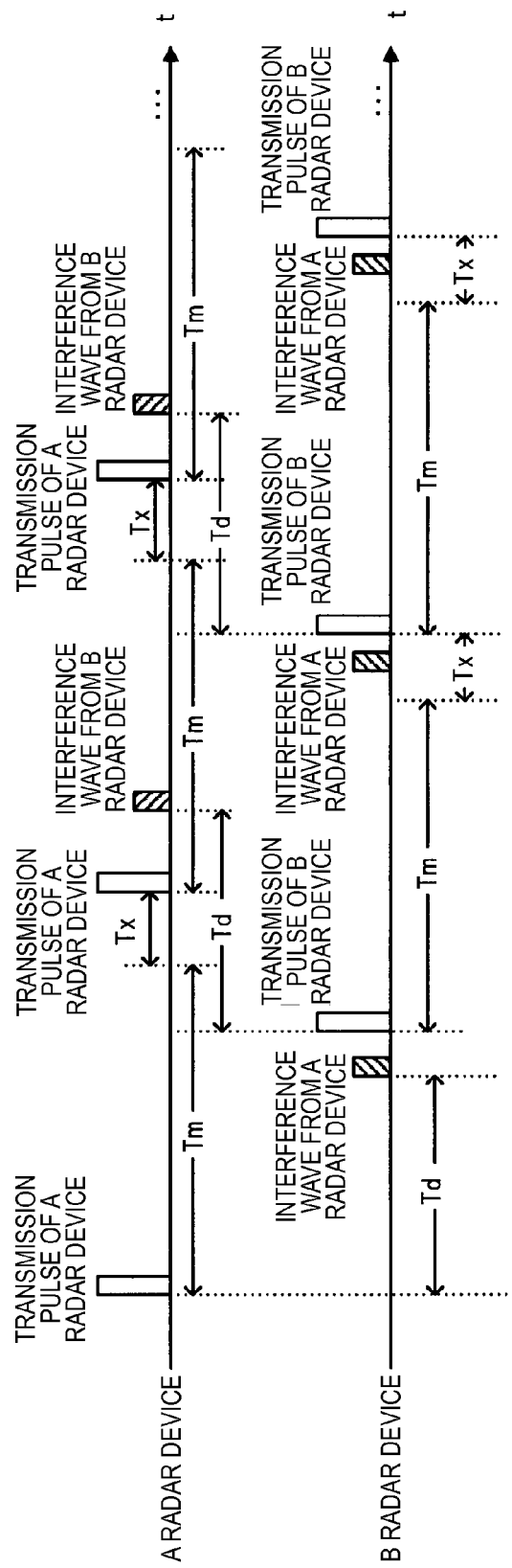
FIG. 23 is an explanatory diagram (timing chart) for description of how a conventional radar apparatus operates.

How each of sector radars $SRe_s$ (s=1, 2) constituting the radar apparatus 10 according to the fifth embodiment is configured and operates will be described with reference to FIGS. 20-22. FIG. 20 is a block diagram showing, in a simplified manner, the internal configuration of each sector radar $SRe_s$ (s=1, 2) of the radar apparatus 10 according to the fifth embodiment. FIG. 21 is a block diagram showing, in detail, the internal configuration of each sector radar $SRe_s$ (s=1, 2) of the radar apparatus 10 according to the fifth embodiment. FIG. 22 is an explanatory diagram showing relationships between individual transmission intervals, individual transmission cycles, and individual transmission codes of radar transmission signals of a first radar transmitter and a second radar transmitter of each sector radar $SRe_s$ (s=1, 2) of the radar apparatus 10 according to the fifth embodiment.

Units (blocks) of the sector radar $SRe_s$ having the same (in configuration and operation) units in the sector radar $SRd_s$ will be given the same reference symbols as the latter, and their configurations and operations will not be described (only differences will be described).

As shown in FIG. 20, the radar apparatus $SRe_s$ is configured so as to include the reference signal oscillator $Lo_s$, a pulse transmission controller 21e$_s$, a first radar transmitter $Txe1_s$, a second radar transmitter $Txe2_s$, a first radar receiver $Rxe1_s$, and a second radar receiver $Rxe2_s$. The first radar transmitter $Txe1_s$ is configured so as to have a transmission signal generator 2e1$_s$ and the RF transmitter 31$_s$ which is connected to the transmission antenna Ant-Tx1$_s$. The transmission signal generator 2e1$_s$ is configured so as to include a code generator 22e1, a modulater 231$_s$, and an sth transmission phase shifter 25e1$_s$. The code generator 22e1$_s$ includes, as at least one code generator, a first code generator 22e11$_s$ and a second code generator 22e12$_s$ and generates at least one code sequence.

The first radar transmitter $Txe1_s$, the second radar transmitter $Txe2_s$, the first radar receiver $Rxe1_s$, and the second radar receiver $Rxe2_s$ are connected to the reference signal oscillator $Lo_s$ and are supplied with a reference signal from the reference signal oscillator $Lo_s$, whereby pieces of processing performed by the first radar transmitter $Txe1_s$, the second radar transmitter $Txe2_s$, the first radar receiver $Rxe1_s$, and the second radar receiver $Rxe2_s$ are synchronized with each other.

The first radar receiver $Rxe1_s$ is configured so as to have the RF receiver 41$_s$, the VGA unit 51$_s$, and a signal processor 6e1$_s$. The signal processor 6e1$_s$ is configured so as to include an sth reception phase shifter 62e1$_s$, a correlation value calculator 63e1$_s$, a coherent integrator 64e1$_s$, and the distance estimator 651$_s$. The configuration of the second radar receiver $Rxe2_s$ is the same as that of the first radar receiver $Rxe1_s$ and hence a description therefor will be omitted.

(Yth Radar Transmitter (y=1 or 2))

Next, how the individual units of the yth first radar transmitter $Txe1_s$ (y=1) of the sector radar $SRe_s$ are configured will be described in detail with reference to FIG. 21.

The transmission signal generator 2e1$_s$ is configured so as to include the code generator 22e1$_s$, the modulator 231$_s$, the LPF 241$_s$, the sth transmission phase shifter 25e1$_s$, and the D/A converter 261$_s$. Although in FIG. 21 the transmission signal generator 2e1$_s$ includes the LPF 241$_s$, the LPF 241$_s$ may be provided in the first radar transmitter $Txe1_s$ independently of the transmission signal generator 2e1$_s$. The configuration and the manner of operation of the RF transmitter 31$_s$ are the same as those of the RF transmitter 3$_s$ used in each of the above embodiments, and hence descriptions therefor will be omitted.

Next, how the individual units of each yth radar transmitter operate will be described in detail for an example case that y is equal to 1 (first radar transmitter $Txe1_s$). However, the following description is likewise applicable to the other case that y is equal to 2 (second radar transmitter Txe2$_s$).

The pulse transmission controller 21e, generates a transmission timing signal for a radio-frequency radar transmission signal every transmission cycle T$_r$. The pulse transmission controller 21e$_s$ outputs the generated transmission timing signal to the code generater and the sth transmission phase shifter of each of the first radar transmitter Txe1$_s$ and the second radar transmitter Txe2$_s$ and the sth reception phase shifter of each of the first radar receiver Rxe1$_s$ and the second radar receiver Rxe2$_s$.

The transmission signal generator 2e1$_s$ generates a transmission reference clock signal by multiplying the reference signal generated by the reference signal oscillator Lo$_s$ by a prescribed number. The individual units of the transmission signal generator 2e1$_s$ operate on the basis of the generated transmission reference clock signal. Let $f_{TxBB}$ represent the transmission reference clock frequency; then the transmission cycle T$_r$ is expressed as an integer N$_r$ multiple of a discrete time interval $1/f_{TxBB}$ which is determined by the transmission reference clock frequency $f_{TxBB}$ (see Equation (66)). The transmission reference clock frequency $f_{TxBB}$ is a nominal value and, in actuality, includes a frequency error that varies depending on the radar transmitter Tx$_s$.

The transmission signal generator 2e1$_s$ periodically generates a baseband transmission signal G$_s$(t$_s$) (see Equation (67)) by modulating a complementary code sequence A$_n$ having a code length L on the basis of a transmission timing signal (for a radar transmission signal) which is output from the pulse transmission controller 21e$_s$ every transmission cycle T$_r$. Parameter n takes values 1 to L, and parameter L represents the code length of the code sequence A$_n$. Parameter j is the imaginary number unit which satisfies $j^2=-1$. Parameter t$_s$ represents discrete time.

The transmission signal generator of the second radar transmitter Txe2$_s$ periodically generates a baseband transmission signal G$^y_s$(t$_s$) (see Equation (67)) by modulating a complementary code sequence B$_n$ having the code length L on the basis of a transmission timing signal (for a radar transmission signal) which is output from the pulse transmission controller 21e$_s$ every transmission cycle T$_r$. Parameter n takes values 1 to L, and parameter L represents the code length of the code sequence B$_n$.

For example, as shown in FIG. 22, the transmission signal G$^y_s$(n$_s$) is such that each code element of the complementary code sequence A$_n$ or B$_n$ is modulated using N$_o$ samples of the transmission reference clock signal in the transmission interval T$_w$ (s) of each transmission cycle T$_r$. Therefore, in each transmission interval T$_w$, modulation is done using N$_w$ (=N$_o$×L) samples. In the silent interval (T$_r$−T$_w$) (s) of each transmission cycle T$_r$, modulation is done using N$_u$ (=N$_r$−N$_w$) samples. Therefore, the transmission signal G$^y_s$(n$_s$) of Equation (67) is expressed as Equation (68).

The first code generator 22e11$_s$ generates a transmission code of the one complementary code sequence A$_n$ of the complementary code sequences A$_n$ and B$_n$ having the code length L on the basis of a transmission timing signal that is output from the pulse transmission controller 21e$_s$ every odd-numbered transmission cycle T$_r$. The first code generator 22e11$_s$ outputs the generated transmission code of the complementary code sequence A$_n$ to the modulater 231$_s$.

The second code generator 22e12$_s$ generates a transmission code of the other complementary code sequence B$_n$ of the complementary code sequences A$_n$ and B$_n$ having the code length L on the basis of a transmission timing signal that is output from the pulse transmission controller 21e$_s$ every even-numbered transmission cycle T$_r$. The second code generater 22e12$_s$ outputs the generated transmission code of the complementary code sequence B$_n$ to the modulater 231$_s$.

The first code generator of the second radar transmitter Txe2$_e$ generates a transmission code of the one complementary code sequence B$_n$ of the complementary code sequences A$_n$ and B$_n$ having the code length L on the basis of a transmission timing signal that is output from the pulse transmission controller 21e$_s$ every odd-numbered transmission cycle T$_r$. The first code generator outputs the generated transmission code of the complementary code sequence B$_n$ to the modulater.

Furthermore, the second code generator of the second radar transmitter Txe2$_e$ generates a transmission code of the other complementary code sequence A$_n$ of the complementary code sequences A$_n$ and B$_n$ having the code length L on the basis of a transmission timing signal that is output from the pulse transmission controller 21e, every even-numbered transmission cycle T$_r$. The second code generator outputs the generated transmission code of the complementary code sequence A$_n$ to the modulater.

The modulater 231$_s$ receives the transmission code A$_n$ or B$_n$ that is output from the code generator 22e1$_s$. The modulater 231$_s$ generates a baseband transmission signal G$^y_s$(t$_s$) of Equation (67) by pulse-modulating the received transmission code A$_n$ or B$_n$. The modulater 231$_s$ outputs a transmission signal G$^y_s$(t$_s$), in a preset limited band or lower, of the generated transmission signal G$^y_s$(n$_s$) to the sth transmission phase shifter 25e1$_s$ via the LPF 241$_s$.

Now, how the sth transmission phase shifters of the specific sector radar SRe$_s$ (s=1) operate will be described. The sth transmission phase shifters of the first radar transmitter Txe1$_s$ and the second radar receiver Rxe2$_s$ receive the transmission signals G$^y_s$(t$_s$) that are output from the modulators or the LPFs, respectively. The sth transmission phase shifters give a common, prescribed transmission phase shift to the received transmission signal G$^y_s$(t$_s$) every two transmission cycles on the basis of a transmission timing signal that is output from the pulse transmission controller 21e$_s$ every transmission cycle T$_r$ (see FIG. 22).

More specifically, based on a transmission timing signal that is supplied from the pulse transmission controller 21e$_s$ in an m$_s$th transmission cycles T$_r$, the sth transmission phase shifters of the first radar transmitter Txe1$_s$ and the second radar receiver Rxe2$_s$ give a common transmission phase shift exp(j·floor[(m$_s$−1)/2]φ$_s$) corresponding to the ordinal number of the transmission cycle T$_r$ to the transmission signal G$^y_s$(t$_s$) every two transmission cycles (see Equation (89)). Parameter φ$_s$ represents a phase rotation amount (e.g., 90°) that is given in the sth transmission phase shifters 25e1$_s$, and it is preferable that parameter φ$_s$ satisfy the relationship of Inequality (9). The sth transmission phase shifters output transmission-phase-shift-added transmission signals GP$^y_s$(N$_r$(m$_s$−1)+t$_s$) to the D/A converters 261$_s$, respectively. Symbol floor[x] is an operator of outputting an integer obtained by rounding down a real number x.

[Equation 89]

$$GP^y_1(N_r(m_1-1)+t_1) = \exp\left(j\,\text{floor}\left[\frac{m_1-1}{2}\right]\phi_1\right)G^y_1(N_r(m_1-1)+t_1) \quad (89)$$

The manner of operation of the sth transmission phase shifters of the sector radar SRe$_s$ (s=2) is different from that of the sth transmission phase shifters of the sector radar SRe$_s$ (s=1) in that parameter $\phi_2$ representing the phase rotation amount in the transmission phase shift $\exp(j\cdot\mathrm{floor}[(m_s-1)/2]\phi_s)$ in Equation (90) is different from parameter $\phi_1$ and has a value $-90°$, for example.

Furthermore, parameter $\phi_1$ in the transmission phase shift given by the sth transmission phase shifters of the first radar transmitter $\mathrm{Txe1}_s$ and the second radar transmitter $\mathrm{Txe2}_s$ of the sector radar $\mathrm{SRe}_s$ (s=1) and parameter $\phi_2$ in the transmission phase shift given by the sth transmission phase shifters of the first radar transmitter and the second radar transmitter of the sector radar $\mathrm{SRe}_s$ (s=2) are opposite in phase ($\phi_1=-\phi_2$).

[Equation (90)]

$$GP_2^y(N_r(m_2-1)+t_2) = \exp\left(j\,\mathrm{floor}\left[\frac{m_2-1}{2}\right]\phi_2\right)G_2^y(N_r(m_2-1)+t_2) \quad (90)$$

(Yth Radar Receiver (y=1 or 2))

Next, how the individual units of the yth first radar receiver $\mathrm{Rxe}_s$ (y=1) of the sector radar $\mathrm{SRe}_s$ are configured will be described in detail with reference to FIG. 21.

The radar receiver $\mathrm{Rxe1}_s$ is configured so as to include the RF receiver $41_s$ to which the reception antenna $\mathrm{Ant\text{-}Rx1}_s$ is connected, the VGA unit $51_s$, and the signal processor $6e1_s$. The configuration and the manner of operation of the RF receiver $41_s$ are the same as those of the RF receiver $4_s$ used in each of the above embodiments, and hence descriptions therefor will be omitted. The signal processor $6e1_s$ is configured so as to include the A/D converter $611_s$, the sth reception phase shifter $62e1_s$, the correlation value calculator $63e1$, the coherent integrator $64e1$, and the distance estimator $651_s$. Each unit of the signal processor $6e1_s$ performs a calculation periodically with each transmission cycle $T_r$ as a signal processing interval.

Next, how the individual units of each yth radar receiver operate will be described in detail for an example case that y is equal to 1 (first radar receiver $\mathrm{Rxe1}_s$). However, the following description is likewise applicable to the other case that y is equal to 2 (second radar receiver $\mathrm{Rxe2}_s$).

The reception antenna $\mathrm{Ant\text{-}Rx1}_s$ receives a reflection wave signal that is a radar transmission signal transmitted from the first radar transmitter $\mathrm{Txe1}_s$ or the second radar transmitter $\mathrm{Txe2}_s$ and reflected by a target $\mathrm{TAR}_s$ and a radar transmission signal coming from the other sector radar which is installed so as to be opposed to the sector radar $\mathrm{SR}_s$ concerned. Each reception signal received by the reception antenna $\mathrm{Ant\text{-}Tx1}_s$ is input to the RF receiver $41_s$.

The VGA unit $51_s$ receives a baseband reception signal that is output from the RF receiver $41_s$ and includes an I signal and a Q signal, and adjusts the output level of the received baseband reception signal into an input range (dynamic range) of the A/D converter $611_s$.

The VGA unit $51_s$ outputs the output-level-adjusted baseband reception signal including the I signal and the Q signal to the A/D converter $611_s$. In the embodiment, to simplify the description, it is assumed that the gain of the VGA unit $51_s$ is adjusted in advance so that the output level of a reception signal falls within the input range (dynamic range) of the A/D converter $611_s$.

Like the RF receiver $41_s$, the signal processor $6e\,1_s$ generates a reception reference clock signal by multiplying a reference signal generated by the reference signal oscillator $\mathrm{Lo}_s$ by a prescribed number. The individual units of the signal processor $6e1_s$ operate on the basis of the generated reception reference clock signal.

Now, how the sth reception phase shifters of the specific sector radar $\mathrm{SRe}_s$ (s=1) operate will be described. The sth reception phase shifters of the first radar receiver $\mathrm{Rxe1}_s$ and the second radar receiver $\mathrm{Rxe2}_s$ receive reception signals $X_s^y(N_v(m_s-1)+k_s)$ that are output from the A/D converters, respectively. The sth reception phase shifting units give a reception phase shift that is opposite in direction to the phase shift component that was given by the sth transmission phase shifters to the received reception signals $X_s^y(N_v(m_s-1)+k_s)$ every two transmission cycles on the basis of a transmission timing signal that is output from the pulse transmission controller $21e_s$ every transmission cycle $T_r$.

More specifically, based on a transmission timing signal that is supplied from the pulse transmission controller $21e_s$ in an $m_s$th transmission cycle $T_r$, the reception phase shifters of the first radar receiver $\mathrm{Rxe1}_s$ and the second radar receiver $\mathrm{Rxe2}_s$ give a common reception phase shift $\exp(-j\cdot\mathrm{floor}[(m_s-1)/2](-\phi_s))$ corresponding to the ordinal number of the transmission cycle $T_r$ to the reception signals $X_s^y(N_v(m_s-1)+k_s)$ every two transmission cycles (see Equation (91)), respectively. The sth reception phase shifters output reception-phase-shift-added reception signals $XP_s^y(N_v(m_s-1)+k_s)$ to the correlation value calculator, respectively.

[Formula 91]

$$XP_1^y(N_v(m_1-1)+k_1) = \exp\left(-j\,\mathrm{floor}\left[\frac{m_1-1}{2}\right]\phi_1\right)X_1^y(N_v(m_1-1)+k_1) \quad (91)$$

The sth reception phase shifters of the sector radar $\mathrm{SR}_s$ (s=2) operate differently from those of the sector radar $\mathrm{SR}_s$ (s=2) in that parameter $\phi_2$ representing a rotation amount is different from $\phi_1$ (see Equation (92)). For example, parameters $\phi_1$ and $\phi_2$ are $90°$ and $-90°$, respectively.

[Formula 92]

$$XP_2^y(N_v(M_2-1)+k_2) = \exp\left(-j\,\mathrm{floor}\left[\frac{m_2-1}{2}\right]\phi_2\right)X_2^y(N_v(m_2-1)+k_2) \quad (92)$$

The correlation value calculator $63e1_s$ receives the reception signal $XP_s^y(N_v(m_s-1)+k_s)$ that is output from the sth reception phase shifter $62e1_s$. Based on the reception reference clock signal obtained by multiplying the reference signal by the prescribed number, the correlation value calculator $63e1_s$ periodically generates, for discrete times $k_s$, a transmission code of the code sequence $A_n$ having the code length L transmitted in an $m_s$th transmission cycle $T_r$ ($m_s$ (odd number)=$2z_s-1$ where $z_s$ is a natural number). Furthermore, based on the reception reference clock signal obtained by multiplying the reference signal by the prescribed number, the correlation value calculator $63e1_s$ periodically generates, for discrete times $k_s$, a transmission code of the code sequence $B_n$ having the code length L transmitted in an $m_s$th transmission cycle $T_r$ ($m_s$ (even number)=$2z_s$).

The correlation value calculator $63e1_s$ calculates sliding correlation values $AC_s^y(k_s, m_s)$ between the received reception signal $XP_s^y(N_v(m_s-1)+k_s)$ and the transmission code $A_n$ or $B_n$. Each sliding correlation value $AC_s^y(k_s, m_s)$ is calculated by performing a sliding correlation operation on the transmission code and the reception signal at each discrete time $k_s$ in the $m_s$th transmission cycle $T_r$.

More specifically, the correlation value calculator $63e1_s$ calculates sliding correlation values $AC^y_s(k_s, 2z_s-1)$ at discrete times $k_s$ (=1 to $(N_u-N_w)/N_{TR}$) in an $m_s$th ($m_s$ (odd number)=$2z_s-1$) transmission cycle $T_r$ (each transmission cycle $T_r$) according to Equation (93). The correlation value calculator $63e1_s$ outputs the sliding correlation values $AC^y_s(k_s, 2z_s-1)$ calculated according to Equation (93) to the coherent integrator $64e1_s$. In Equation (93), the asterisk "*" is the complex conjugate operator.

[Formula 93]

$$AC^y_s(k_s, 2z_s - 1) = \sum_{n=1}^{L} XP^y_s\left(2N_v(z_s - 1) + \frac{N_o(n-1)}{N_{TR}} + k_s\right)A^*_n \quad (93)$$

Furthermore, the correlation value calculator $63e1_s$ calculates sliding correlation values $AC^y_s(k_s, 2z_s)$ at discrete times $k_s$ (=1 to $(N_u-N_w)/N_{TR}$) in an $m_s$th ($m_s$ (even number)=$2z_s$) transmission cycle $T_r$ (each transmission cycle $T_r$) according to Equation (94). The correlation value calculator $63e1_s$ outputs the sliding correlation values $AC^y_s(k_s, 2z_s)$ calculated according to Equation (94) to the coherent integrator $64e1_s$. In Equation (94), the asterisk "*" is the complex conjugate operator.

[Formula 94]

$$AC^y_s = (k_s, 2z_s) = \sum_{n=1}^{L} XP^y_s\left(N_v(2z_s - 1) + \frac{N_o(n-1)}{N_{TR}} + k_s\right)B^*_n \quad (94)$$

Although in each of the embodiments including this embodiment the correlation value calculator $63e1_s$ performs calculations at discrete times $k_s$=1 to $(N_u-N_w)/N_{TR}$, the measurement range (discrete time $k_s$ range) may be narrowed further to, for example, $k_s=N_w/N_{TR}+1$ to $(N_u-N_w)/N_{TR}$ according to the range of presence of a target $TAR_s$ which is a measurement target of the radar apparatus 10. With this measure, the radar apparatus 10 can further reduce the amount of calculation of the correlation value calculator $63e1_s$. That is, the radar apparatus 10 can reduce the power consumption further as a result of reduction in the calculation amount of the signal processor $6e1_s$.

Where the correlation value calculator $63e1_s$ calculates sliding correlation values $AC_s(k_s, m_s)$ at discrete times $k_s=N_w/N_{TR}+1$ to $(N_u-N_w)/N_{TR}$, the radar apparatus 10 can omit measurement of a reflection wave signal in each transmission interval $T_w$ of the radar transmission signal.

In the radar apparatus 10, even if a radar transmission signal coming from each radar transmitter goes around to enter the radar receiver directly, a measurement can be performed with its influence eliminated. With the above restriction of the measurement range (discrete time $k_s$ range), the coherent integrator $64e1_s$ and the distance estimator $65e1_s$ also operate in the same restricted measurement range.

The coherent integrator $64e1_s$ receives the sliding correlation values $AC^y_s(k_s, 2z_s-1)$ and $AC^y_s(k_s, 2z_s)$ that are output from the correlation value calculator $63e1_s$. The coherent integrator $64e1_s$ adds together sliding correlation values $AC^y_s(k_s, 2z_s-1)$ and $AC^y_s(k_s, 2z_s)$ in a prescribed number (2NP) of transmission cycles $T_r$ (a period $2NP \times T_r$) on the basis of sets of sliding correlation values $AC^y_s(k_s, 2z_s-1)$ and $AC^y_s(k_s, 2z_s)$ that have been calculated in the two (odd-numbered and even-numbered) transmission cycles $T_r$ for the respective discrete times $k_s$.

The coherent integrator $64e1_s$ calculates a $v_s$th coherent integration value $ACC^y_s(k_s, v_s)$ for each discrete time $k_s$ by adding together, for each discrete time $k_s$, sliding correlation values $AC^y_s(k_s, 2z_s-1)$ and $AC^y_s(k_s, 2z_s)$ in the prescribed number 2NP of periods (period $NP \times T_r$) according to Equation (95). Parameter 2NP represents the number of times of coherent integration performed in the coherent integrator $64e1_s$. The coherent integrator $64e1_s$ outputs the calculated coherent integration values $ACC^y_s(k_s, v_s)$ to the distance estimator $651_s$.

[Formula 95]

$$ACC^y_s(k_s, v_s) = \sum_{m_s=1}^{2NP} AC^y_s(k_s, NP(v_s - 1) + m_s) \quad (95)$$

By setting the prescribed number 2NP at an integer multiple of $2\pi/\phi_s$ in Equation (95), the coherent integrator $64e1_s$ can reduce influences of circuit errors even if a reflection wave signal contains circuit errors such as a DC offset component and IQ imbalance. That is, by setting the prescribed number 2NP at an integer multiple of $2\pi/\phi_s$, the radar apparatus 10 can prevent degradation of the target ranging performance even if a reflection wave signal contains circuit errors such as a DC offset component and IQ imbalance. Furthermore, the radar apparatus 10 can improve the reception quality (SNR) of a reflection wave signal by suppressing noise components contained in the reflection wave signal by performing 2NP times of coherent integration.

As such, the radar apparatus 10 according to the fifth embodiment can provide advantages that are equivalent to the advantages of the radar apparatus 10 according to the fourth embodiment even in the case of using a complementary code as a transmission code.

Although the various embodiments have been described above with reference to the drawings, it goes without saying that this disclosure is not limited to those examples. It is apparent that those skilled in the art would conceive various changes or modifications within the confines of the claims. And such changes or modifications should naturally be construed as being included in the technical scope of the invention.

In the above-described first embodiment, the pulse transmission controller $21_s$ is provided in each radar transmitter $Tx_s$ of each sector radar $R_s$ (s=1, 2). However, the pulse transmission control unit $21_s$ may be provided outside each of the two sector radars $SR_s$ (s=1, 2) or a single pulse transmission control unit may be shaped by the two sector radars $SR_s$ (s=1, 2). That a single pulse transmission control unit may be shaped by the two sector radars $SR_s$ (s=1, 2) also applies to the second and third embodiments.

In the above-described second embodiment, the first code generator $22b1_s$ generates a complementary code sequence $A_n$ having a code length L and the second code generator $22b2_s$ generates a complementary code sequence $B_n$ having the code length L. However, the invention is not limited to such a case. The same advantages can be obtained even by a configuration in which the first code generater $22b1_s$ and the second code generater $22b2_s$ (s=1) generate complementary code sequences $A_n$ and $B_n$ having a code length L, respectively, and the first code generater $22b1_s$ and the second code generater $22b2_s$ (s=2) generate complementary code sequences $U_n$ and $V_n$ having the code length L, respectively, in which the code $U_n$ is different from the code $A_n$ and the code $V_n$ is different from the code $B_n$ (see FIG. 24).

Figure 24:
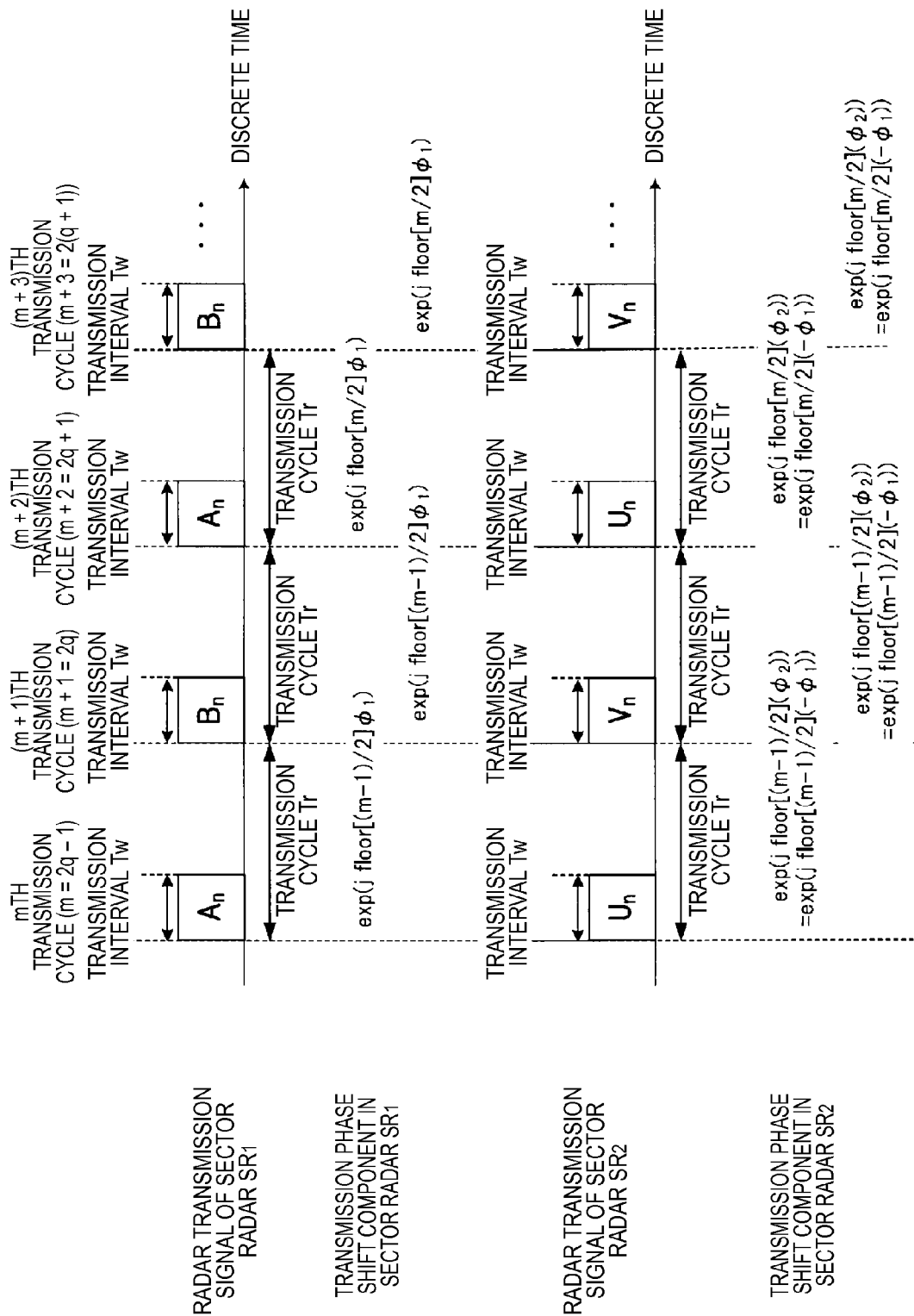
FIG. 24 is an explanatory diagram showing relationships between individual transmission intervals, individual transmission cycles, and individual transmission phase shift components of transmission signals in a case that different pairs of complementary code sequences are used in the sector radars $SRb_s$ (s=1, 2) which constitute the radar apparatus according to the second embodiment.

FIG. 24 is an explanatory diagram showing relationships between individual transmission intervals, individual transmission cycles, and individual transmission phase shift components of transmission signals in a case that different pairs of complementary code sequences are used in the sector radars $SRb_s$ (s=1, 2) which constitute the radar apparatus according to the second embodiment. In FIG. 24, the complementary code sequences $U_n$ and $V_n$ are in a complementary code relationship.

Furthermore, in the radar apparatus 10, the interference between the sector radars $SRb_s$ (s=1, 2) can be suppressed further by employing, as the code sequences $U_n$ and $A_n$, code sequences having small cross-correlation values.

Since the cross-correlation values between the code sequences $U_n$ and $A_n$ determine the amount of interference between the codes, it is the best that they have cross-correlation values being equal to zero. However, it is preferable to employ code sequences having cross-correlation values being smaller than or equal to 0.1 because it is appropriate to at least make the amount of interference between the codes smaller than or equal to 20 dB.

Still further, in the radar apparatus 10, the interference between the sector radars $SRb_s$ (s=1, 2) can be suppressed further by employing, as the code sequences $V_n$ and $B_n$ code sequences having small cross-correlation values.

What is more, in the radar apparatus 10, the interference between the sector radars $SRb_s$ (s=1, 2) can be suppressed even further by employing, as the code sequences $U_n$, $V_n$, $A_n$, and $B_n$, such code sequences that the sums of the cross-correlation values between the code sequences $U_n$ and $A_n$ and the cross-correlation values between the code sequences $V_n$ and $B_n$ are equal to zero.

This will be explained below. A cross-correlation result (cross-correlation values) $R_{AU}(\tau)$ between the one code sequence $A_n$ of the former of the complementary code sequences ($A_n$, $B_n$) and the complementary code sequences ($U_n$, $V_n$) and the one code sequence $U_n$ of the latter complementary code sequence is calculated according to Equation (96).

A cross-correlation calculation result (cross-correlation values) $R_{BV}(\tau)$ between the other code sequence $B_n$ of the former complementary code sequence and the other code sequence $V_n$ of the latter complementary code sequence is calculated according to Equation (97). Symbol R represents a cross-correlation value calculation result (cross-correlation values). However, it is assumed that each of the complementary code sequences $A_n$ and $B_n$ is zero when n>L or n<1 (i.e., $A_n$=0, $B_n$=0, $U_n$=0, and $V_n$=0 when n>L or n<1). The asterisk "*" is a complex conjugate operator.

[Formula 96]

$$R_{AU}(\tau) = \sum_{n=1}^{L} A_n U_{n+\tau} \tag{96}$$

[Formula 97]

$$R_{BV}(\tau) = \sum_{n=1}^{L} B_n V_{n+\tau}^* \tag{97}$$

The cross-correlation value calculation result $R_{AU}(\tau)$ calculated according to Equation (96) has a peak when the delay time (or shift time) $\tau$ is equal to 0 and has range sidelobes for the delay times $\tau$ being not equal to 0. Likewise, the cross-correlation calculation result $R_{BV}(\tau)$ calculated according to Equation (97) has a peak when the delay time $\tau$ is equal to 0 and has range sidelobes for the delay times $\tau$ being not equal to 0.

In the radar apparatus 10, the interference between the sector radars $SRb_s$ (s=1, 2) can be suppressed even further by employing, as the ($A_n$, $B_n$) and the complementary code sequences ($U_n$, $V_n$), such code sequences that the sums of values, at the same delay times $\tau$, of cross-correlation value calculation results ($R_{AU}(\tau)$ and $R_{BV}(\tau)$) are equal to zero irrespective of the delay time $\tau$ (see Equation (98)).

[Formula 98]

$$R_{AU}(\tau) + R_{BV}(\tau) = 0 \tag{98}$$

The present application is based on Japanese Patent Application No. 2011-252100 filed on Nov. 17, 2011, the disclosure of which is incorporated herein by reference.

INDUSTRIAL APPLICABILITY

This disclosure is useful when applied to a radar apparatus which, in the case where plural sector radars are installed being opposed to each other, suppresses interference between the sector radars with a simple configuration by making it unnecessary to synchronize transmission cycles between the sector radars opposed to each other.

DESCRIPTION OF SYMBOLS

10: Radar apparatus
$2_s$, $2b_s$, $2d1_s$, $2e1_s$: Transmission signal generator
$3_s$, $31_s$: RF transmitter
$4_s$, $41_s$: RF receiver
$5_s$, $51_s$: VGA unit
$6_s$, $6a_s$, $6b_s$, $6c_s$, $6d1_s$, $6e1_s$: Signal processor
$21_s$, $21b_s$, $21d_s$, $21e_s$: Pulse transmission controller
$22_s$, $22b_s$, $221_s$, $22d1_s$, $22e1_s$: Code generator
$22b1_s$, $22e11_s$: First code generator
$22b2_s$, $22e12_s$: Second code generator
$23_s$, $23b_s$, $231_s$: Modulater
$24_s$, $24b_s$, $241_s$: LPF
$25$, $25b_s$, $25d1_s$, $25e1_s$: Sth transmission phase shifter
$26_s$, $26b_s$, $261_s$: D/A converter
$31_s$: Quadrature modulater
$32_s$, $42_s$: Frequency converter
$33_s$, $41_s$: Amplifier
$43_s$: Quadrature detector
$61_s$, $611_s$: A/D converter
$62_s$, $62a_s$, $62b_s$, $62c_s$, $62d1_s$, $62e1_s$: Sth reception phase shifter
$63_s$, $63a_s$, $63b_s$, $63c_s$, $63d1_s$, $63e1_s$: Correlation value calculator
$64_s$, $64a_s$, $64b_s$, $64c_s$, $64d1_s$, $64e1_s$: Coherent integrator
$65_s$, $651_s$: Distance estimator
$Rx_s$, $Rxa_s$, $Rxb_s$, $Rxc_s$: Radar receiver
$SR_s$, $SRa_s$, $SRb_s$, $SRc_s$, $SRd_s$, $SRe_s$: Sector radar
$Tx_s$, $Txb_s$: Radar transmitter

The invention claimed is:
1. A radar apparatus comprising:
a first radar transmitter that transmits a first radar transmission signal generated using a first code sequence having a prescribed code length from a first transmission antenna as a first radio-frequency signal;
a second radar transmitter that transmits a second radar transmission signal generated using a second code sequence having a prescribed code length from a second transmission antenna as a second radio-frequency signal; and
a first radar receiver that detects a presence or absence of a target on the basis of a reflection wave signal that is produced through reflection of the first radar transmission signal by the target,
the first radar transmission signal is a signal generated by modulating the first code sequence that has been phase-shifted on the basis of a first transmission timing signal;
the second radar transmission signal is a signal generated by modulating the second code sequence that has been phase-shifted on the basis of a second transmission timing signal;
a phase shift given to the first code sequence is opposite to a phase shift given to the second code sequence; and
the first radar receiver comprises:
a first radio frequency (RF) receiver that receives the reflection wave signal by a first reception antenna and converts the received reflection wave signal into a baseband first reception signal;
a first reception phase shifter that gives an opposite phase shift that is opposite to a first phase shift given to the first reception signal supplied from the first RF receiver based on the first transmission timing signal;
a first correlation value calculator that calculates correlation values between the opposite-phase-shift-given first reception signal and the first code sequence; and
a first coherent integrator that adds together the correlation values calculated by the first correlation value calculator in a prescribed number of transmission cycles.

2. The radar apparatus according to claim 1, wherein the first radar transmitter comprises:
a first pulse transmission controller that generates the first transmission timing signal every transmission cycle;
a first radar code generator that generates the first code sequence;
a first modulator that generates a first baseband signal by modulating the first code sequence on the basis of the first transmission timing signal;
a first transmission phase shifter that shifts the phase of the first baseband signal on the basis of the first transmission timing signal; and
a first RF transmitter that converts the phase-shifted first baseband signal into the radio-frequency first radar transmission signal and transmits the radio-frequency first radar transmission signal from the first transmission antenna.

3. The radar apparatus according to claim 2, wherein:
the first radar code generator comprises:
a first code generator that generates a transmission code of a third code sequence that is a complementary code sequence having a prescribed code length on the basis of the first transmission timing signal generated every odd-numbered transmission cycle; and
a second code generator that generates a transmission code of a fourth code sequence that is a complementary code sequence having the prescribed code length on the basis of the first transmission timing signal generated every even-numbered transmission cycle;
the first code sequence consists of the third code sequence and the fourth code sequence; and
the first transmission phase shifter gives a phase shift corresponding to two transmission cycles.

4. The radar apparatus according to claim 3, wherein the second radar transmitter comprises:
a second pulse transmission controller that generates the second transmission timing signal every transmission cycle;
a second radar code generator that generates the second code sequence;
a second modulator that generates a second baseband signal by modulating the second code sequence on the basis of the second transmission timing signal;
a second transmission phase shifter that shifts the phase of the second baseband signal on the basis of the second transmission timing signal; and
a second RF transmitter that converts the phase-shifted second baseband signal into the radio-frequency second radar transmission signal and transmits the radio-frequency second radar transmission signal from the second transmission antenna.

5. The radar apparatus according to claim 4, wherein:
the second radar code generator comprises:
a third code generator that generates a transmission code of a fifth code sequence that is a complementary code sequence having a prescribed code length on the basis of the second transmission timing signal generated every odd-numbered transmission cycle; and
a fourth code generator that generates a transmission code of a sixth code sequence that is a complementary code sequence having the prescribed code length on the basis of the second transmission timing signal generated every even-numbered transmission cycle;
the second code sequence consists of the fifth code sequence and the sixth code sequence; and
the second transmission phase shifter gives a phase shift corresponding to two transmission cycles.

6. The radar apparatus according to claim 1, further comprising:
a second radar receiver that detects a presence or absence of the target on the basis of a reflection wave signal that is produced through reflection of the second radar transmission signal by the target, the second radar receiver comprising:
a second RF receiver that receives the reflection wave signal by a second reception antenna and converts the received reflection wave signal into a baseband second reception signal;
a second reception phase shifter that gives an opposite phase shift that is opposite to a second phase shift to the second reception signal supplied from the second RF receiver on the basis of the second transmission timing signal;
a second correlation value calculator that calculates correlation values between the opposite-phase-shift-given second reception signal and the second code sequence; and
a second coherent integrator that adds together correlation values calculated by the second correlation value calculator in a prescribed number of transmission cycles.

7. The radar apparatus according to claim 6, wherein:
the first radar receiver further comprises:
- a first variable gain amplifier (VGA) unit that adjusts an output level of the first reception signal supplied from the first RF receiver; and
- a first analog-to-digital (A/D) converter that converts an analog first reception signal whose output level has been adjusted by the first VGA unit into a digital first reception signal; and the second radar receiver further comprises:
- a second VGA unit that adjusts an output level of the second reception signal supplied from the second RF receiver; and
- a second A/D converter that converts an analog first reception signal whose output level has been adjusted by the second VGA unit into a digital second reception signal.

8. The radar apparatus according to claim 6, wherein:
the first radar receiver further comprises a first distance estimator that estimates a distance to the target on the basis of correlation value addition results supplied from the first coherent integrator; and
the second receiver further comprises a second distance estimator that estimates a distance to the target on the basis of correlation value addition results supplied from the second coherent integrator.

9. The radar apparatus according to claim 5, wherein the third, fourth, fifth, and sixth code sequences are the same code sequence and have the same code length.

10. The radar apparatus according to claim 5, wherein the third, fourth, fifth, and sixth code sequences are different code sequences and have the same code length.

11. The radar apparatus according to claim 5, wherein the third code sequence or the fourth code sequence has a different code length than the fifth code sequence or the sixth code sequence.

12. The radar apparatus according to claim 4, further comprising:
a third radar transmitter that generates a third baseband signal using a seventh code sequence having the prescribed code length on the basis of the first transmission timing signal, shifts the phase of the third baseband signal on the basis of the first transmission timing signal, converts the phase-shifted third baseband signal into a radio-frequency third radar transmission signal, and transmits the latter from a third transmission antenna; and
a fourth radar transmitter that generates a fourth baseband signal using an eighth code sequence having the prescribed code length on the basis of the second transmission timing signal, shifts the phase of the fourth baseband signal on the basis of the second transmission timing signal, converts the phase-shifted fourth baseband signal into a radio-frequency fourth radar transmission signal, and transmits the latter from a fourth transmission antenna, wherein:
the phase shift given to the third baseband signal is opposite to the phase shift given to the fourth baseband signal;
the phase shift given to the first baseband signal is opposite to the phase shift given to the third baseband signal; and
the phase shift given to the second baseband signal is opposite to the phase shift given to the fourth baseband signal.

13. The radar apparatus according to claim 1, wherein:
a phase shift of 90° is given in the first radar transmitter; and
a phase shift of −90° is given in the second radar transmitter.

14. The radar apparatus according to claim 10, wherein sums of cross-correlation values between the third code sequence and the fifth code sequence and cross-correlation values between the fourth code sequence and the sixth code sequence are equal to zero.

15. A method comprising:
transmitting a first radar transmission signal generated using a first code sequence having a prescribed code length from a first transmission antenna as a first radio-frequency signal, the transmitting of the first radar transmission signal being performed on a first radar transmitter;
transmitting a second radar transmission signal generated using a second code sequence having a prescribed code length from a second transmission antenna as a second radio-frequency signal, the transmitting of the second radar transmission signal being performed on a second radar transmitter; and
detecting a presence or absence of a target based on a reflection wave signal that is produced through reflection of the first radar transmission signal by the target, the detecting being performed on a radar receiver,
wherein:
the first radar transmission signal is a signal generated by modulating the first code sequence that has been phase-shifted on the basis of a first transmission timing signal;
the second radar transmission signal is a signal generated by modulating the second code sequence that has been phase-shifted on the basis of a second transmission timing signal;
a phase shift given to the first code sequence is opposite to a phase shift given to the second code sequence; and
the detecting includes:
receiving the reflection wave signal by a first reception antenna and converting the received reflection wave signal into a baseband first reception signal;
giving an opposite phase shift that is opposite to a first phase shift given to the first reception signal based on the first transmission timing signal;
calculating correlation values between the opposite-phase-shift-given first reception signal and the first code sequence; and
adding together the correlation values in a prescribed number of transmission cycles.

16. The method according to claim 15, comprising:
generating the first transmission timing signal every transmission cycle;
generating the first code sequence;
generating a first baseband signal by modulating the first code sequence based on the first transmission timing signal;
shifting the phase of the first baseband signal based on the first transmission timing signal;
converting the phase-shifted first baseband signal into the radio-frequency first radar transmission signal; and
transmitting the radio-frequency first radar transmission signal from the first transmission antenna.

17. The method according to claim 16, comprising:
generating a transmission code of a third code sequence that is a complementary code sequence having a prescribed code length based on the first transmission timing signal generated every odd-numbered transmission cycle; and generating a transmission code of a fourth code sequence that is a complementary code sequence having the prescribed code length based on the first transmission timing signal generated every even-numbered transmission cycle, wherein:
- the first code sequence consists of the third code sequence and the fourth code sequence; and
- the shifting gives a phase shift corresponding to two transmission cycles.

18. The method according to claim 17, comprising:

generating the second transmission timing signal every transmission cycle;

generating the second code sequence;

generating a second baseband signal by modulating the second code sequence based on the second transmission timing signal;

shifting the phase of the second baseband signal based on the second transmission timing signal;

converting the phase-shifted second baseband signal into the radio-frequency second radar transmission signal; and transmitting the radio-frequency second radar transmission signal from the second transmission antenna.

19. The method according to claim 18, comprising:

generating a transmission code of a fifth code sequence that is a complementary code sequence having a prescribed code length based on the second transmission timing signal generated every odd-numbered transmission cycle; and generating a transmission code of a sixth code sequence that is a complementary code sequence having the prescribed code length based on the second transmission timing signal generated every even-numbered transmission cycle, wherein:
- the second code sequence consists of the fifth code sequence and the sixth code sequence; and
- the shifting gives a phase shift corresponding to two transmission cycles.

* * * * *